United States Patent
Kim et al.

(10) Patent No.: US 12,450,004 B2
(45) Date of Patent: Oct. 21, 2025

(54) SEMICONDUCTOR MEMORY DEVICE AND METHOD FOR STORING META DATA IN SUB-ARRAY BLOCKS OF MEMORY CELL ARRAY

(71) Applicant: Samsung Electronics Co., Ltd., Suwon-si (KR)

(72) Inventors: Kiheung Kim, Suwon-si (KR); Taeyoung Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/243,268

(22) Filed: Sep. 7, 2023

(65) Prior Publication Data
US 2024/0220149 A1 Jul. 4, 2024

(30) Foreign Application Priority Data

Dec. 28, 2022 (KR) .................. 10-2022-0187318
Dec. 28, 2022 (KR) .................. 10-2022-0187329
(Continued)

(51) Int. Cl.
*G06F 3/06* (2006.01)

(52) U.S. Cl.
CPC .......... *G06F 3/0655* (2013.01); *G06F 3/0604* (2013.01); *G06F 3/064* (2013.01); *G06F 3/0673* (2013.01)

(58) Field of Classification Search
CPC ...... G06F 3/0655; G06F 3/0673; G06F 3/064; G06F 3/0604; G06F 2212/466; G06F 3/0688
(Continued)

(56) References Cited

U.S. PATENT DOCUMENTS

| 7,159,073 | B2 | 1/2007 | Longo et al. |
| 7,467,323 | B2 | 12/2008 | Fields, Jr. et al. |

(Continued)

FOREIGN PATENT DOCUMENTS

CN          1474512 A          2/2004

OTHER PUBLICATIONS

European search report dated May 6, 2024 from the European Patent Office for European Patent Application No. 23195919.8.
(Continued)

*Primary Examiner* — Jared I Rutz
*Assistant Examiner* — Edward Waddy, Jr.
(74) *Attorney, Agent, or Firm* — Muir Patent Law, PLLC

(57) ABSTRACT

A semiconductor memory device includes a memory cell array and a column access circuit. The memory cell array includes a plurality of sub-array blocks and each of the sub-array blocks includes volatile memory cells. The column access circuit receives a plurality of data units, each of which includes normal data and meta data having a ratio of k:1, which is associated with managing the normal data, allocates p column selection lines associated with transferring the data units to the bit-lines to a plurality of normal data and a plurality of meta data in the data units with the ratio of k:1, and stores a sub unit of a first normal data among the plurality of normal data and a sub unit of a first meta data in a first region and a second region of a first sub-array block of the plurality of sub-array blocks, respectively.

20 Claims, 41 Drawing Sheets

(30) Foreign Application Priority Data

Jan. 19, 2023 (KR) ........................ 10-2023-0007741
May 16, 2023 (KR) ........................ 10-2023-0062957

(58) Field of Classification Search
USPC ..................................... 711/154, 114, 12.001
See application file for complete search history.

(56) References Cited

U.S. PATENT DOCUMENTS

| | | | |
|---|---|---|---|
| 8,984,212 | B2 | 3/2015 | Choi et al. |
| 9,195,395 | B1 | 11/2015 | Smith |
| 9,891,838 | B2 | 2/2018 | Woo et al. |
| 9,910,621 | B1 | 3/2018 | Golan et al. |
| 10,534,704 | B2 | 1/2020 | Park et al. |
| 10,586,576 | B2 | 3/2020 | Nakaoka |
| 10,719,438 | B2 | 7/2020 | Choi |
| 11,288,188 | B1* | 3/2022 | Tummala ............ G06F 12/0215 |
| 11,514,988 | B2 | 11/2022 | Kang et al. |
| 2011/0126079 | A1* | 5/2011 | Wu ...................... G06F 11/1044 |
| | | | 714/763 |
| 2019/0250985 | A1* | 8/2019 | Seo ..................... G06F 11/1068 |
| 2020/0371869 | A1* | 11/2020 | Park .................... G06F 11/1016 |
| 2021/0406123 | A1* | 12/2021 | Nakanishi ........... G11C 11/4096 |
| 2022/0308760 | A1 | 9/2022 | Yeom et al. |

OTHER PUBLICATIONS

Extended European search report dated Feb. 12, 2024 from the European Patent Office for corresponding Patent Application No. 23195919.8.

Partial European search report dated Feb. 12, 2024 from the European Patent Office for corresponding Patent Application No. 23195919.8.

\* cited by examiner

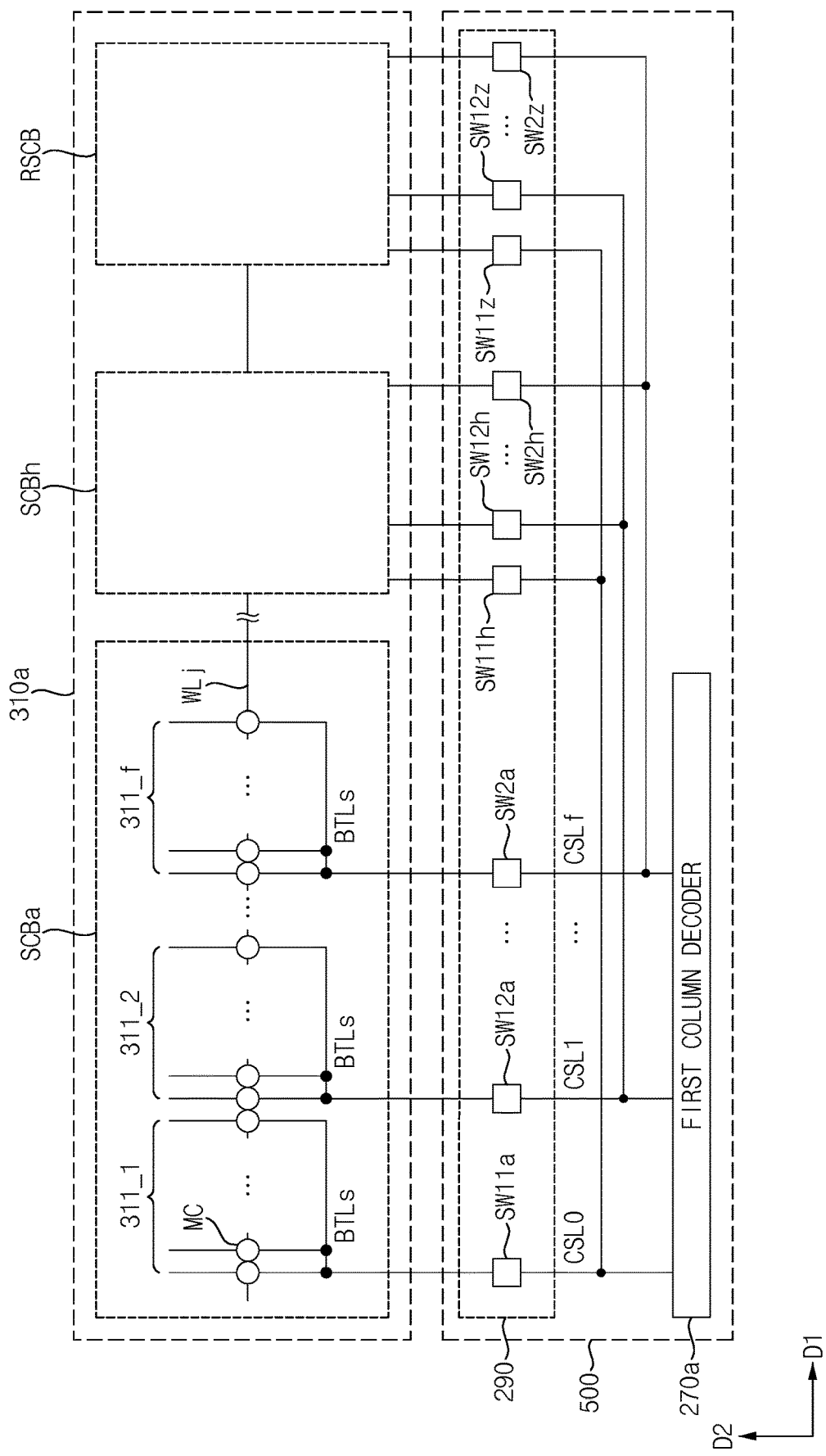

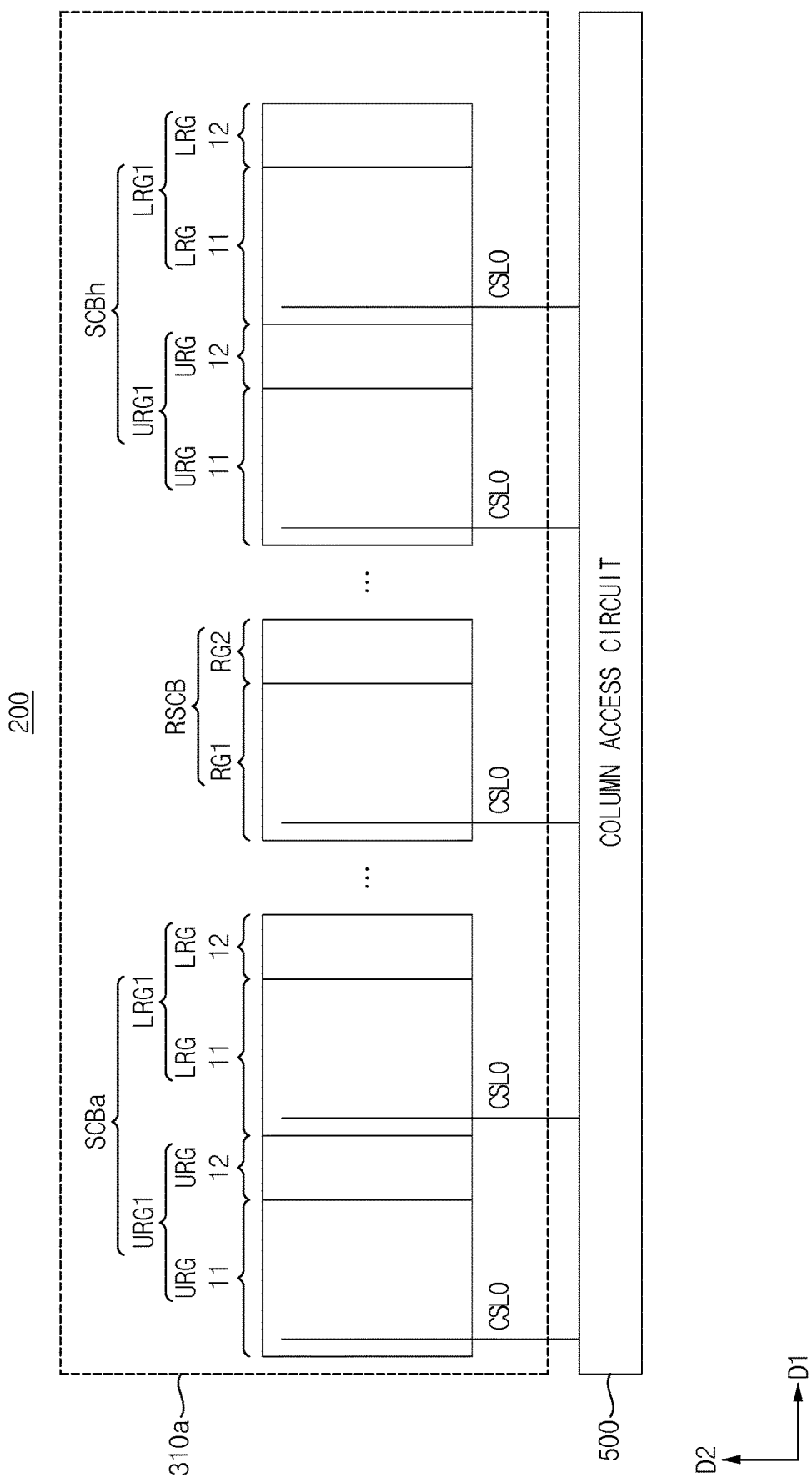

| CMD | CS_n | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|
| ACT | L | L | L | R0 | R1 | R2 | R3 | BA0 | BA1 | BG0 | BG1 | BG2 | CID0 | CID1 | CID2 |
| | H | R4 | R5 | R6 | R7 | R8 | R9 | R10 | R11 | R12 | R13 | R14 | R15 | R16 | CID3/R17 |
| WR | L | H | L | H | H | L | BL | BA0 | BA1 | BG0 | BG1 | BG2 | CID0 | CID1 | CID2 |
| | H | V | C3 | C4 | C5 | C6 | C7 | C8 | C9 | C10 | V | H | L | V | CID3 |
| RD | L | H | L | H | H | H | BL | BA0 | BA1 | BG0 | BG1 | BG2 | CID0 | CID1 | CID2 |
| | H | C2 | C3 | C4 | C5 | C6 | C7 | C8 | C9 | C10 | V | H | V | V | CID3 |

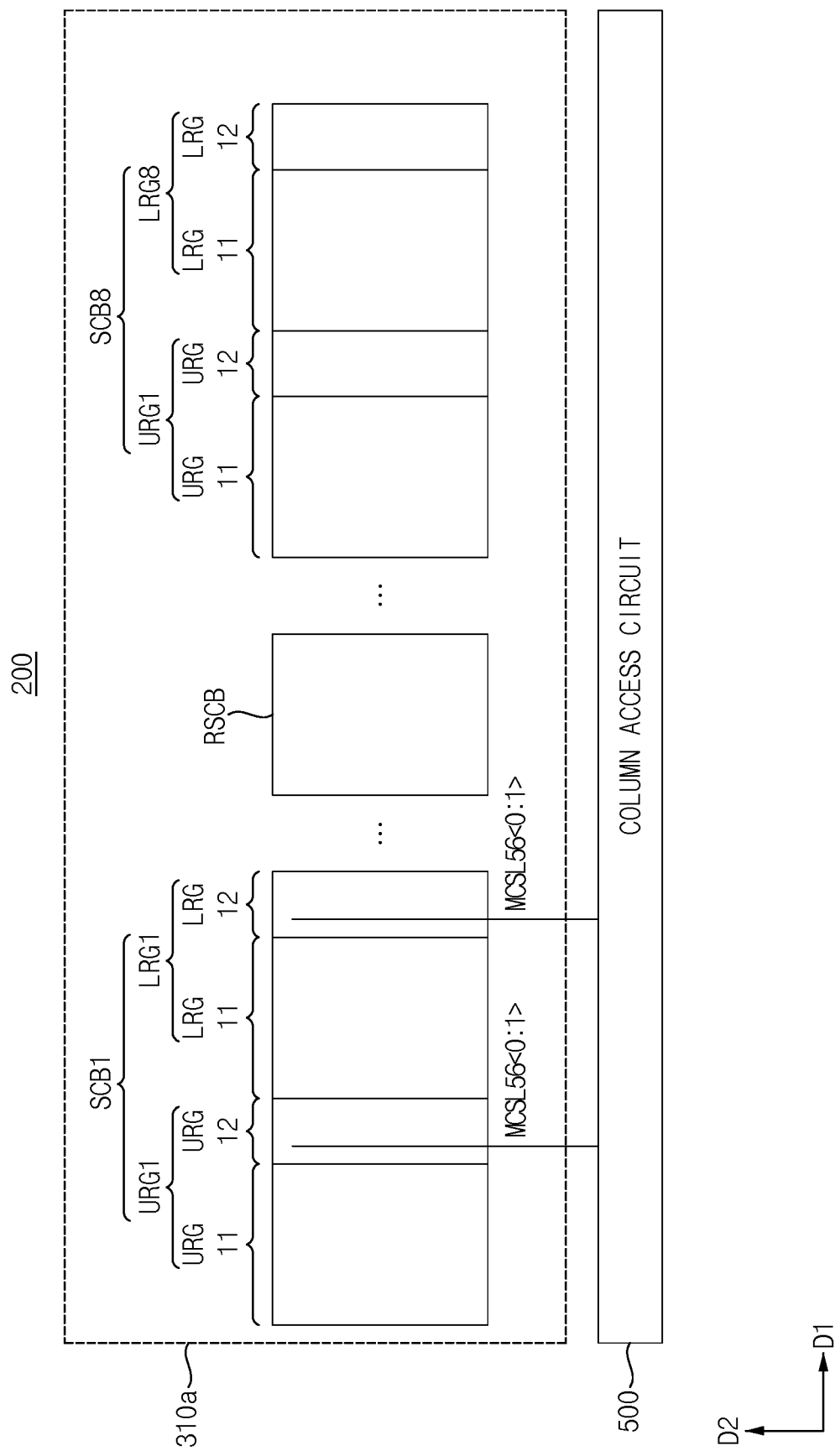

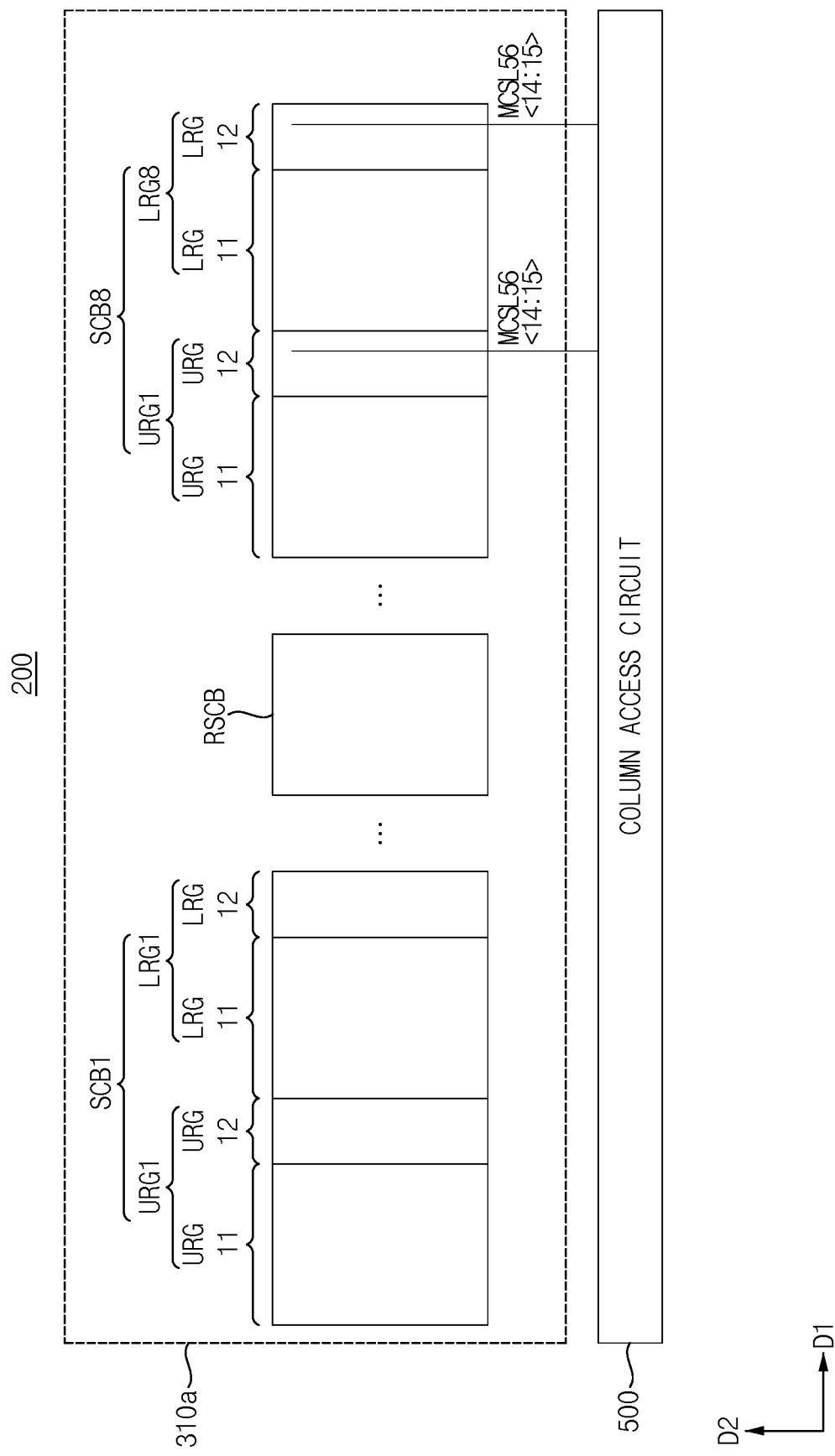

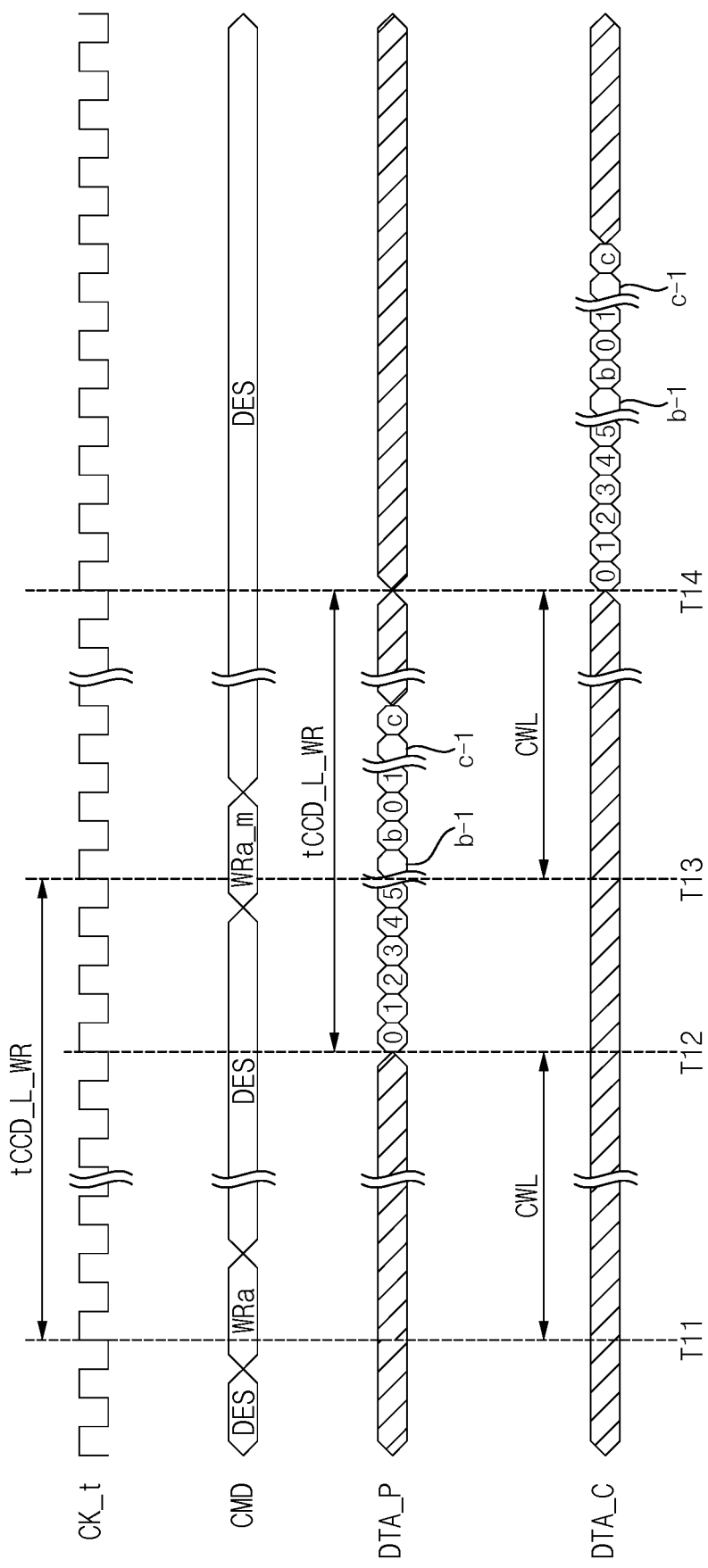

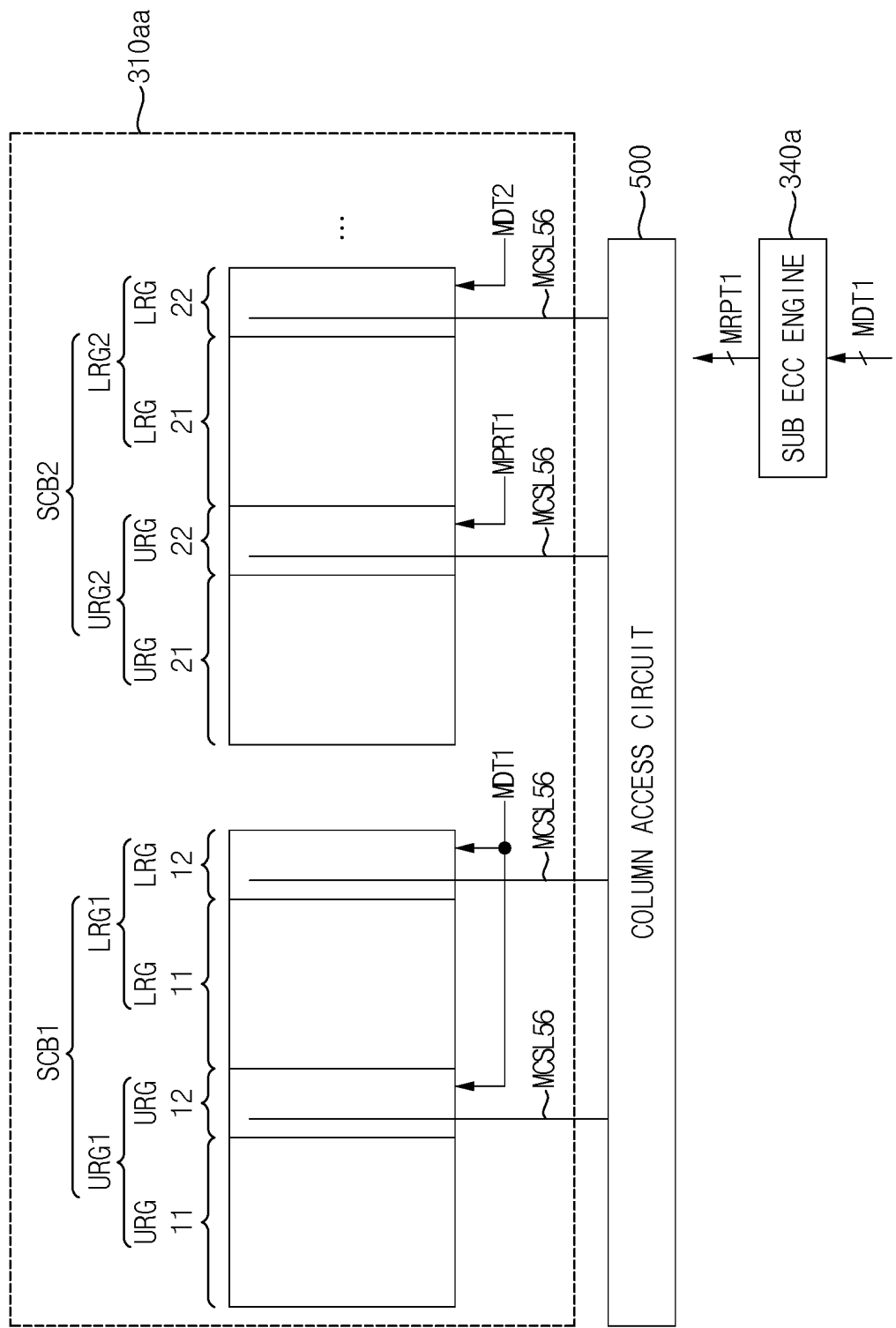

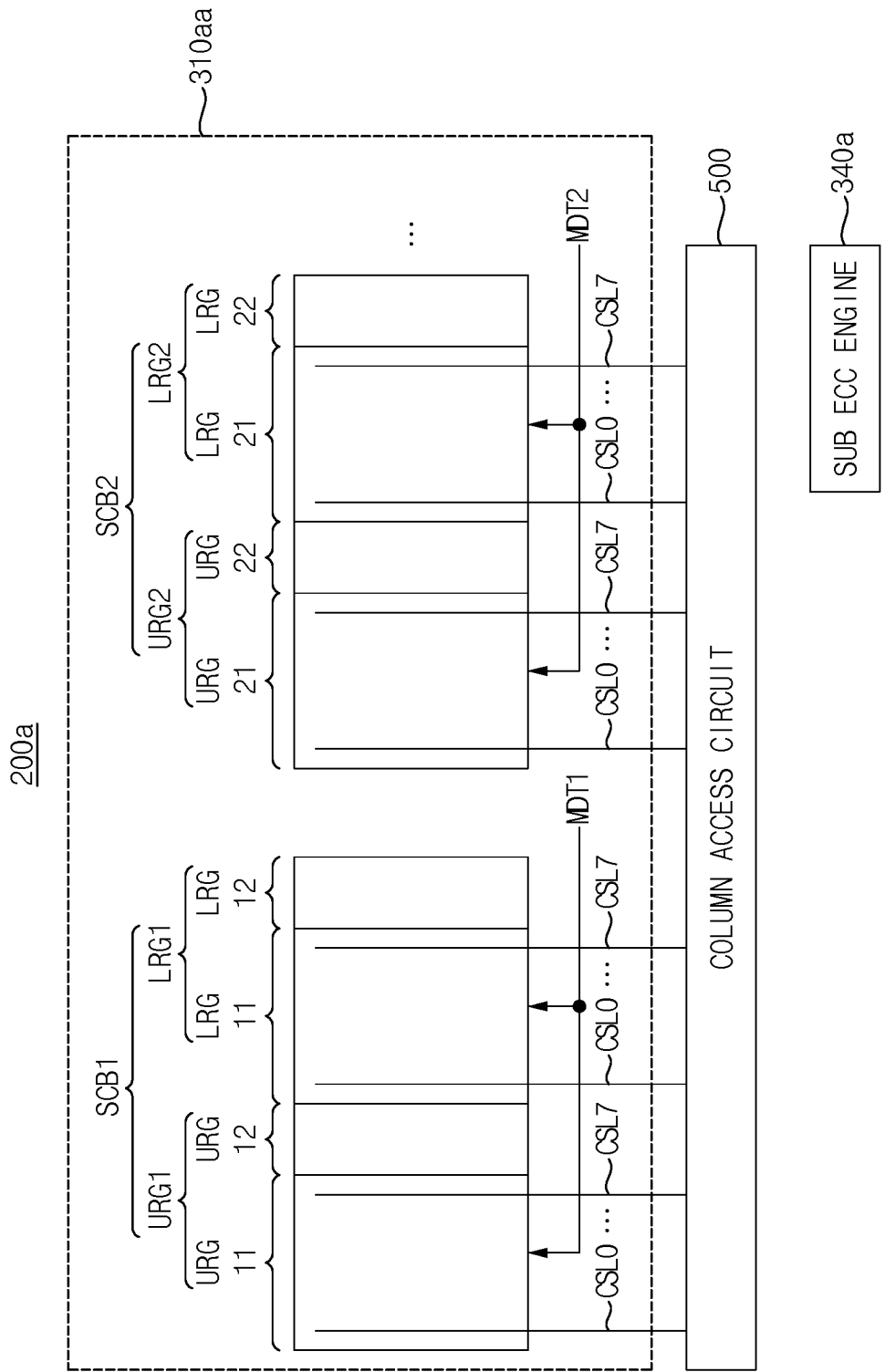

SEMICONDUCTOR MEMORY DEVICE AND METHOD FOR STORING META DATA IN SUB-ARRAY BLOCKS OF MEMORY CELL ARRAY

CROSS-REFERENCE TO RELATED APPLICATIONS

This application claims the benefit of priority under 35 USC § 119 to Korean Patent Application No. 10-2022-0187318, filed on Dec. 28, 2022, to Korean Patent Application No. 10-2022-0187329, filed on Dec. 28, 2022, to Korean Patent Application No. 10-2023-0007741, filed on Jan. 19, 2023, and to Korean Patent Application No. 10-2023-0062957, filed on May 16, 2023, in the Korean Intellectual Property Office, the disclosures of which are incorporated herein by references in their entirety.

BACKGROUND

The present disclosure relates to memories and more particularly to semiconductor memory devices to store meta data.

Semiconductor memory devices may be classified as volatile memory devices or nonvolatile memory devices. A volatile memory device refers to a memory device that loses data stored therein at power-off. As an example of a volatile memory device, a dynamic random access memory (DRAM) may be used in various devices such as a mobile system, a server, or a graphic device.

Meta data for managing a normal data may be provided to the semiconductor memory devices from a host.

SUMMARY

Example embodiments provide a semiconductor memory device capable of storing meta data.

Example embodiments ay provide a semiconductor memory device capable of individually generating meta parity data with respect to a meta data.

According to example embodiments, a semiconductor memory device includes a memory cell array and a column access circuit. The memory cell array includes a plurality of sub-array blocks arranged in a first direction and a second direction crossing the first direction, and each of the plurality of sub-array blocks includes a plurality of volatile memory cells. The column access circuit is coupled to the memory cell array through a plurality of bit-lines, receives a plurality of data units, each of which includes normal data and meta data having a ratio of k:1, which is associated with managing the normal data, allocates p column selection lines associated with transferring the plurality of data units to the plurality of bit-lines to a plurality of normal data and a plurality of meta data in the plurality of data units with the ratio of k:1, and stores a sub unit of a first normal data among the plurality of normal data and a sub unit of a first meta data, corresponding to the first normal data, among the plurality of meta data in a first region and a second region of a first sub-array block of the plurality of sub-array blocks, respectively.

According to example embodiments, a semiconductor memory device includes a memory cell array, a column access circuit an error correction code (ECC) engine and a first sub ECC engine. The memory cell array includes a plurality of sub-array blocks arranged in a first direction and a second direction crossing the first direction, and each of the plurality of sub-array blocks includes a plurality of volatile memory cells. The column access circuit is coupled to the memory cell array through a plurality of bit-lines, receives a plurality of data units, each of which includes normal data and meta data having a ratio of k:1, which is associated with managing the normal data, and allocates p column selection lines associated with transferring the plurality of data units to the plurality of bit-lines to a plurality of normal data and a plurality of meta data in the plurality of data units with the ratio of k:1. The ECC engine generates normal parity data by performing a first ECC encoding on first normal data from among the plurality of normal data. The first sub ECC engine generates first meta parity data by performing a second ECC encoding on first meta data, corresponding to the first normal data, among the plurality of meta data. The column access circuit stores the first normal data and the first meta data in a first region and a second region of a first sub-array block of the plurality of sub-array blocks, respectively and store the first meta parity data in a portion of a second region of a second sub-array block adjacent to the first sub-array block.

According to example embodiments, a semiconductor memory device includes a memory cell array, a column access circuit an error correction code (ECC) engine and a first sub ECC engine. The memory cell array includes a plurality of sub-array blocks arranged in a first direction and a second direction crossing the first direction, and each of the plurality of sub-array blocks includes a plurality of volatile memory cells. Each of the plurality of sub-array blocks includes an upper sub region and a lower sub region and each of the upper sub region and the lower sub region includes a first region and a second region The column access circuit is coupled to the memory cell array through a plurality of bit-lines, receives a plurality of data units, each of which includes normal data and a meta data having a ratio of k:1, which is associated with managing the normal data, and allocates p column selection lines associated with transferring the plurality of data units to the plurality of bit-lines to a plurality of normal data and a plurality of meta data in the plurality of data units with the ratio of k:1. The ECC engine generates normal parity data by performing a first ECC encoding on first normal data from among the plurality of normal data. The first sub ECC engine generates first meta parity data by performing a second ECC encoding on first meta data, corresponding to the first normal data, among the plurality of meta data. The column access circuit stores the first normal data in the first region in each of the upper sub region and the lower sub region of a first sub-array block of the plurality of sub-array blocks, stores the first meta data in the second region in each of the each of the upper sub region and the lower sub region of the first sub-array block and stores the first meta parity data in the second region in one of the upper sub region and the lower sub region of a second sub-array block of the plurality of sub-array blocks.

Therefore, in a semiconductor memory device according to example embodiments, meta data associated with managing normal data is stored in a portion of a sub-array block storing the normal data and normal parity data and a meta parity data are generated by individual ECC engines based on the normal data and the meta data, respectively. Accordingly, latency associated with generating the meta parity data may be reduced.

BRIEF DESCRIPTION OF THE DRAWINGS

Example embodiments will be described below in more detail with reference to the accompanying drawings.

FIG. 5A illustrates a portion of the semiconductor memory device of FIG. 3.

FIGS. 5B through 5E illustrate the sub-array blocks in the semiconductor memory device of FIG. 3, respectively, according to example embodiments.

FIG. 17 illustrates example commands which may be used in the memory system of FIG. 1.

FIGS. 19A, 19B, 20A, and 20B illustrate a portion of the semiconductor memory device of FIG. 3, respectively, according to example embodiments.

FIGS. 21A and 21B illustrate timing diagrams of write operation to store a normal data and a meta data, respectively, according to example embodiments.

FIGS. 23 and 24 illustrate an example of a semiconductor memory device, respectively, according to example embodiments.

DETAILED DESCRIPTION

Various example embodiments will be described more fully hereinafter with reference to the accompanying drawings, in which example embodiments are shown.

Figure 1:
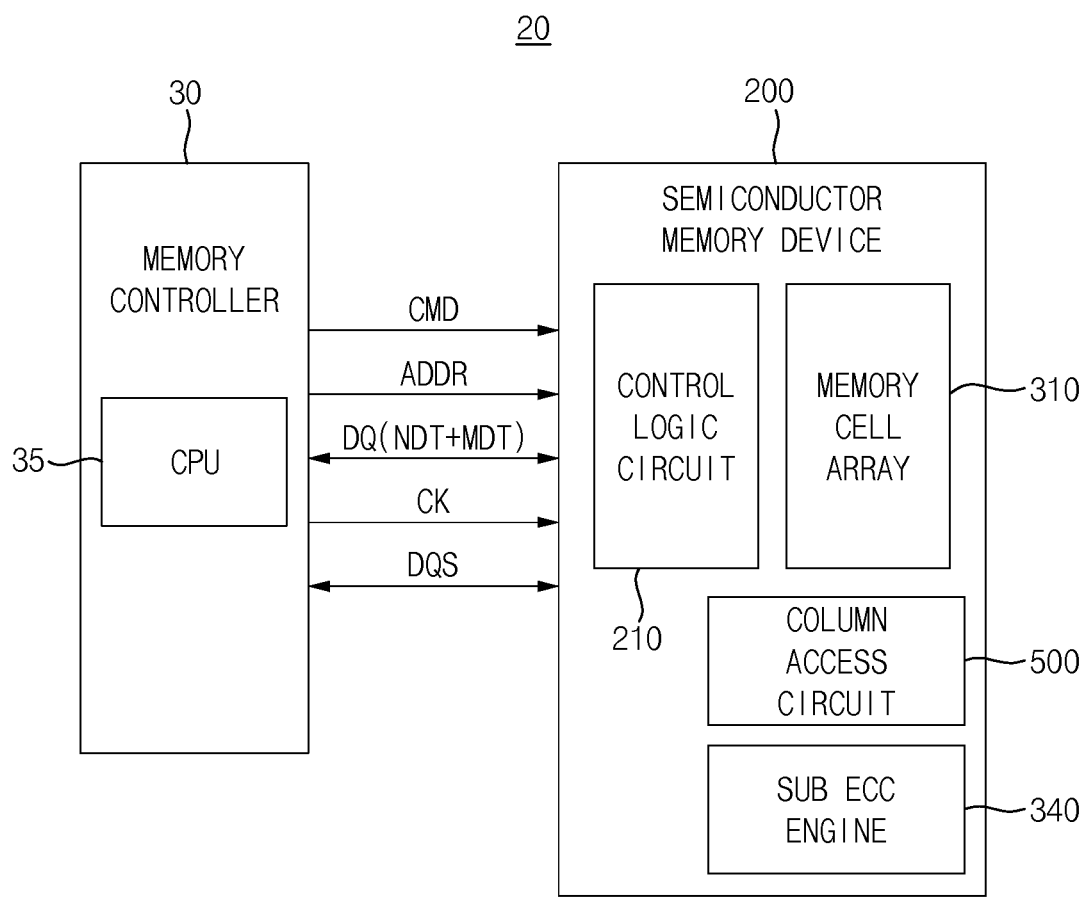
FIG. 1 is a block diagram illustrating a memory system according to example embodiments.

FIG. 1 is a block diagram illustrating a memory system according to example embodiments.

Referring to FIG. 1, a memory system 20 may include a memory controller 30 and a semiconductor memory device 200.

The memory controller 30 may control overall operation of the memory system 20. The memory controller 30 may control overall data exchange between an external host and the semiconductor memory device 200. For example, the memory controller 30 may write data in the semiconductor memory device 200 or read data from the semiconductor memory device 200 in response to a request from the host.

In addition, the memory controller 30 may issue operation commands to the semiconductor memory device 200 for controlling the semiconductor memory device 200. In some example embodiments, the semiconductor memory device 200 is a memory device including dynamic memory cells such as a dynamic random access memory (DRAM), double data rate 5 (DDR5) synchronous DRAM (SDRAM), a DDR6 SDRAM, or the like.

The memory controller 30 may transmit a clock signal CK (the clock signal CK may be referred to a command clock signal), a command CMD, and an address (signal) ADDR to the semiconductor memory device 200. Herein, for convenience of description, the terms of a clock signal CK, a command CMD, and an address ADDR and the terms of clock signals CK, commands CMD, and addresses ADDR may be used interchangeably with the same labels. The memory controller 30 may transmit a data strobe signal DQS to the semiconductor memory device 200 when the memory controller 30 writes data signal DQ in the semiconductor memory device 200. The semiconductor memory device 200 may transmit a data strobe signal DQS to the memory controller 30 when the memory controller 30 reads data signal DQ from the semiconductor memory device 200. The address ADDR may be accompanied by the command CMD and the address ADDR may be referred to as an access address.

The data signal DQ may be referred to a data unit and the data unit may include a normal data NDT and a meta data MDT associated with managing the normal data NDT. The normal data may be, for example, data to be accessed, whereas the meta data is used to manage the normal data. For example, the meta data may be used as parity data for correcting errors in corresponding normal data.

In a write operation, the memory controller 30 may transmit a plurality of data units consecutively to the semiconductor memory device 200 and in a read operation and the semiconductor memory device 200 may transmit the plurality of data units consecutively to the memory controller 30. The plurality of data units may constitute a page of the semiconductor memory device 200.

The memory controller 30 may include a central processing unit (CPU) 35 that controls overall operation of the memory controller 30.

The semiconductor memory device 200 may include a memory cell array 310 that stores the data from the data signal DQ, a control logic circuit 210, and a column access circuit 500. In example embodiments, the semiconductor memory device 200 may further include at least one sub error correction code (ECC) engine 340.

The control logic circuit 210 may control operations of the semiconductor memory device 200. The memory cell array 310 may include a plurality of bank arrays, and each of the plurality of bank arrays may include a plurality of sub-array blocks arranged in a first direction and a second direction crossing the first direction. Each of the plurality of sub-array blocks may include a plurality of volatile memory cells arranged in consecutive rows and columns. In addition, each of the plurality of bank arrays may be divided into a plurality of row blocks by a row block identity bit corresponding to a portion of bits of a row address, each of the plurality of row blocks may include corresponding sub-array blocks arranged in the first direction, and the plurality of row blocks may be arranged in the second direction crossing the first direction. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The column access circuit 500 may be coupled to the memory cell array 310 through a plurality of bit-lines. The column access circuit 500 may receive a plurality of data units DQ, each of which includes the normal data NDT and the meta data MDT having a specific ratio, for example a ratio of k:1 (k being a natural number greater than one), may allocate p column selection lines associated with transferring the plurality of data units to the plurality of bit-lines, to the plurality of normal data NDT and the plurality of meta data MDT with the ratio of k:1 and may sequentially store a sub unit of a first normal data from among the plurality of normal data NDT and a sub unit of a first meta data, corresponding the first normal data, from among the plurality of meta data MDT in a first region and a second region of a target sub-array block of the plurality of sub-array blocks, respectively, by activating two column selection lines of the p column selection lines.

In example embodiments, the column access circuit 500 may sequentially store the sub unit of the first meta data and the sub unit of the first normal data in the second region and the first region of the target sub-array block.

In addition, the column access circuit 500 may store sub units of the first meta data in second regions of target sub-array blocks such that the sub units of the first meta data are not both included in the second regions of the target sub-array blocks.

The at least one sub ECC engine 340 may generate a meta parity data by performing an ECC encoding on the meta data MDT separately from the normal data NDT and may store the meta parity data in a portion of the target sub-array blocks.

The semiconductor memory device 200 performs a refresh operation periodically due to charge leakage of memory cells storing data. Due to scaling down of the manufacturing process of the semiconductor memory device 200, the storage capacitance of the memory cell is decreased and the refresh period is shortened. The refresh period is further shortened because the total amount of memory cells to refresh increases as the memory capacity of the semiconductor memory device 200 is increased, so to perform overall refresh in the same amount of time, the refresh period for each group of cells should be shortened.

Figure 2A:
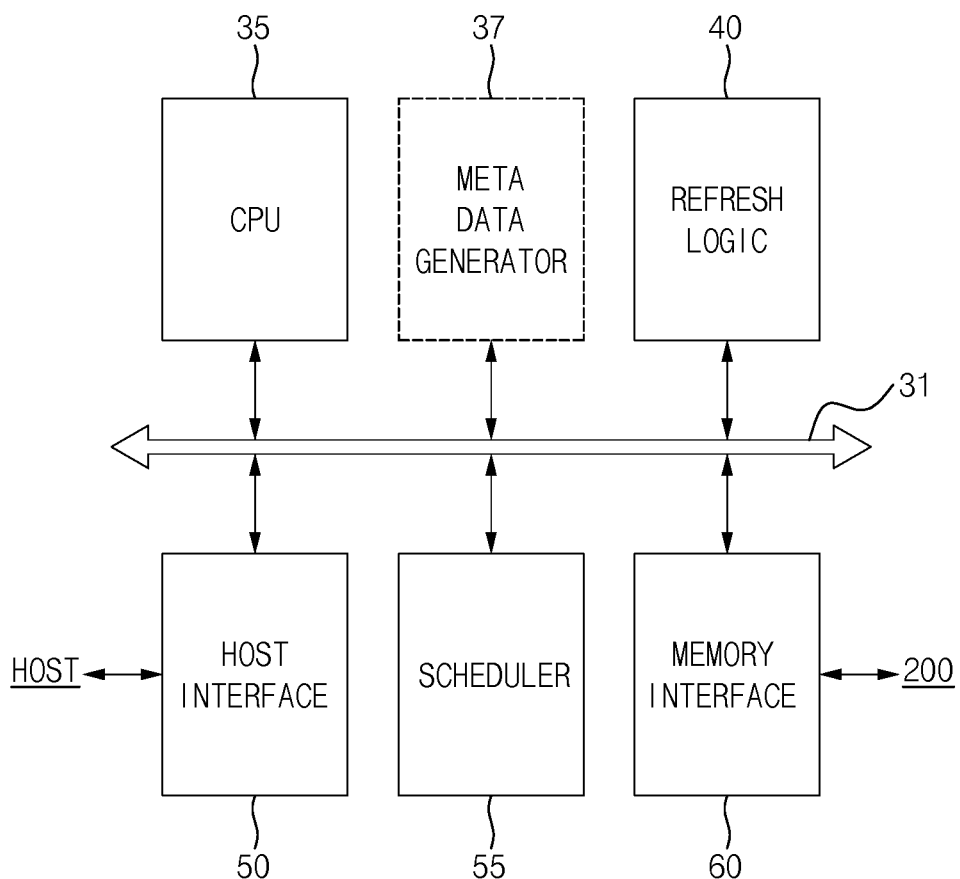
FIG. 2A is a block diagram illustrating the memory controller in FIG. 1 according to example embodiments.

FIG. 2A is a block diagram illustrating an example of the memory controller in FIG. 1 according to example embodiments.

Referring to FIG. 2A, the memory controller 30 may include the CPU 35, a refresh logic 40, a host interface 50, a scheduler 55 and a memory interface 60 which are connected to each other through a bus 31. The memory controller 30 may further include a meta data generator 37 and the meta data generator 37 may be connected to the bus 31.

The CPU 35 may control overall operation of the memory controller 30. The CPU 35 may control the refresh logic 40, the host interface 50, the scheduler 55, the memory interface 60 and the meta data generator 37 through the bus 31.

The refresh logic 40 may generate auto refresh commands for refreshing memory cells of the plurality of memory cell rows based on a refresh interval of the semiconductor memory device 200.

The host interface 50 may perform interfacing with a host. The memory interface 60 may perform interfacing with the semiconductor memory device 200.

The scheduler 55 may manage scheduling and transmission of sequences of commands generated in the memory controller 30. The scheduler 55 may transmit the active command and a subsequent command to the semiconductor memory device 200 via the memory interface 60 and the semiconductor memory device 200 may perform a memory operation on target memory cells in response to the subsequent command.

The meta data generator 37 may generate the meta data MDT for managing the normal data NDT. The meta data MDT may also be provided from the host.

Figure 2B:
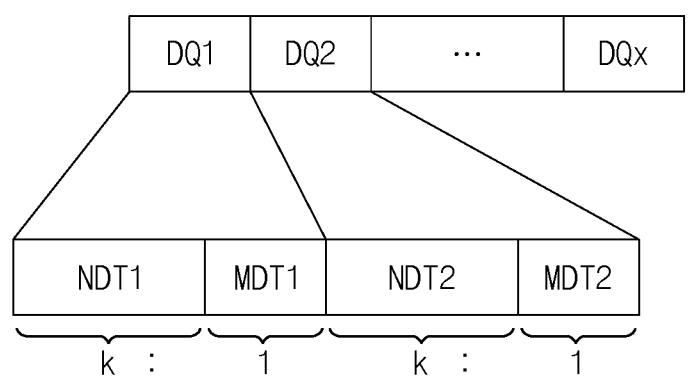
FIG. 2B illustrates an example configuration of each of the plurality of data units in FIG. 1 according to example embodiments.

FIG. 2B illustrates an example configuration of each of the plurality of data units in FIG. 1 according to example embodiments.

Referring to FIG. 2B, a plurality of data units DQ1, DQ2, . . . , DQx corresponding to one page of the memory cell array 310 may be consecutively transmitted between the memory controller 30 and the semiconductor memory device 200. Here, x is a natural number equal to or greater than three.

A first data unit DQ1 from among the plurality of data units DQ1, DQ2, . . . , DQx may include a first normal data NDT1 and a first meta data MDT1, and a number of bits in the first normal data NDT1 and a number of bits in the first meta data MDT1 may have a ratio of k:1. A second data unit DQ2 from among the plurality of data units DQ1, DQ2, . . . , DQx may include a second normal data NDT2 and a second meta data MDT2, and a number of bits in the second normal data NDT2 and a number of bits in the second meta data MDT2 may have a ratio of k:1. In example embodiments, k may be 8 or 16, however, embodiments are not limited thereto.

Figure 3:
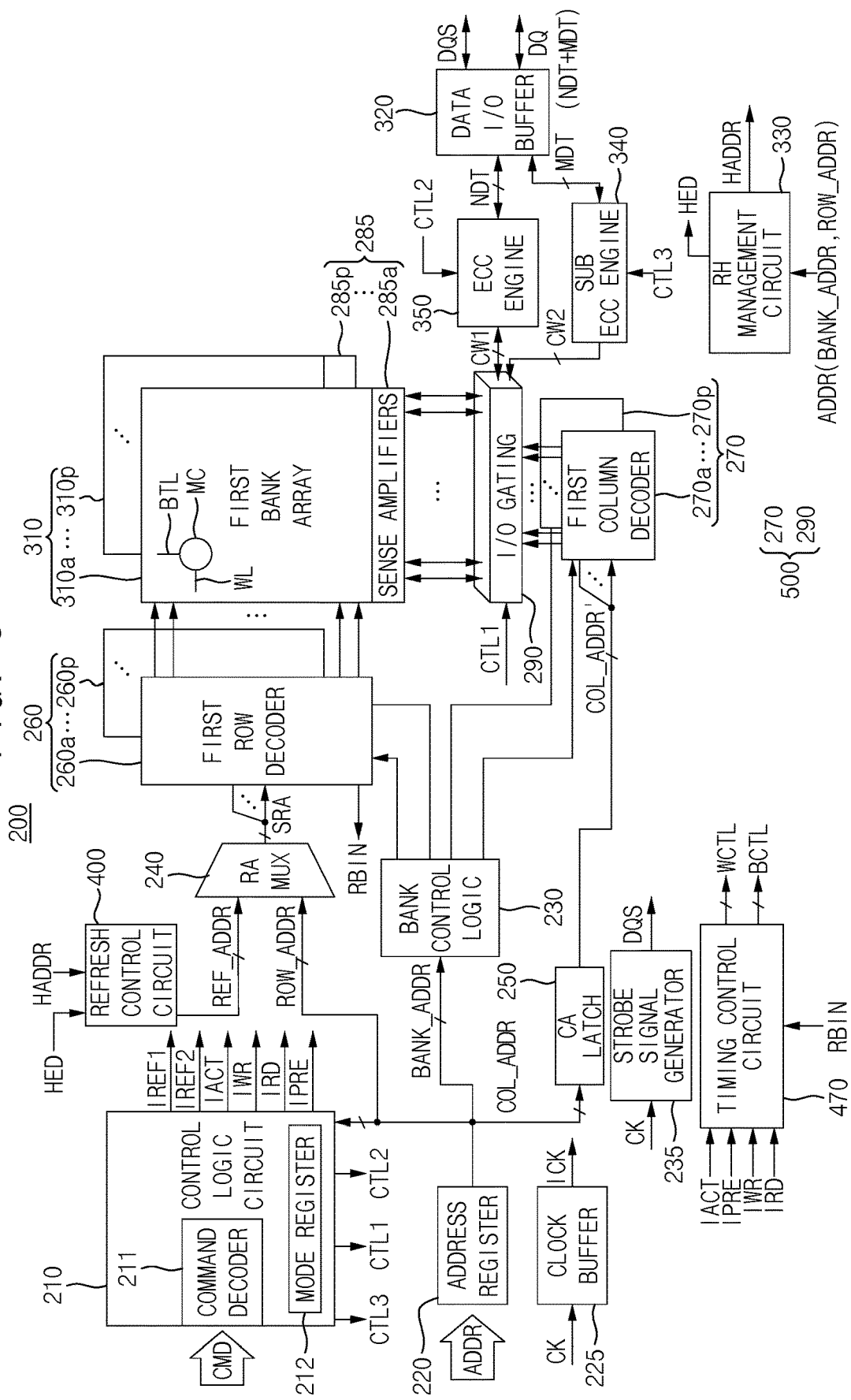
FIG. 3 is a block diagram illustrating an example of the semiconductor memory device in FIG. 1 according to example embodiments.

FIG. 3 is a block diagram illustrating an example of the semiconductor memory device in FIG. 1 according to example embodiments.

Referring to FIG. 3, the semiconductor memory device 200 may include the control logic circuit 210, an address register 220, a bank control logic 230, a refresh control circuit 400, a row address multiplexer 240, a column address latch 250, a row decoder 260, a column decoder 270, the memory cell array 310, a sense amplifier unit 285, an input/output (I/O) gating circuit 290, an ECC engine 350, a clock buffer 225, a strobe signal generator 235, a row hammer (RH) management circuit 330, a timing control circuit 470, the at least one sub ECC engine 340 and a data I/O buffer 320. The column decoder 270 and the I/O gating circuit 290 may correspond to the column access circuit 500 in FIG. 1.

The memory cell array 310 may include first through sixteenth bank arrays 310a~310p. The row decoder 260 may include first through sixteenth row decoders 260a~260p respectively coupled to the first through sixteenth bank arrays 310a~310p, the column decoder 270 may include first through sixteenth column decoders 270a~270p respectively coupled to the first through sixteenth bank arrays 310a~310p, and the sense amplifier unit 285 may include first through sixteenth sense amplifiers 285a~285p respectively coupled to the first through sixteenth bank arrays 310a~310p.

The first through sixteenth bank arrays 310a~310p, the first through sixteenth row decoders 260a~260p, the first through sixteenth column decoders 270a~270p and the first through sixteenth sense amplifiers 285a~285p may form first through sixteenth banks. Each of the first through sixteenth bank arrays 310a~310p includes a plurality of memory cells MC formed at intersections of a plurality of word-lines WL and a plurality of bit-lines BTL.

The address register 220 may receive the address ADDR including a bank address BANK_ADDR, a row address ROW_ADDR and a column address COL_ADDR from the memory controller 30. The address register 220 may provide the received bank address BANK_ADDR to the bank control logic 230, may provide the received row address ROW_ADDR to the row address multiplexer 240, may provide the received column address COL_ADDR to the column address latch 250 and may provide the received bank address BANK_ADDR and the received row address ROW_ADDR to the row hammer management circuit 330.

The bank control logic 230 may generate bank control signals in response to the bank address BANK_ADDR. One of the first through sixteenth row decoders 260a~260p corresponding to the bank address BANK_ADDR is activated in response to the bank control signals, and one of the first through sixteenth column decoders 270a~270p corresponding to the bank address BANK_ADDR is activated in response to the bank control signals.

The row address multiplexer 240 may receive the row address ROW_ADDR from the address register 220, and may receive a refresh row address REF_ADDR from the refresh control circuit 400. The row address multiplexer 240 may selectively output the row address ROW_ADDR or the refresh row address REF_ADDR as a row address SRA. The row address SRA that is output from the row address multiplexer 240 is applied to the first through sixteenth row decoders 260a~260s.

The refresh control circuit 400 may sequentially increase or decrease the refresh row address REF_ADDR in a normal refresh mode in response to first and second refresh control signals IREF1 and IREF2 from the control logic circuit 210. The refresh control circuit 400 may receive a hammer address HADDR and a hammer event detection signal HED in a hammer refresh mode, and may output one or more hammer refresh row addresses designating one or more victim memory cell rows physically adjacent to a memory cell row corresponding to the hammer address as the refresh row address REF_ADDR.

The activated one of the first through sixteenth row decoders 260a~260s, by the bank control logic 230, may decode the row address SRA that is output from the row address multiplexer 240, and may activate a word-line corresponding to the row address SRA. For example, the activated row decoder applies a word-line driving voltage to the word-line corresponding to the row address. In addition, the activated row decoder may provide the timing control signal 470 with a row block information signal RBIN designating a row block identified by a portion of bits of the row address SRA.

The column address latch 250 may receive the column address COL_ADDR from the address register 220, and may temporarily store the received column address COL_ADDR. In some embodiments, in a burst mode, the column address latch 250 may generate column addresses COL_ADDR' that increment from the received column address COL_ADDR. The column address latch 250 may apply the temporarily stored or generated column address COL_ADDR' to the first through sixteenth column decoders 270a~270s.

The activated one of the first through sixteenth column decoders 270a~270s activates a sense amplifier corresponding to the bank address BANK_ADDR and the column address COL_ADDR through the I/O gating circuit 290.

The I/O gating circuit 290 may include a circuitry for gating input/output data, and may further include input data mask logic, read data latches for storing a codeword that is output from the first through sixteenth bank arrays 310a~310s, and write drivers for writing data to the first through sixteenth bank arrays 310a~310s.

Codeword CW1 read from a selected one bank array of the first through sixteenth bank arrays 310a~310s is sensed by a sense amplifier coupled to the selected one bank array from which the data is to be read, and is stored in the read data latches. The codeword CW1 stored in the read data latches may be provided to the data I/O buffer 320 as the normal data NDT after ECC decoding is performed on the codeword CW1 by the ECC engine 350. Codeword CW2 read from a selected one bank array of the first through sixteenth bank arrays 310a~310s is sensed by a sense amplifier coupled to the selected one bank array from which the data is to be read, and is stored in the read data latches. The codeword CW2 stored in the read data latches may be provided to the data I/O buffer 320 as the meta data MDT after ECC decoding is performed on the codeword CW2 by the at least one sub ECC engine 340.

The data I/O buffer 320, in a write operation, may convert the data unit DQ into the normal data NDT and the meta data MDT, may provide the normal data NDT to the ECC engine 350 and may provide the meta data MDT to the at least one sub ECC engine 340. The data I/O buffer 320, in a read operation, may convert the normal data NDT and the meta data MDT into the data unit DQ and may transmit the data unit DQ along with the data strobe signal DQS to the memory controller 30.

The ECC engine 350 may generate a normal parity data by performing a first ECC encoding on the normal data NDT, may provide the first codeword CW1 including the normal data NDT and the normal parity data to the I/O gating circuit 290 and may control a first ECC decoding on the first codeword CW1 based on a second control signal CTL2 from the control logic circuit 210.

A first sub ECC engine of the at least one sub ECC engine 340 may generate a first meta parity data by performing a second ECC encoding on the meta data MDT, may provide the second codeword CW2 including the meta data NDT and the first meta parity data to the I/O gating circuit 290 and may control a second ECC decoding on the second codeword CW2 based on a third control signal CTL3 from the control logic circuit 210.

A second sub ECC engine of the at least one sub ECC engine 340 may generate a second meta parity data by performing a third ECC encoding on the plurality of meta data MDT, may provide a third codeword including the plurality of meta data NDT and the second meta parity data to the I/O gating circuit 290 and may control a third ECC decoding on the third codeword based on the third control signal CTL3.

The clock buffer 225 may receive the clock signal CK, may generate an internal clock signal ICK by buffering the clock signal CK, and may provide the internal clock signal ICK to circuit components processing the command CMD and the address ADDR.

The strobe signal generator 235 may receive the clock signal CK, may generate the data strobe signal DQS based on the clock signal CK.

The row hammer management circuit 330 may receive the access address ADDR including the bank address BANK_ADDR and the row address ROW_ADDR from the memory controller 30, may count the number of access associated with each of the plurality of memory cell rows based on the access address ADDR (i.e., active command from the memory controller 30) to store the counted values in count cells of each of the plurality of memory cell rows as count data, and may determine a hammer address HADDR associated with at least one of the plurality of memory cell rows, which is intensively accessed, based on the counted values. Herein, the terms "intensively accessed" may mean that a particular memory cell row is accessed equal to or more than a reference number of times. The row hammer management circuit 330 may provide the refresh control circuit 400 with the hammer address HADDR and the hammer event detection signal HED indicating that a row hammer occurs.

The control logic circuit 210 may control operations of the semiconductor memory device 200. For example, the control logic circuit 210 may generate control signals for the semiconductor memory device 200 in order to perform a write operation, a read operation, a normal refresh operation and a hammer refresh operation. The control logic circuit 210 includes a command decoder 211 that decodes the command CMD received from the memory controller 30 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may provide a first control signal CTL1 to the I/O gating circuit 290, may provide the second control signal CTL2 to the ECC engine 350 and may provide the third control signal CTL3 to the at least one sub ECC engine 340. In addition, the command decoder 211 may generate internal command signals including the first refresh control signal IREF1, the second refresh control signal IREF2, an active signal IACT, a precharge signal IPRE, a read signal IRD and a write signal IWR by decoding the command CMD.

The timing control circuit 470 may receive the active signal IACT, the precharge signal IPRE, the read signal IRD, the write signal IWR and the row block information signal RBIN and may generate a word-line control signal WCTL for controlling word-lines and a bit-line control signal BCTL for controlling bit-lines. The timing control circuit 470 may provide the word-line control signal WCTL and the bit-line control signal BCTL to the memory cell array 310.

Figure 4:
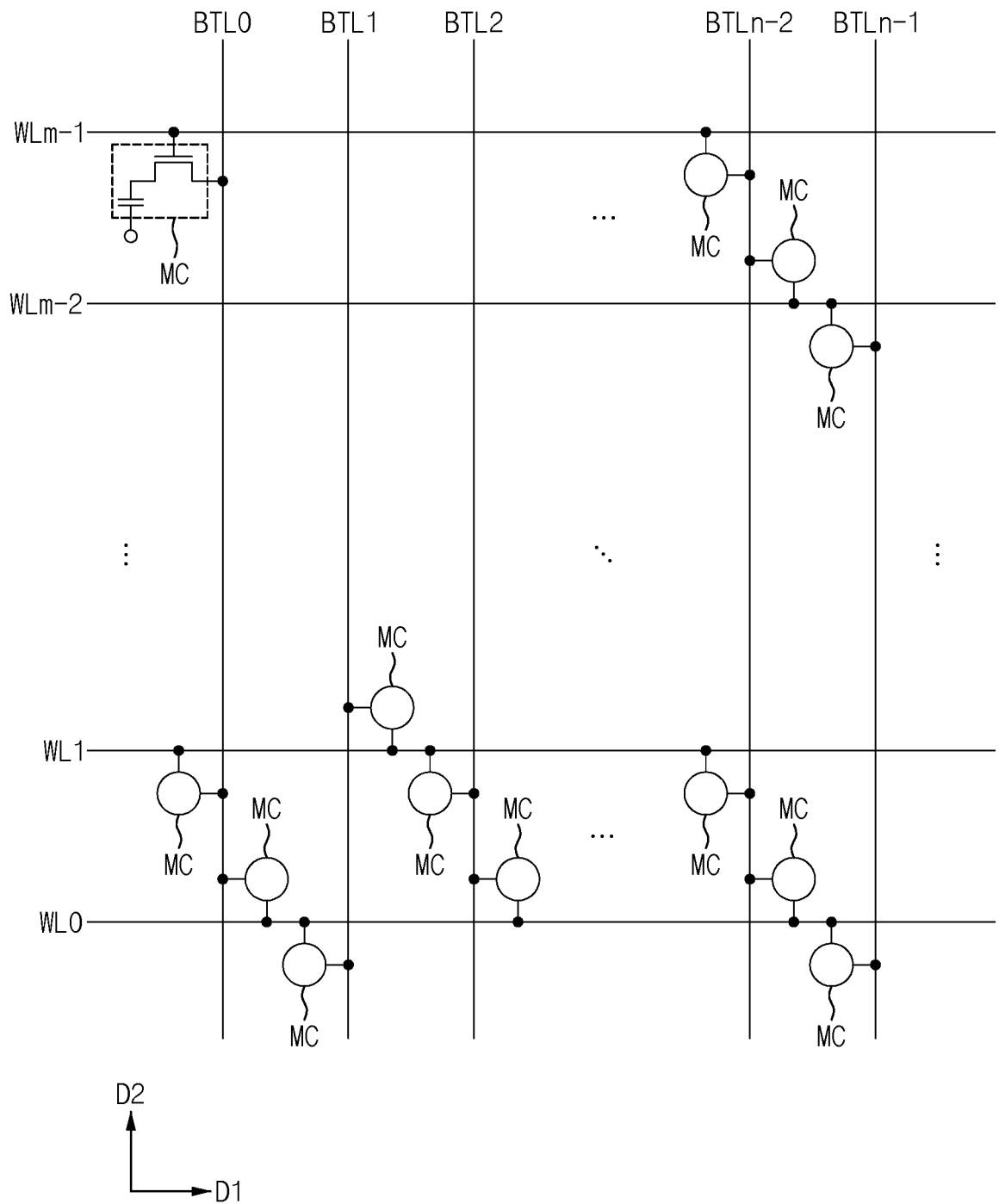
FIG. 4 illustrates an example of the first bank array in the semiconductor memory device of FIG. 3 according to example embodiments.

FIG. 4 illustrates an example of the first bank array in the semiconductor memory device of FIG. 3 according to example embodiments.

Referring to FIG. 4, the first bank array 310a may include a plurality of word-lines WL0~WLm-1 (m is an even natural number equal to or greater than two), a plurality of bit-lines BTL0~BTLn-1 (n is a even natural number equal to or greater than two), and a plurality of memory cells MCs disposed at intersections between the word-lines WL0~WLm-1 and the bit-lines BTL0~BTLn-1. Each of the memory cells MCs may include a cell transistor coupled to a respective word-line of the word-lines WL0~WLm-1 and a respective bit-line of the bit-lines BTL0~BTLn-1 and a cell capacitor coupled to the cell transistor. Each of the memory cells MCs may have a DRAM cell structure. In addition, the memory cells MCs may have a different arrangement depending on that the memory cells MCs are coupled to an even word-line (for example, WL0) or an odd word-line (for example, WL1). Each of the word-lines WL0~WLm-1 extends in the first direction D1 and each of the bit-lines BTL0~BTLn-1 extends in the second direction D2 crossing the first direction D1.

The word-lines WL0~WLm-1 coupled to the plurality of memory cells MCs may be referred to as rows of the first bank array 310a and the bit-lines BTL0~BTLn-1 coupled to the plurality of memory cells MCs may be referred to as columns of the first bank array 310a.

FIG. 5A illustrates a portion of the semiconductor memory device of FIG. 3.

In FIG. 5A, the first bank array 310a and the column access circuit 500 of the semiconductor memory device 200 of FIG. 3 are illustrated. The column access circuit 500 may include the I/O gating circuit 290 and the first column decoder 270a.

Referring to FIG. 5A, the first bank array 310a may include a plurality of sub-array blocks SCBa, . . . , SCBh, RSCB which are arranged in the first direction D1 and are connected to a word-line WLj, and the I/O gating circuit 290 may include a plurality of column selection switches SW11a, SW12a, . . . , SW2a, . . . , SW11h, SW12h, . . . , SW2h, SW11z, SW12z, . . . , SW2z connected to the first column decoder 270a and the plurality of sub-array blocks SCBa, . . . , SCBh, RSCB.

Each of the column selection switches SW11a, SW12a, . . . , SW2a may connect respective y bit-lines coupled to memory cells 311_1, 311_2, . . . , 311_f in the sub-array block SCBa to a corresponding one of column selection lines CSL1, CSL2, . . . , CSLf. Here, f is a natural number equal to or greater than three and y is a natural number equal to or greater than two. Each of the column selection switches SW11h, SW12h, . . . SW2h may connect respective y bit-lines coupled to memory cells in the sub-array block SCBh to a corresponding one of the column selection lines CSL1, CSL2, . . . , CSLf. Each of the column selection switches SW11z, SW12z, . . . , SW2z may connect respective y bit-lines coupled to memory cells in the sub-array block RSCB to a corresponding one of the column selection lines CSL1, CSL2, . . . , CSLf. The sub-array block RSCB may be referred to as a redundancy sub-array block. In FIG. 5A, it is assumed that a number of the sub-array blocks SCBa, . . . , SCBh includes sub-array blocks except the redundancy sub-array block RSCB, however, example embodiments are not limited thereto.

Therefore, y may represent a number of memory cells selected by one of the column selection lines CSL1, CSL2, . . . , CSLf and y may be determined based on data I/O unit, a size of pre-fetched data and/or a burst length of the semiconductor memory device 200.

In example embodiments, y may be 8 or 16, however, example embodiments are not limited thereto.

When the column selection line CSL0 is selected (or, activated), memory cells such as the memory cells 311_1 may be accessed in each of the sub-array blocks SCBa, . . . , SCBh.

The column access circuit 500 may allocate the column selection line CSLh to the meta data and may allocate the CSL1, CSL2, . . . to the normal data from among the column selection lines CSL1, CSL2, . . . , CSLf. In example embodiments, when the column access circuit 500 activates a specific column selection line having a specific number, memory cells coupled to the specific column selection line may be accessed in each of the sub-array blocks SCBa, . . . , SCBh. In other example embodiments, when the column access circuit 500 activates the specific column selection line having the specific number, memory cells coupled to the specific column selection line may be accessed in a specific sub-array block from among the sub-array blocks SCBa, . . . , SCBh.

In example embodiments, each of the sub-array blocks SCBa, . . . , SCBh may include an upper sub region and a lower sub region and y bit-lines may be coupled to one column selection line in each of the upper sub region and the lower sub region.

FIGS. 5B through 5E illustrate the sub-array blocks in the semiconductor memory device of FIG. 3, respectively, according to example embodiments.

In FIGS. 5B through 5E, the first bank array 310a and the column access circuit 500 of the semiconductor memory device 200 are illustrated.

Referring to FIGS. 5B through 5E, each of the plurality of sub-array blocks SCBa, . . . , SCBh may include an upper sub region URG1 and a lower sub region LRG1 and y bit-lines may be coupled to one column selection line in each of the upper sub region URG1 and the lower sub region LRG1, the upper sub region URG1 may include a first region URG11 and a second region URG12 and the lower sub region LRG1 may include a first region LRG11 and a second region LRG12. The redundancy sub-array block RSCB may include a first region RG1 and a second region RG2. The upper and lower designation of the sub regions may correspond to regions including upper bit-lines and lower bit-lines respectively. For example, bit-lines on one side/end of a series of consecutive bit-lines may be considered upper bit-lines, and may correspond upper bits of a bit string, and bit-lines on another side/end may be considered lower bit-lines, and may correspond to lower bits of a bit string.

Referring to FIG. 5B, the column access circuit 500 may perform a write operation to store a first sub unit of the normal data in each of the first regions URG11 and LRG11 of each of the sub-array blocks SCBa, . . . , SCBh or may perform a read operation to read the first sub unit of the normal data from each of the first regions URG11 and LRG11 of each of the sub-array blocks SCBa, . . . , SCBh by activating a first column selection line CSL0 in each of the first regions URG11 and LRG11 of each of the sub-array blocks SCBa, . . . , SCBh. When the column access circuit 500 activates the first column selection line CSL0 in each of the first regions URG11 and LRG11 of each of the sub-array blocks SCBa, . . . , SCBh, the column access circuit 500 activates the first column selection line CSL0 in the redundancy sub-array block RSCB.

Figure 5C:
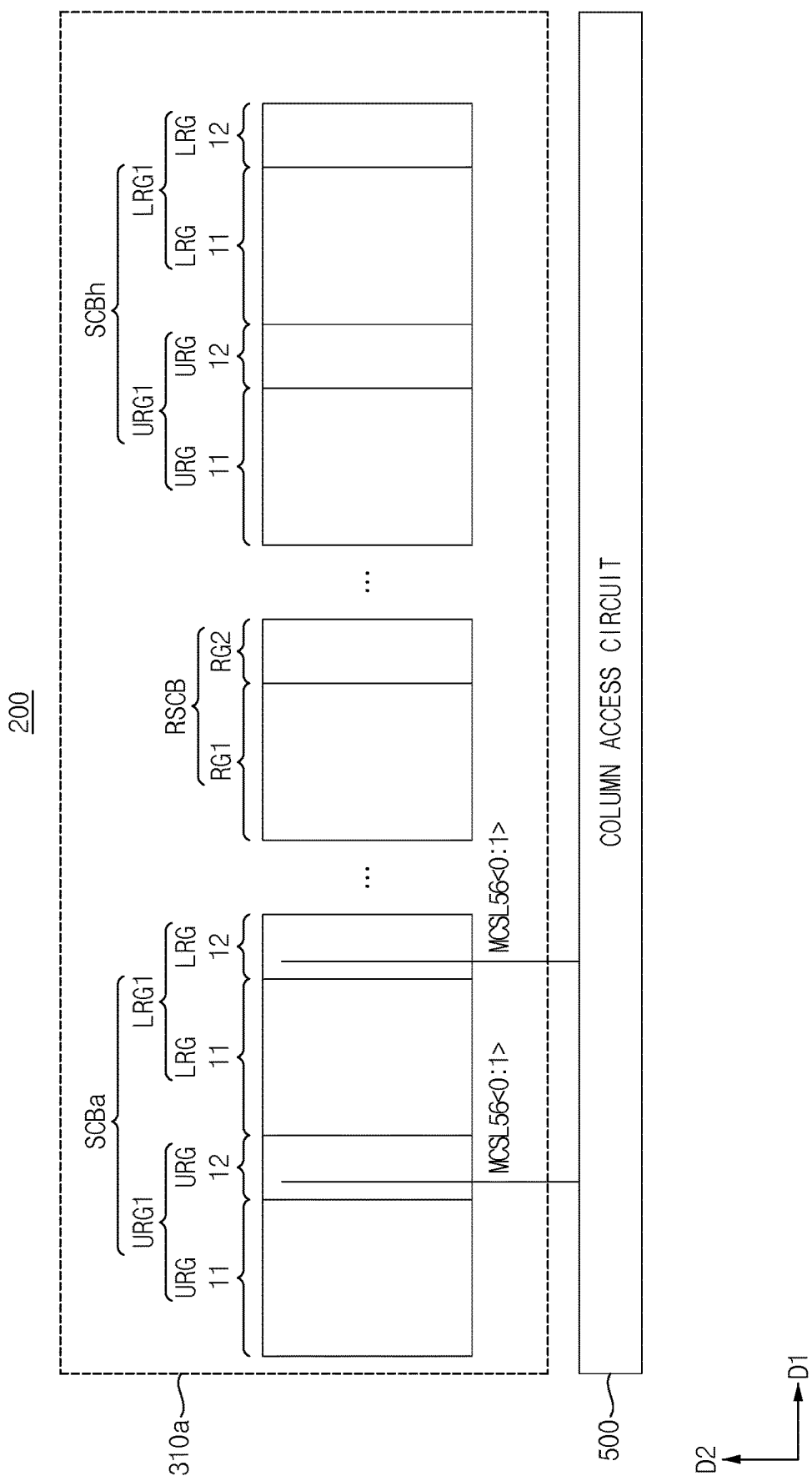

Referring to FIG. 5C, the column access circuit 500 may perform a write operation to store a first sub unit MCSL56<0:1> of the meta data, corresponding to the first sub unit of the normal data, in each of the second regions URG12 and LRG12 of the sub-array block SCBa, or may perform a read operation to read the first unit MCSL56<0:1> of the meta data from each of the second regions URG12 and LRG12 of the sub-array block SCBa by activating a first meta column selection line MCSL56 in each of the first regions URG11 and LRG11 of the sub-array blocks SCBa. When the column access circuit 500 activates the first meta column selection line MCSL56 in each of the first regions URG11 and LRG11 of the sub-array blocks SCBa, the column access circuit 500 activates the first meta column selection line MCSL56 in the second region RG2 of the redundancy sub-array block RSCB.

Figure 5D:
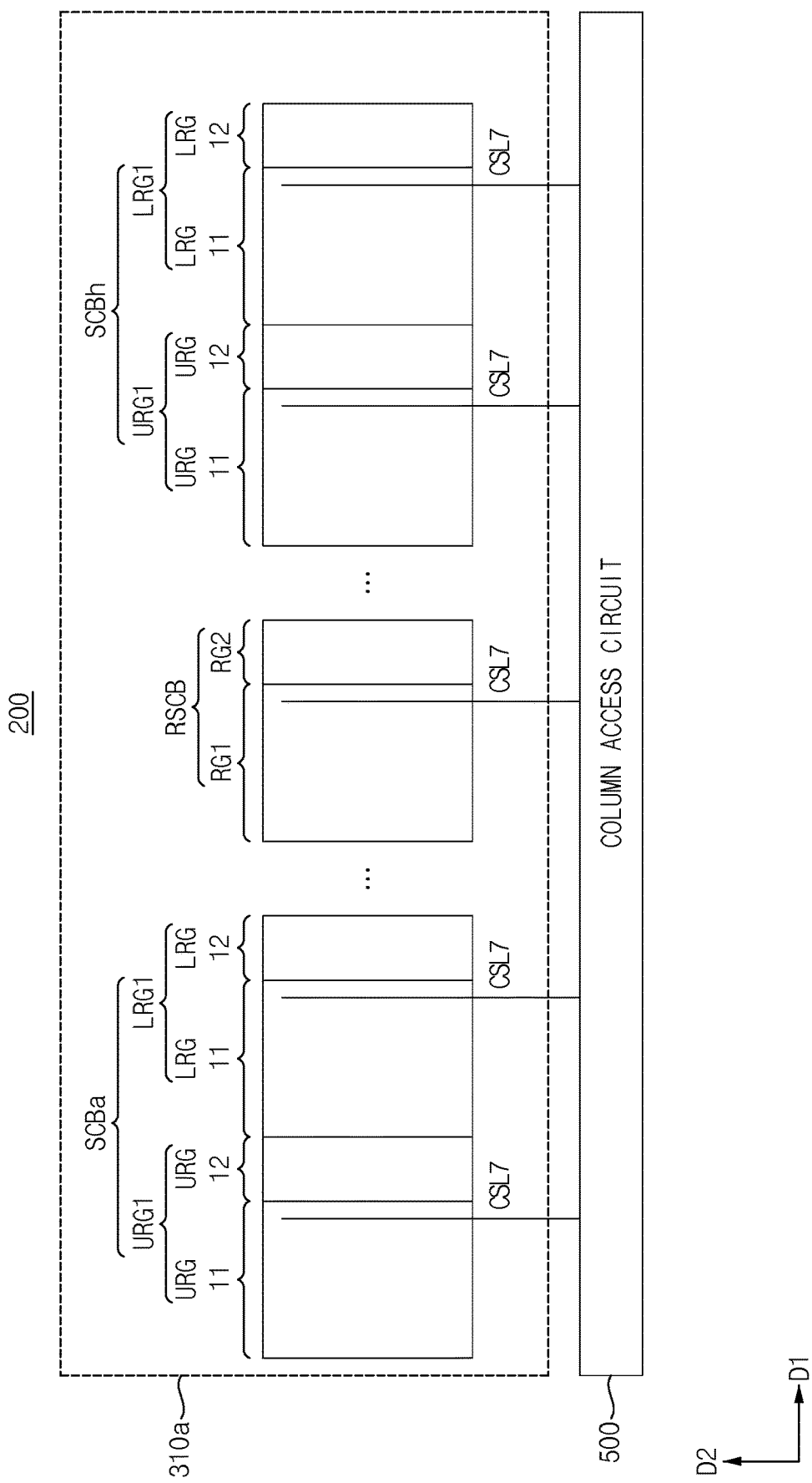

Referring to FIG. 5D, the column access circuit 500 may perform a write operation to store an eighth sub unit of the normal data in each of the first regions URG11 and LRG11 of each of the sub-array blocks SCBa, . . . , SCBh or may perform a read operation to read the eighth sub unit of the normal data from each of the first regions URG11 and LRG11 of each of the sub-array blocks SCBa, . . . , SCBh by activating an eighth column selection line CSL7 in each of the first regions URG11 and LRG11 of each of the sub-array blocks SCBa, . . . , SCBh. When the column access circuit 500 activates the eighth column selection line CSL7 in each of the first regions URG11 and LRG11 of each of the sub-array blocks SCBa, SCBh, the column access circuit 500 activates the eighth column selection line CSL7 in the first region RG1 of the redundancy sub-array block RCSB.

Figure 5E:
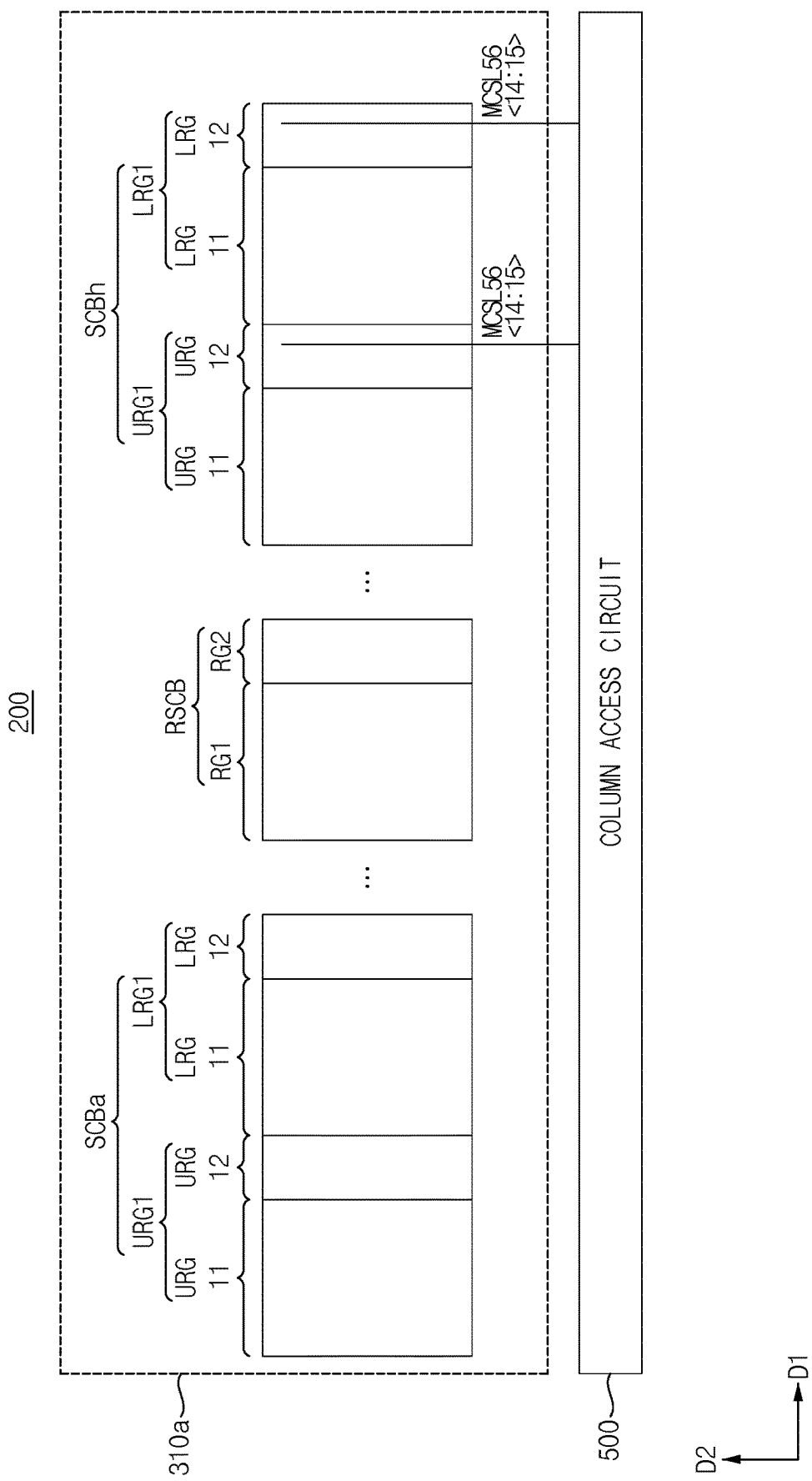

Referring to FIG. 5E, the column access circuit 500 may perform a write operation to store an eighth sub unit MCSL56<14:15> of the meta data, corresponding to the eighth sub unit of the normal data in each of the second regions URG12 and LRG12 of the sub-array block SCBh or may perform a read operation to read the eighth sub unit MCSL56<14:15> of the meta data from each of the second regions URG12 and LRG12 of the sub-array block SCBh by activating a first meta column selection line MCSL56 in each of the second regions URG12 and LRG12 of the sub-array blocks SCBh. When the column access circuit 500 activates the first column selection line CSL0 in each of the first regions URG11 and LRG11 of each of the sub-array blocks SCBa, . . . , SCBh, the column access circuit 500 activates the first column selection line CSL0 in the first region RG1 of the redundancy sub-array block RCSB.

For example, while the column access circuit 500 sequentially stores the sub units of a first normal data in the first regions URG11 and LRG11 of the sub-array block SCBa by sequentially activating the column selection lines CSL0~CSL7, the column access circuit 500 sequentially stores the sub units of a first meta data in the second regions URG12 and LRG12 of the sub-array block SCBa, . . . , SCBh by sequentially activating the first meta column selection line MCSL56<0:15>. In FIGS. 5B through 5E, k representing a ratio between the normal data and the meta data may be determined based on a number of the sub-array blocks SCBa, . . . , SCBh included in one row block in the first direction D1. Because a number of the sub-array blocks SCBa, . . . , SCBh in FIGS. 5B through 5E is 8 and each of the sub-array blocks SCBa, . . . , SCBh includes the upper sub region URG1 and the lower sub region LRG1, a number of sub regions coupled to the word-line WLj is 16 and k may be 8 or 16, which is a submultiple of 16.

When a bank array including memory cells includes a plurality of sub-array blocks (except a redundancy sub-array block), each of the plurality of sub-array blocks may include a normal data storage region and a meta data storage region, As mentioned above, in each of the plurality of sub-array blocks, a size of the normal data storage region and a size of the meta data storage region have a ratio of k:1. For example, q column selection lines (e.g., CSL0~CSLq-1) are normal column selection lines and may correspond to the normal data storage region and r column selection lines (e.g., CSLq~CSLq+r-1) are meta column selection lines and may correspond to the meta data storage region.

In this case, the k normal column selection lines may correspond to one meta column selection line according to an order of the column selection line. For example, the column selection lines CSL0~CSLk-1 may correspond to the meta column selection line CSLq, the column selection lines CSLk~CSL2k-1 may correspond to the meta column selection line CSLq+1 and the column selection lines CSLq-k~CSLq-1 may correspond to the meta column selection line CSLq+r-1. When the normal data is stored in the normal data storage region coupled to the column selection lines CSL0~CSLk-1, corresponding meta data may be stored in the meta data storage region coupled to the meta column selection line CSLq corresponding to the column selection lines CSL0~CSLk-1.

In example embodiments, the meta data corresponding to each of the k normal column selection lines may be stored in a meta data storage region in each of different sub-array blocks. Each of the k normal column selection lines may correspond to meta data storage regions of h/k different sub-array blocks. For example, if the number of the sub-array blocks is 16 (assuming that k is still 8), each of the column selection lines may correspond to 2 (i.e., h/k) sub-array blocks. That is, CSL0 may correspond to the sub-array blocks SCB0 and SCB1, CSL1 may correspond to the sub-array blocks SCB2 and SCB3 and CSL7 may correspond to the sub-array blocks SCB14 and SCB15.

In embodiments of FIGS. 5B through 5E in which h and k are 7, the normal data stored in the normal data storage region coupled to the column selection lines CSL0~CSL7 from among the sub-array blocks SCBa, . . . , SCBh may correspond to the meta data stored in the meta data storage region coupled to the column selection line CSL56. A meta data associated with a normal data corresponding to the column selection line CSL0 may be stored in the meta data storage region coupled to the column selection line CSL56, of the sub array block SCBa. A meta data associated with a normal data corresponding to the column selection line CSL1 may be stored in the meta data storage region coupled to the column selection line CSL56, of the sub array block SCBb. Accordingly, a meta data associated with a normal data corresponding to the column selection line CSL7 may be stored in the meta data storage region coupled to the column selection line CSL56, of the sub array block SCBh.

When the column access circuit 500 writes or reads the normal data by activating the column selection line CSL0 in each of the sub-array blocks SCBa, . . . , SCBh, the column access circuit 500 may write or read the meta data corresponding to the normal data by selectively activating the column selection line CSL56 in the corresponding sub array block instead of activating the column selection line CSL56 in each of the sub-array blocks SCBa, . . . , SCBh.

Figure 6:
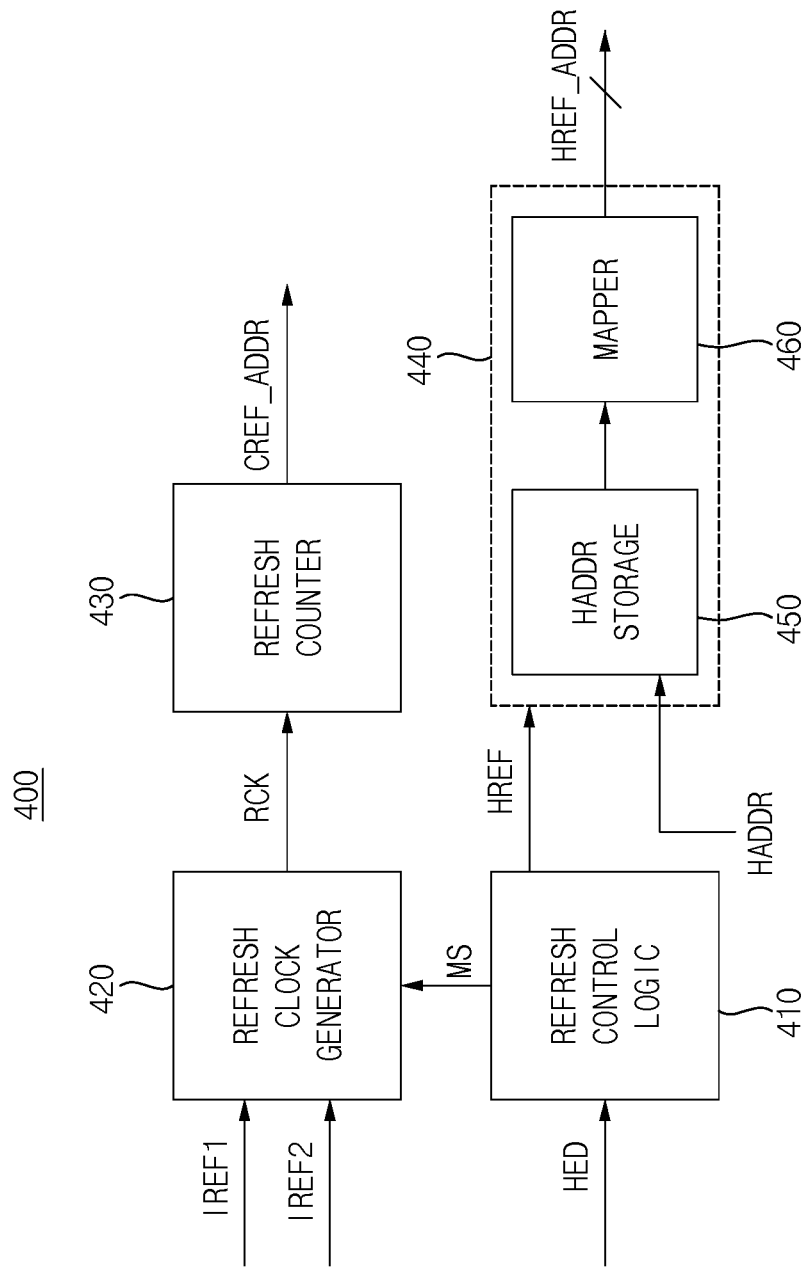
FIG. 6 is a block diagram illustrating an example of the refresh control circuit in FIG. 3 according to example embodiments.

FIG. 6 is a block diagram illustrating an example of the refresh control circuit in FIG. 3 according to example embodiments.

Referring to FIG. 6, the refresh control circuit 400 may include a refresh control logic 410, a refresh clock generator 420, a refresh counter 430 and a hammer refresh address generator 440.

The refresh control logic 410 may provide a mode signal MS in response to the hammer event detection signal HED. In addition, the refresh control logic 410 may provide the hammer refresh address generator 440 with a hammer refresh signal HREF to control output timing of the hammer address in response to one of the first refresh control signal IREF1 and the second refresh control signal IREF2.

The refresh clock generator 420 may generate a refresh clock signal RCK indicating a timing of a normal refresh operation based on the first refresh control signal IREF1, the second refresh control signal IREF2 and the mode signal MS. The refresh clock generator 420 may generate the refresh clock signal RCK in response to receiving the first refresh control signal IREF1 or during an activation interval of the second refresh control signal IREF2.

When the command CMD from the memory controller 30 corresponds to an auto refresh command, the control logic circuit 210 in FIG. 3 may apply the first refresh control signal IREF1 to the refresh control circuit 400 whenever the control logic circuit 210 receives the auto refresh command. When the command CMD from the memory controller 30 corresponds to a self-refresh entry command, the control logic circuit 210 may apply the second refresh control signal IREF2 to the refresh control circuit 400 and the second refresh control signal IREF2 is activated from a time point when the control logic circuit 210 receives the self-refresh entry command to a time point when control logic circuit 210 receives a self-refresh exit command.

The refresh counter 430 may generate a counter refresh address CREF_ADDR designating sequentially the memory cell rows by performing counting operation at the period of the refresh clock signal RCK, and may provide the counter refresh address CREF_ADDR as the refresh row address REF_ADDR to the row address multiplexer 240 in FIG. 3.

The hammer refresh address generator 440 may include a hammer address (HADDR) storage 450 and a mapper 460.

The hammer address storage 450 may store the hammer address HADDR and may output the hammer address HADDR to the mapper 460 in response to the hammer refresh signal HREF. The mapper 460 may generate one or more hammer refresh addresses HREF ADDR designating one or more victim memory cell rows physically adjacent to a memory cell row corresponding to the hammer address HADDR.

The hammer refresh address generator 440 may provide the hammer refresh address HREF ADDR as the refresh row address REF_ADDR to the row address multiplexer 240 in FIG. 3.

Figure 7:
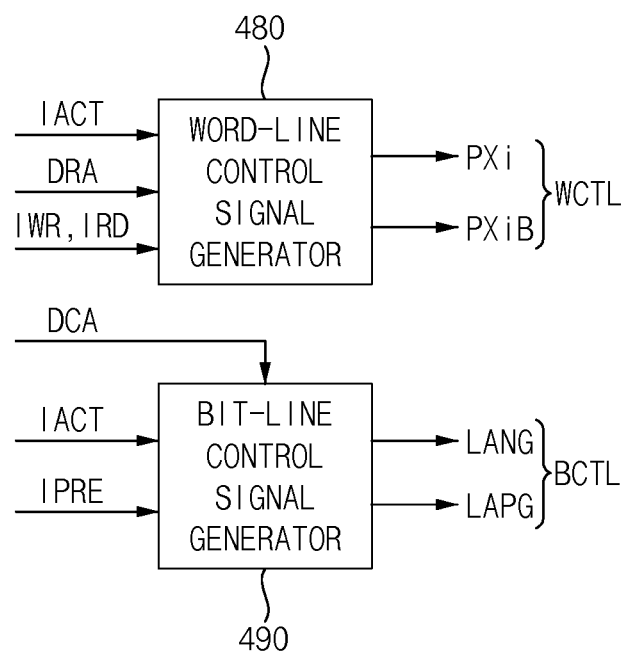
FIG. 7 is a block diagram illustrating an example of the timing control circuit in FIG. 3 according to example embodiments.

FIG. 7 is a block diagram illustrating an example of the timing control circuit in FIG. 3 according to example embodiments.

Referring to FIG. 7, the timing control circuit 470 may include a word-line control signal generator 480 and a bit-line control signal generator 490.

The word-line control signal generator 480 may generate a word-line control signal WCTL including first and second word-line control signals PXi and PXiB to control a word-line based on the internal command signals IACT, IWR and IRD corresponding to the command CMD and a decoded row address DRA. The word-line control signal generator 480 may provide the first and second word-line control signals PXi and PXiB to the memory cell array 310.

The bit-line control signal generator 490 may generate the bit-line control signal BCTL including second control signals LANG and LAPG to control voltage levels of a bit-line pair of a selected memory cell, in response to the internal command signals IACT and IPRE and a decoded column address DCA, and may provide the second control signals LANG and LAPG to the memory cell array 310.

Figure 8:
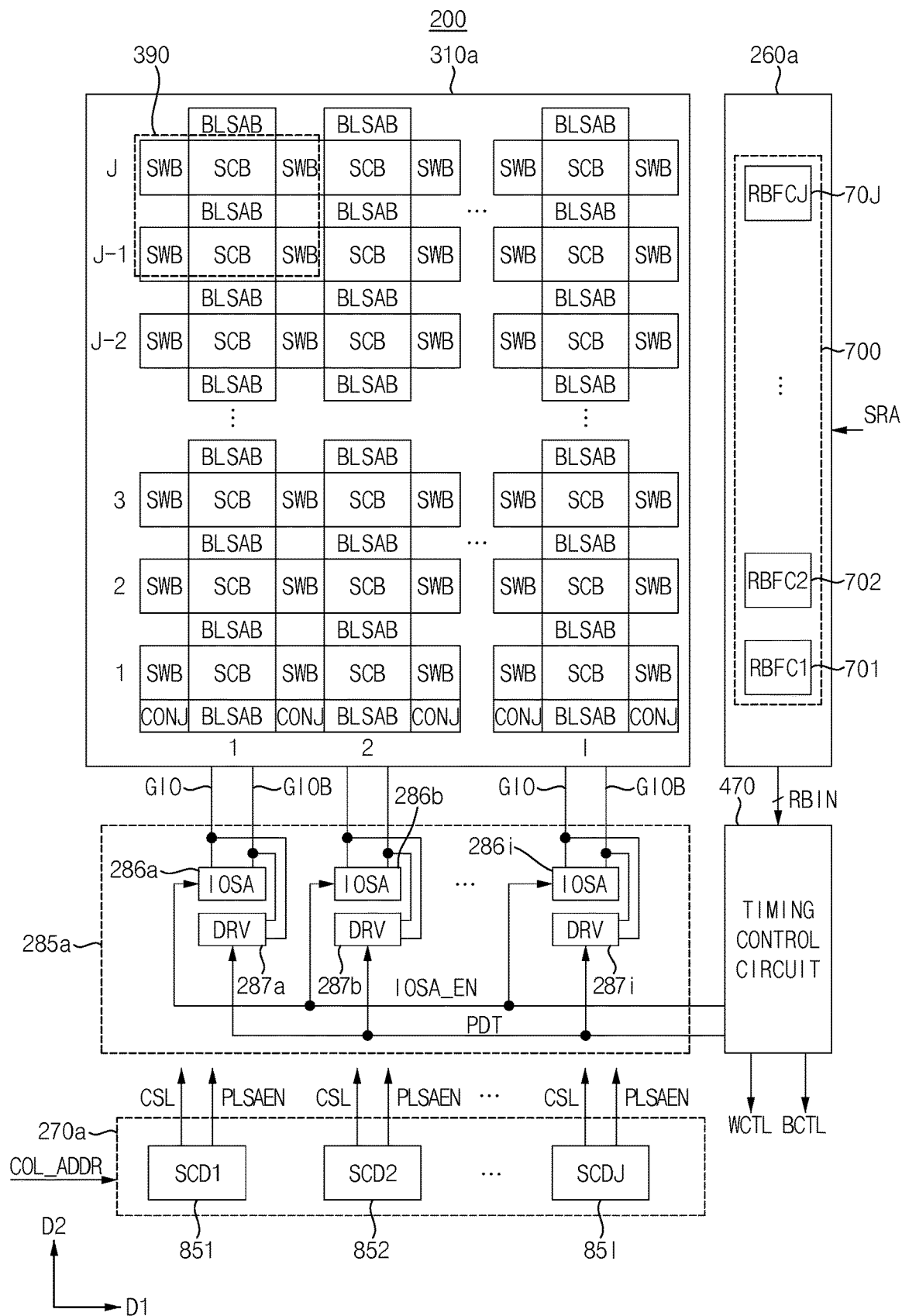
FIG. 8 illustrates a portion of the semiconductor memory device of FIG. 3 according to some example embodiments.

FIG. 8 illustrates a portion of the semiconductor memory device of FIG. 3 according to some example embodiments.

In FIG. 8, the first bank array 310a, the first row decoder 260a, the first sense amplifier 285a, the first column decoder 270a and the timing control circuit 470 in the semiconductor memory device of FIG. 3 are illustrated.

Referring to FIG. 8, in the first bank array 310a, I sub-array blocks SCB may be disposed in the first direction D1, and J sub-array blocks SCB may be disposed in the second direction D2 perpendicular to the first direction D1. I and J represent a number of the sub-array blocks SCB in the first direction D1 and the second direction D2, respectively, and are natural numbers greater than two.

I sub-array blocks SCB disposed in the first direction D1 in one row may be referred to as a row block. A plurality of bit-lines, a plurality of word-lines and a plurality of memory cells connected to the bit-lines and the word-lines are disposed in each of the sub-array blocks SCB.

I+1 sub word-line driver regions SWB may be disposed between the sub-array blocks SCB in the first direction D1 as well on each side of each of the sub-array blocks SCB in the first direction D1. Sub word-line drivers may be disposed in the sub word-line driver regions SWB. J+1 bit-line sense amplifier regions BLSAB may be disposed, for example, between the sub-array blocks SCB in the second direction D2 and above and below each of the sub-array blocks SCB in the second direction D2. Bit-line sense amplifiers to sense data stored in the memory cells may be disposed in the bit-line sense amplifier regions BLSAB.

A plurality of sub word-line drivers may be provided in each of the sub word-line driver regions SWB. One sub word-line driver region SWB may be associated with two sub-array blocks SCB adjacent to the sub word-line driver region SWB in the first direction D1.

A plurality of conjunction regions CONJ may be disposed adjacent the sub word-line driver regions SWB and the bit-line sense amplifier regions BLSAB. A voltage generator may be disposed in each of the conjunction regions CONJ.

The first sense amplifier 285a may be disposed in the second direction D2 with respect to the first bank array 310a and the first sense amplifier 285a may include I I/O sense amplifiers IOSAs 286a, 286b, ..., 286i and I drivers DRV 287a, 287b, ..., 287i. Each of the I I/O sense amplifiers IOSAs 286a, 286b, ..., 286i and each of the I drivers 287a, 287b, ..., 287i may be connected to a corresponding column through global I/O lines GIO and GIOB.

The timing control circuit 470 may control the I I/O sense amplifiers 286a, 286b, ..., 286i and the I drivers 287a, 287b, ..., 287i. The timing control circuit 470 may provide an I/O sense enable signal IOSA_EN to the I/O sense amplifiers 286a, 286b, ..., 286i in a read operation and may provide a driving signal PDT to the I drivers 287a, 287b, ..., 287i.

The first row decoder 260a may include a row block information circuit 700 and the row block information circuit 700 may include a plurality of row block fuse circuits RBFC1, RBFC2, ..., RBFCJ 701, 702, ..., 70J corresponding to the plurality of row blocks in the second direction D2. The row block fuse circuits 701, 702, ..., 70J may output the row block information signal RBIN to the timing control circuit 470 in response to the row block identity bits of the row address SRA.

The timing control circuit 470 may adjust the I/O sense enable signal IOSA_EN and the driving signal PDT based on the row block information signal RBIN. In addition, the timing control circuit 470 may generate the word-line control signal WCTL and the bit-line control signal BCTL and may provide the word-line control signal WCTL and the bit-line control signal BCTL to the first bank array 310a.

The first column decoder 270a may include a plurality of sub column decoders SCD1, SCD2, ..., SCDI 851, 852, ..., 85I. Each of the sub column decoders 851, 852, ..., 85I may be connected to a corresponding one of the sub-array blocks. Each of the sub column decoders 851, 852, ..., 85I may select column selection lines CSL. Each of the sub column decoders 851, 852, ..., 85I may provide a local sense enable signal PLSAEN to a corresponding sub-array block SCB.

A portion 390 in the first bank array 310a will be described with reference to FIG. 9 below.

Figure 9:
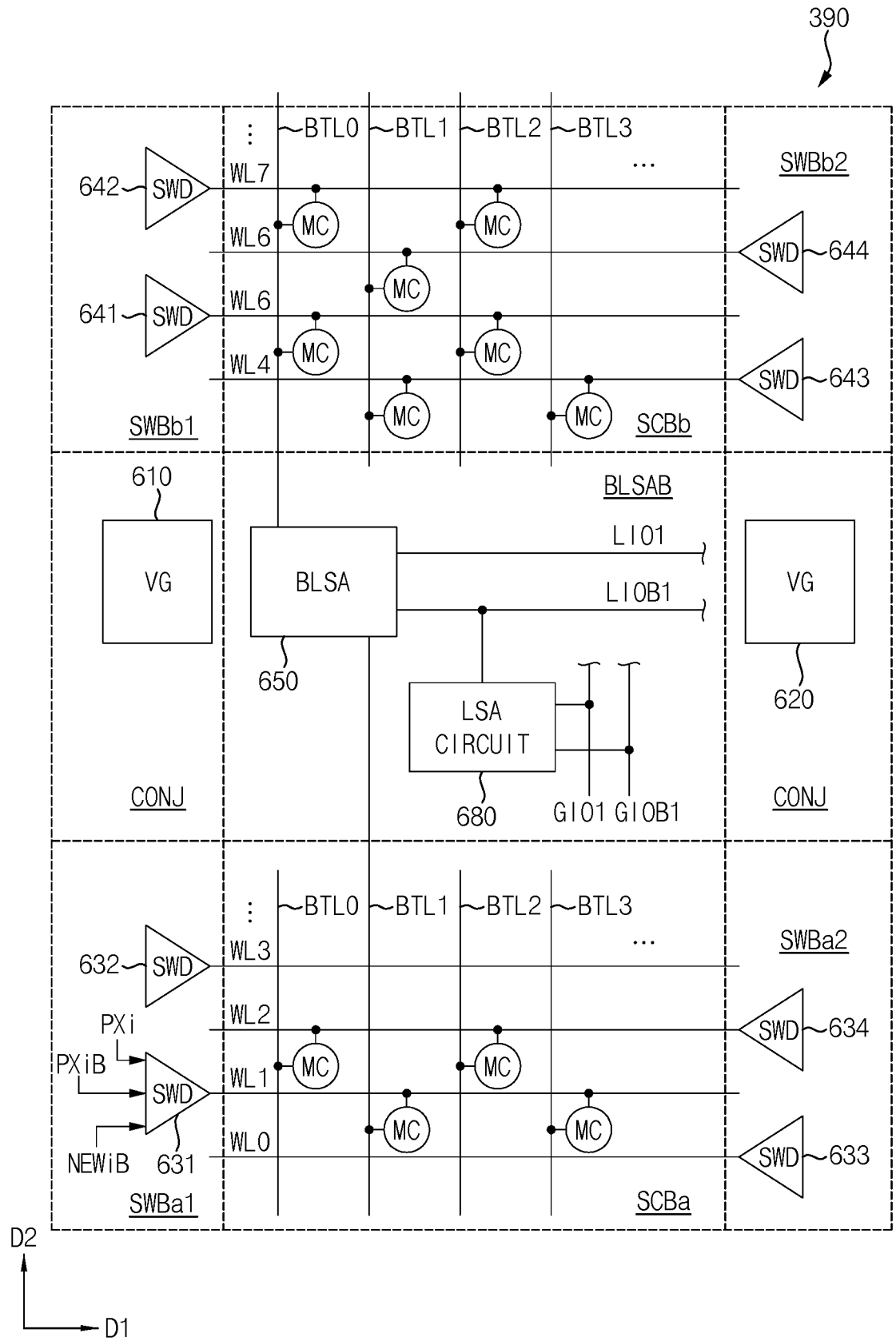
FIG. 9 illustrates a portion of the first bank array in FIG. 8 according to some example embodiments.

FIG. 9 illustrates a portion of the first bank array in FIG. 8 according to some example embodiments.

Referring to FIGS. 8 and 9, in the portion 390 of the first bank array 310a, sub-array blocks SCBa and SCBb, the bit-line sense amplifier regions BLSAB, four sub word-line driver regions SWBa1, SWBa2, SWBb1 and SWBb2 and two of the conjunction regions CONJ are disposed.

The sub-array block SCBa may include a plurality of word-lines WL0~WL3 extending in the first direction D1 and a plurality of bit-line BTL0~BTL3 extending in the second direction D2. The sub-array block SCBa may include a plurality of memory cells MCs disposed at intersections of the word-lines WL0~WL3 and the bit-line BTL0~BTL3. The sub-array block SCBb may include a plurality of word-lines WL4~WL7 extending in the first direction D1 and the plurality of bit-line BTL0~BTL3 extending in the second direction D2. The sub-array block SCBb may include a plurality of memory cells MCs disposed at intersections of the word-lines WL4~WL7 and the bit-line BTL0~BTL3.

With reference to FIG. 9, the sub word-line driver regions SWBa1 and SWBa2 may include a plurality of sub word-line drivers 631, 632, 633 and 634 that respectively drive the word-lines WL0~WL3. The sub word-line driver regions SWBb1 and SWBb2 may include a plurality of sub word-line drivers 641, 642, 643 and 644 that respectively drive the word-lines WL4~WL7. The sub word-line driver 641 may control a voltage level of the word-line WL1 in response to the first and second word-line control signals PXi and PXiB. Each of the plurality of sub word-line drivers 632, 633, 634, 641, 642, 643 and 644 may control a voltage level of a corresponding word-line in response to the first and second word-line control signals PXi and PXiB.

The bit-line sense amplifier region BLSAB may include a bit-line sense amplifier BLSA 650 coupled to the bit-line BTL0 in the sub-array block SCBb and the bit-line BTL1 in the sub-array block SCBa, and a local sense amplifier LSA circuit 680. The bit-line sense amplifier 650 may sense and amplify a voltage difference between the bit-lines BTL0 and BTL1 to provide the amplified voltage difference to a local I/O line pair LIO1 and LIOB1.

The local sense amplifier circuit 680 may control electrical connection between the local I/O line pair LIO1 and LIOB1 and a global I/O line pair GIO1 and GIOB1.

As illustrated in FIG. 9, the conjunction regions CONJ may be disposed adjacent to the bit-line sense amplifier region BLSAB and the sub word-line driver regions SWBa1, SWBb1, SWBa2 and SWBb2. Voltage generators 610 and 620 may be disposed in the conjunction regions CONJ.

Figure 10:
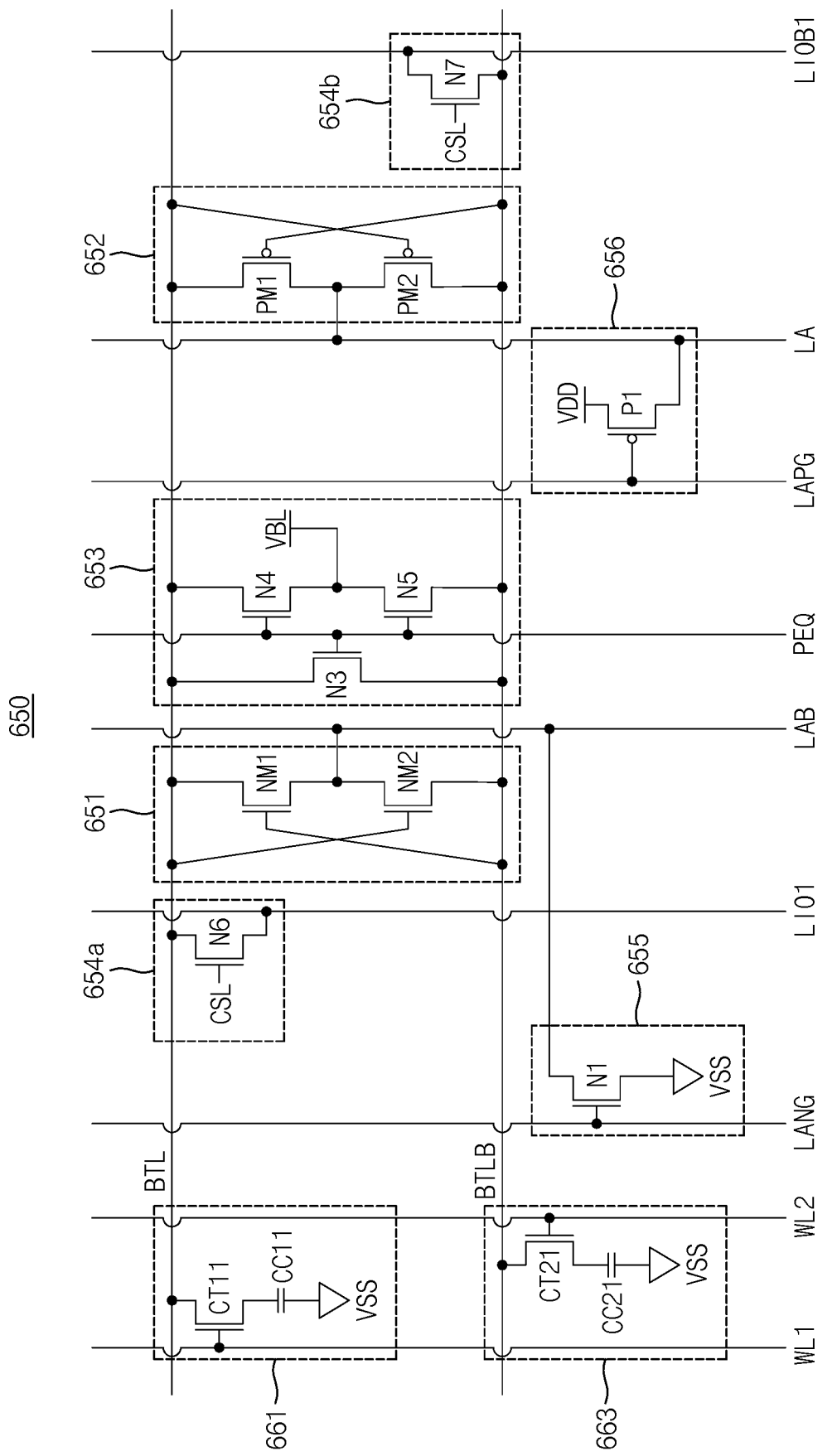
FIG. 10 is a circuit diagram illustrating the bit-line sense amplifier in FIG. 9 according to example embodiments.

FIG. 10 is a circuit diagram illustrating the bit-line sense amplifier in FIG. 9 according to example embodiments.

Referring to FIG. 10, the bit-line sense amplifier 650 is coupled to bit-lines BTL1 and BTLB1 of each of memory cells 661 and 663 in the memory cell array 310. Memory cell 661 may correspond to the memory cell MC of sub-array block SCB that is at the intersection of bit-line BTL1 and word-line WL1, and memory cell 663 may correspond to the memory cell MC of sub-array block SCB that is located at the intersection of bit-line BTLB1 and word-line WL2. The bit-line sense amplifier 650 shown in FIG. 10 includes an N-type sense amplifier 651, a P-type sense amplifier 652, a pre-charge circuit 653, column select switches 654a and 654b, an N-type sense amplifier (NSA) driver 655, and a P-type sense amplifier (PSA) driver 656.

The N-type sense amplifier 651 discharges a low-level bit-line of the bit-lines (or, bit-line pair) BL1 and BLB1 to a low level during a sensing operation. The N-type sense amplifier 651 includes two NMOS transistors NM1 and NM2. A gate of the NMOS transistor NM1 is connected to the bit-line (second bit-line) BTLB1, and a drain of the NMOS transistor NM1 is connected to the bit-line (first bit-line) BL1, and a source of the NMOS transistor NM1 is connected to a sense enable line LAB. The NMOS transistor NM2 has a gate connected to the bit-line BL1, a drain connected to the sense enable line LAB, and a source connected to the bit-line BLB1. The N-type sense amplifier 651 connects a low-level bit-line to the sense enable line LAB. The sense enable line LAB is connected to the ground voltage VSS.

The P-type sense amplifier 652 charges a high-voltage bit-line of the bit-lines BL1 and BLB1 with a power supply voltage VDD level at a sensing operation. The P-type sense amplifier 652 includes two PMOS transistors PM1 and PM2. The PMOS transistor PM1 has a gate connected to the bit-line BTLB1, a source connected to the bit-line BL1, and a drain connected to a sense enable line LA. The PMOS transistor PM2 has a gate connected to the bit-line BTL1, a source connected to sense enable line LA, and a drain connected to the bit-line BTLB1.

The P-type sense amplifier 652 charges a high-voltage bit-line of the bit-lines BTL1 and BTLB1 with a power supply voltage VDD provided to the sense enable line LA.

The PSA driver 656 provides a charging voltage VDD to the sense enable line LA. Therefore, the transistor PM2 is turned off because the gate of the transistor PM2 is coupled to the bit-line BTL1 with a voltage increased by the charge sharing.

The pre-charge circuit 653 pre-charges the bit-lines BTL1 and BTLB1 with a half voltage VDD/2 in response to a control signal PEQ in sensing operation. When the control signal PEQ is activated, the pre-charge circuit 653 supplies a bit-line pre-charge voltage VBL to the bit-lines BTL1 and BTLB1. The bit-line pre-charge voltage VBL may be a half voltage VDD/2. The bit-lines BTL1 and BTLB1 are connected such that their voltages are equalized. If the bit-lines BTL1 and BTLB1 are charged by the pre-charge level VBL, the control signal PEQ is inactivated. The pre-charge circuit 653 includes NMOS transistors N3, N4, and N5.

The column select switches 654a and 654b provide data sensed by the N-type and P-type sense amplifiers 651 and 652 to local I/O lines LIO1 and LIOB1 in response to a column selection signal CSL. The column select switches 654a and 654b are turned on such that the sensed data is transferred to the local I/O lines LIO1 and LIOB1. For example, in a read operation when sensing levels of the N-type and P-type sense amplifiers 651 and 652 are stabilized, a column selection signal CSL is activated. Then the column select switches 654a and 654b are turned on such that the sensed data is transferred to the local I/O line pair LIO1 and LIOB1. Voltages of the bit-lines BTL1 and BTLB1 are varied when charges of bit-lines BL1 and BLB1 are shared with the local I/O lines LIO1 and LIOB1. The column select switches 654a and 654b includes NMOS transistors N6 and N7, respectively.

The NSA driver 655 provides a driving signal to the sense enable line LAB of the N-type sense amplifier 651. Based on the control signal LANG, the NSA driver 655 grounds the sense enable line LAB. The NSA driver 655 includes the ground transistor N1 to control a voltage of the sense enable line LAB. The PSA driver 656 provides the charge voltage VDD to the sense enable line LA of the P-type sense amplifier 652. The PSA driver 656 includes the PMOS transistor P1 to control a voltage of the sense enable line LA. The control signals LAPG and LANG are complementary to each other.

Figure 11:
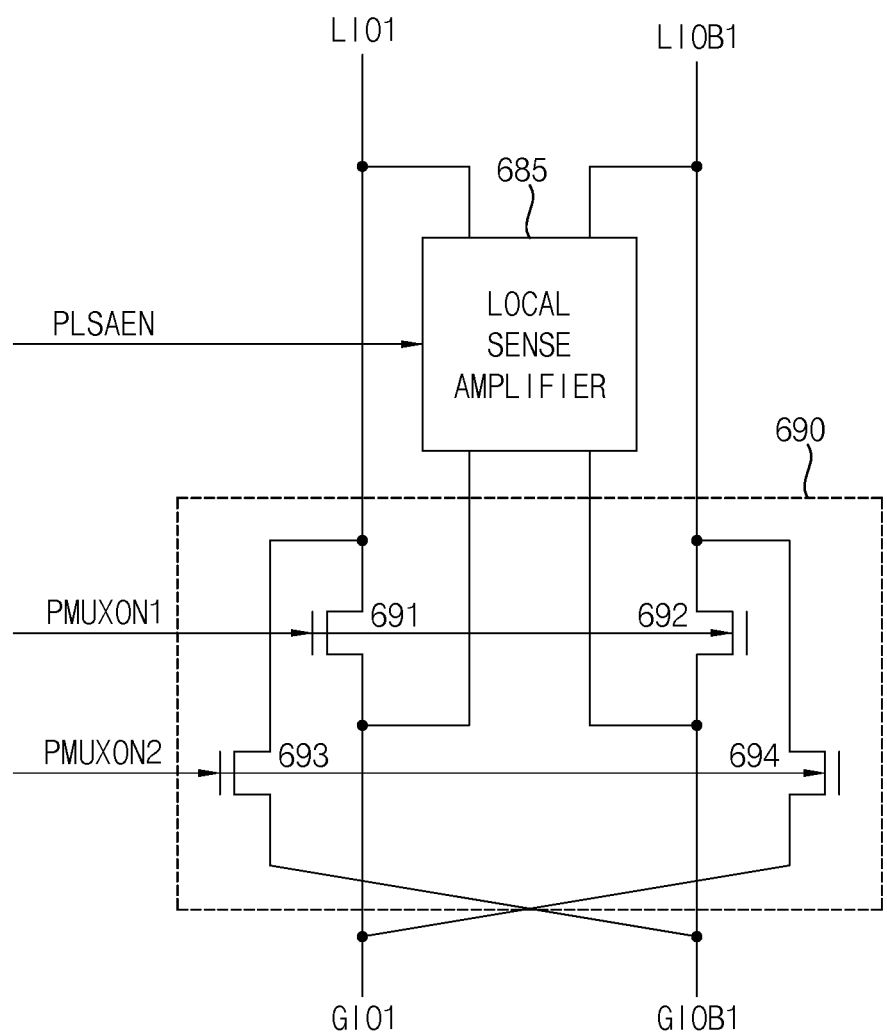
FIG. 11 illustrates an example of the local sense amplifier circuit in FIG. 9 according to example embodiments.

FIG. 11 illustrates an example of the local sense amplifier circuit in FIG. 9 according to example embodiments.

Referring to FIG. 11, the local sense amplifier circuit 680 may include a local sense amplifier 685 and a local I/O line controller 690.

The local sense amplifier 685 may amplify a voltage difference between the local I/O line pair LIO1 and LIOB1 in response to the local sense enable signal PLSAEN to provide the amplified voltage difference to a global I/O line pair GIO1 and GIOB1. The local I/O line controller 690 includes first through fourth NMOS transistors 691, 692, 693 and 694, and controls connection between the local I/O line pair LIO1 and LIOB1 and the global I/O line pair GIO1 and GIOB1 in response to a first connection control signal PMUXON1 and a second connection control signal PMUXON2.

For example, when each of the local sense enable signal PLSAEN, a first connection control signal PMUXON1, and a second connection control signal PMUXON2 is a low level the local sense amplifier 685 is disabled and the local I/O line controller 690 cuts off the connection between the local I/O line pair LIO1 and LIOB1 and the global I/O line pair GIO1 and GIOB1.

For example, when each of the local sense enable signal PLSAEN, the first connection control signal PMUXON1, and the second connection control signal PMUXON2 is a high level the local sense amplifier 685 is enabled and the local I/O line controller 690 provides the connection between the local I/O line pair LIO1 and LIOB1 and the global I/O line pair GIO1 and GIOB1.

Figure 12:
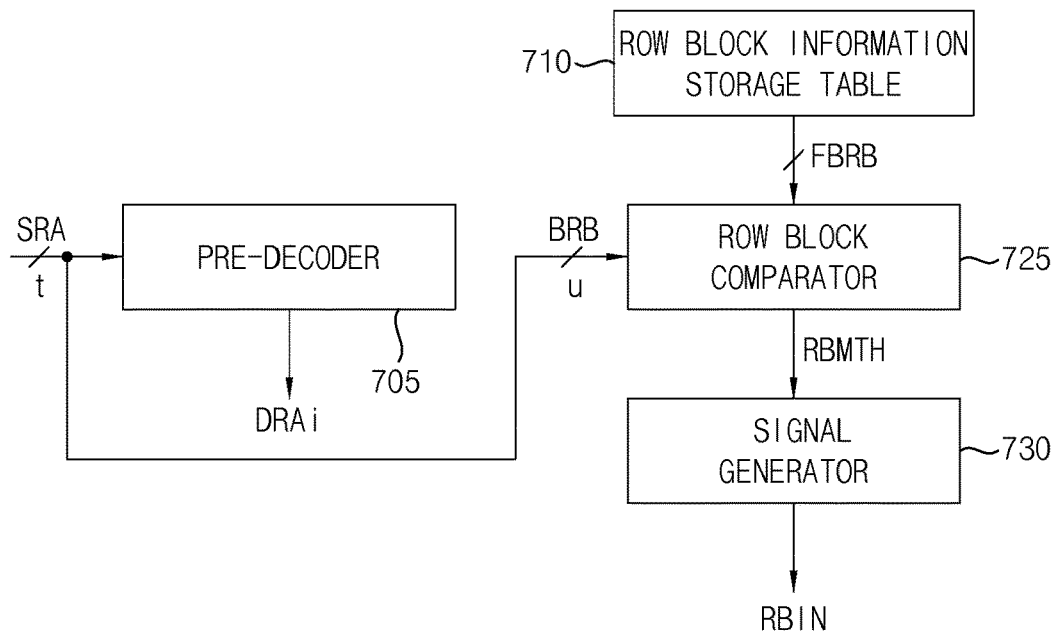
FIG. 12 is a block diagram illustrating a first row block fuse circuit of the row block fuse circuits in FIG. 8 according to example embodiments.

FIG. 12 is a block diagram illustrating a first row block fuse circuit of the row block fuse circuits in FIG. 8 according to example embodiments.

Each configuration of the row block fuse circuits 702~70J may be substantially the same as a configuration of the first row block fuse circuit 701.

Referring to FIG. 12, the first row block fuse circuit 701 may include a pre-decoder 705, a row block information storage table 710, a row block address comparator 725 and a signal generator 730.

The pre-decoder 705 decodes the row address SRA to provide the decoded row address DRAi to a corresponding sub word-line driver. The corresponding sub word-line driver may activate a word-line corresponding to the decoded row address DRAi, in response to the decoded row address DRAi.

The row block information storage table 710 may store defective row block address FBRB associated with a defective row block including the at least one defective cell.

The row block information storage table 710 may provide the defective row block address FBRB to the row block address comparator 725 and the row block comparator 725 may compare row block identity bits BRB with the defective row block address FBRB to provide the signal generator 730 with a row block match signal RBMTH indicating a result of the comparison of the row block identity bits and with the defective row block address FBRB. When the row address SRA includes t-bit, upper r-bit of the row address SRA may correspond to the row block identity bits BRB.

The signal generator 730 may provide the row block information signal RBIN to the timing control circuit 470 in response to the row block match signal RBMTH. The row block information signal RBIN may include repair information indicating that the corresponding row block includes at least one defective cell.

Figure 13:
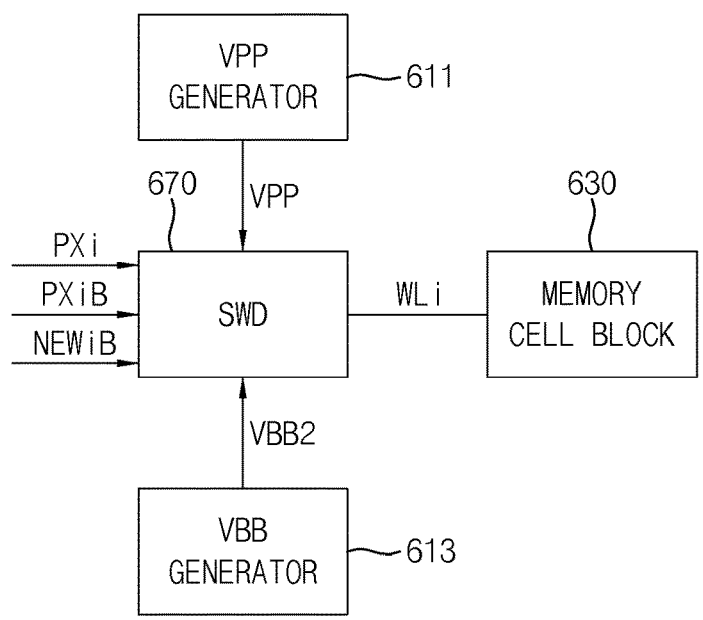
FIG. 13 illustrates a sub word-line driver and a memory cell block in FIG. 9 according to example embodiments.

FIG. 13 illustrates a sub word-line driver and a memory cell block in FIG. 9 according to example embodiments.

Figure 14:
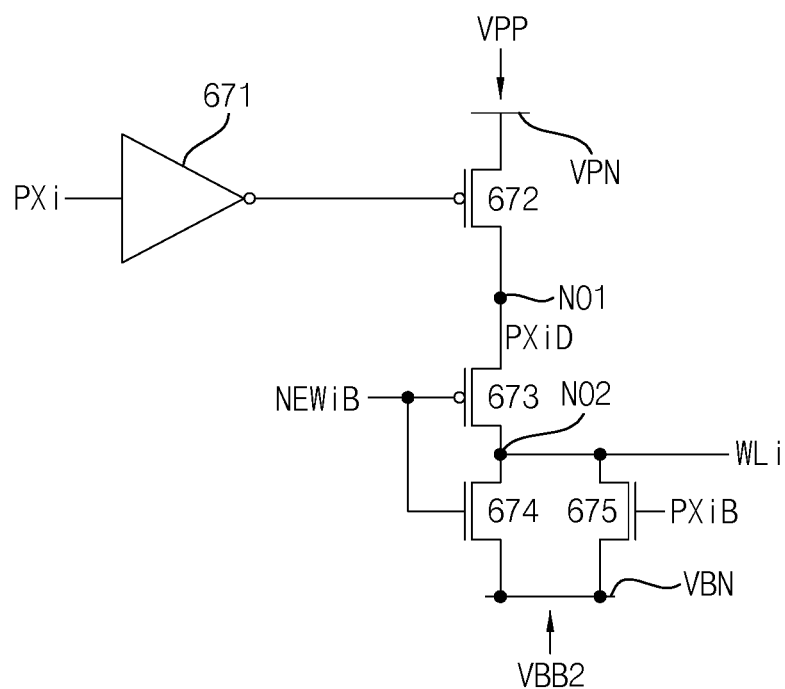
FIG. 14 is a circuit diagram illustrating an example of the sub word-line driver in FIG. 13 according to example embodiments.

Referring to FIG. 13, a boosted voltage generator 611 generates a boosted voltage VPP to the sub word-line driver SWD 670 and a negative voltage generator 613 generates a negative voltage VBB2 to the sub word-line driver 670. The sub word-line driver 670 may enable a word-line WLi with the boosted voltage VPP or disable the word-line WLi with the negative voltage VBB2 in response to the first and second word-line control signals PXi and PXiB and a normal word-line enable signal NEWiB. The word-line WLi may be coupled to a memory cell block 630. FIG. 14 is a circuit diagram illustrating an example of the sub word-line driver in FIG. 13 according to example embodiments.

Referring to FIG. 14, the sub word-line driver 670 includes an inverter 671, PMOS transistors 672 and 673, and NMOS transistors 674 and 675. The inverter 671 inverts the first word-line control signal PXi and is coupled to a gate of the PMOS transistor 672. The PMOS transistor 672 has a source connected to a boosted voltage terminal VPN, a gate receiving an output of the inverter 671 and a drain connected to a boosted node NO1. The PMOS transistor 673 has a source connected to the boosted node NO1, a gate receiving word-line enable signal NEWiB and a drain connected to an enable node NO2. The NMOS transistor 674 has a drain connected to the enable node NO2, a gate receiving the word-line enable signal NEWiB and a source connected to a negative voltage terminal VBN. The NMOS transistor 675 has a drain connected to the enable node NO2, a gate receiving the second word-line enable control signal PXiB and a source connected to the negative voltage terminal VBN. The boosted voltage VPP is applied to the boosted voltage terminal VPN and the negative voltage VBB2 is applied to the negative voltage terminal VBN.

The PMOS transistor 672 receives the boosted voltage VPP, and transfers the boosted voltage to the boost node NO1 in response to the first word-line enable control signal PXi. The PMOS transistor 673 receives the boosted voltage from the PMOS transistor 672 through a source and enables a corresponding word-line WLi connected to the enable node NO2 with the boosted voltage in response to the word-line enable signal NEWiB. The NMOS transistor 674 transfers the negative voltage VBB2 to the enable node NO2 in response to the word-line enable signal NWEiB and the NMOS transistor 675 and the NMOS transistor 675 disables the corresponding word-line WLi connected to the enable node NO2 with the negative voltage in response to the second word-line enable control signal PXiB.

Figure 15:
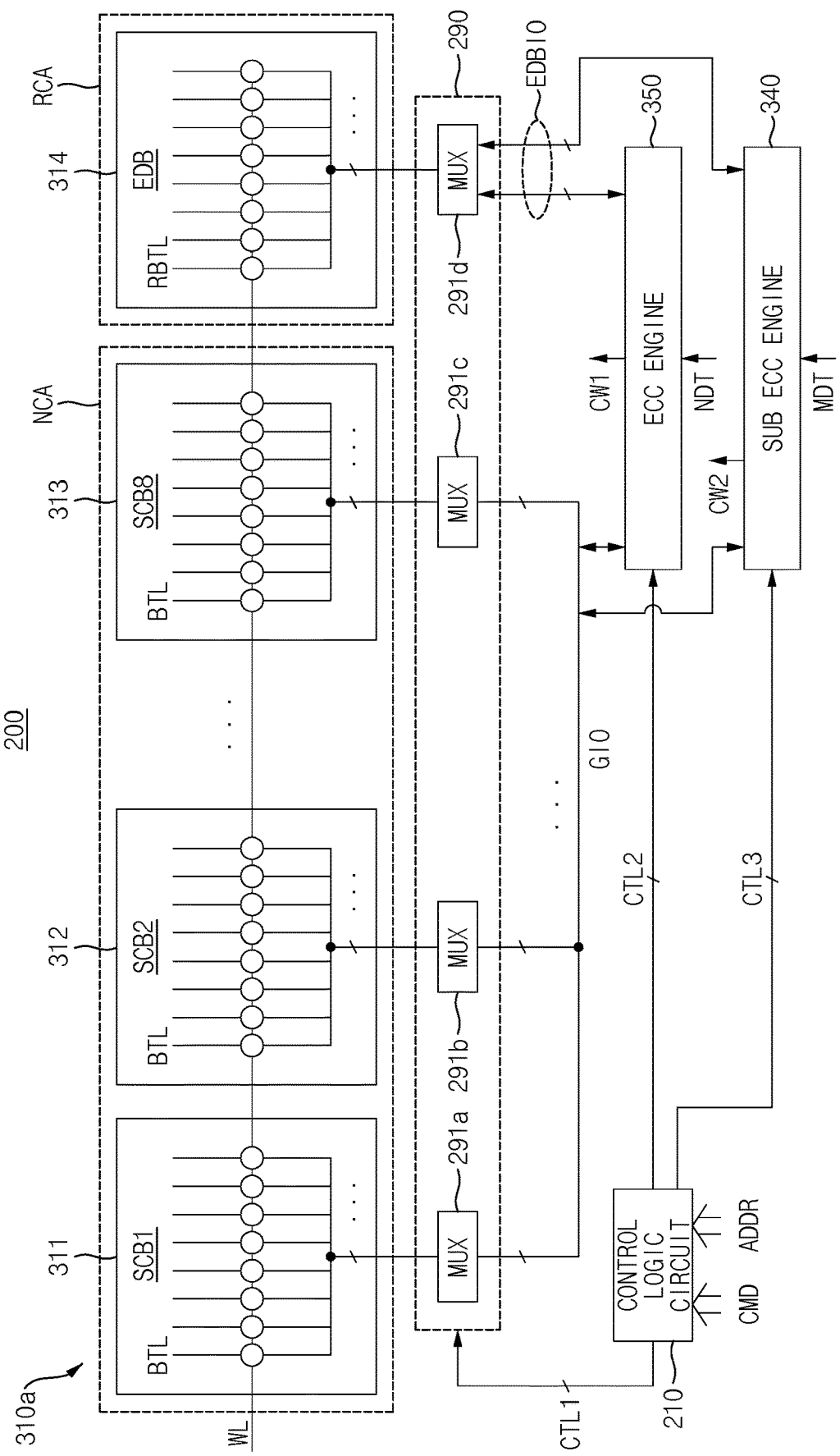
FIG. 15 illustrates a portion of the semiconductor memory device of FIG. 3 for explaining a write operation.

FIG. 15 illustrates a portion of the semiconductor memory device of FIG. 3 for explaining a write operation.

In FIG. 15, the control logic circuit 210, the first bank array 310a, the I/O gating circuit 290, the ECC engine 350 and the at least one sub ECC engine 340 are illustrated.

Referring to FIG. 15, the first bank array 310a includes a normal cell region NCA and a redundancy cell region RCA.

The normal cell region NCA includes a plurality of first memory blocks MB0~MB15, i.e., 311~313, and the redundancy cell array RCA includes at least a second memory block 314. The first memory blocks 311~313 are memory blocks that determine or are used to determine a memory capacity of the semiconductor memory device 200. The second memory block 314 is for ECC and/or redundancy repair. Since the second memory block 314 for ECC and/or redundancy repair is used for ECC, data line repair and block repair to repair 'failed' cells generated in the first memory blocks 311~313, the second memory block 314 is also referred to as an EDB block. The first memory blocks 311~313 and the second memory block 314 may each be representative of a sub array block SCB in FIG. 8.

The I/O gating circuit 290 includes a plurality of switching circuits 291a~291d respectively connected to the first memory blocks 311~313 and the second memory block 314.

The ECC engine 350 may be connected to the switching circuits 291a~291d through first data lines GIO and second data lines EDBIO. The control logic circuit 210 may receive the command CMD and the address ADDR and may decode the command CMD to generate the first control signal CTL1 for controlling the switching circuits 291a~291d, the second control signal CTL2 for controlling the ECC engine 350 and the third control signal CTL3 for controlling the at least one sub ECC engine 340.

When the command CMD is a write command, the control logic circuit 210 provides the second control signal CTL2 to the ECC engine 350 and provides the third control signal CTL3 to the at least one sub ECC engine 340. The ECC engine 350 performs a first ECC encoding on the normal data NDT to generate a normal parity data associated with the normal data NDT and provides the I/O gating circuit 290 with the first codeword CW1 including the normal data NDT and the normal parity data. The control logic circuit 210 provides the first control signal CTL1 to the I/O gating circuit 290 such that the normal data NDT of the first codeword CW1 is to be stored in a first region of the target sub-array block and the normal parity data of the first codeword CW1 is to be stored in a first region of the second memory block 314.

In addition, the at least one sub ECC engine 340 performs a second ECC encoding on the meta data MDT to generate a meta parity data associated with the meta data MDT and provides the I/O gating circuit 290 with the second codeword CW2 including the meta data MDT and the meta parity data based on the third control signal CTL3. The control logic circuit 210 provides the first control signal CTL1 to the I/O gating circuit 290 such that the meta data MDT of the second codeword CW2 is to be stored in a second region of the target sub-array block and the meta parity data of the second codeword CW2 is to be stored in a second region of the second memory block 314.

Figure 16:
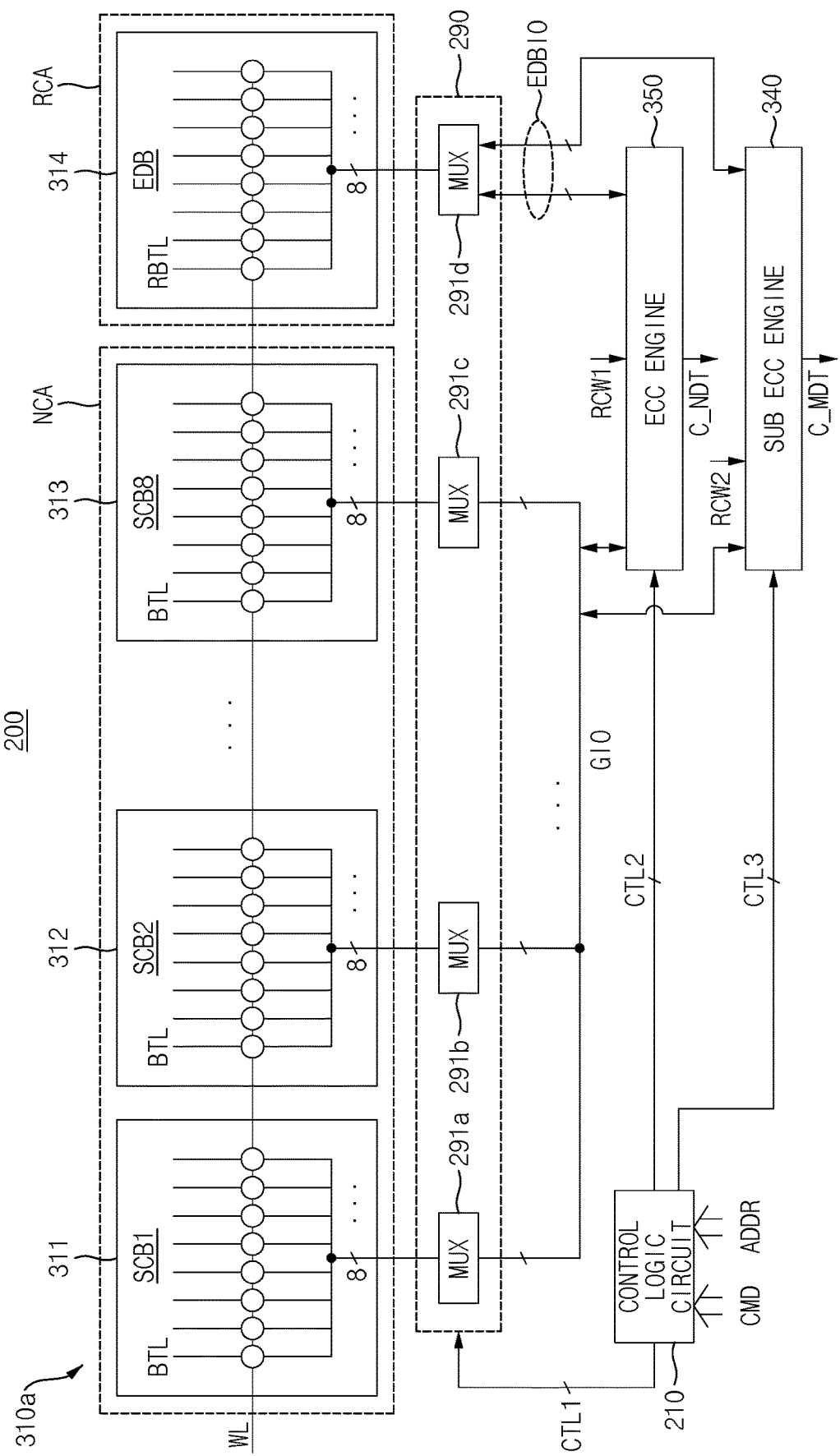
FIG. 16 illustrates a portion of the semiconductor memory device of FIG. 3 for explaining a read operation.

FIG. 16 illustrates a portion of the semiconductor memory device of FIG. 3 for explaining a read operation. Description repeated with FIG. 15 will be omitted.

Referring to FIG. 16, when the command CMD is a read command to designate a read operation, the control logic circuit 210 provides the first control signal CTL1 to the I/O gating circuit 290 such that a first (read) codeword RCW1 including the normal data stored in the first region of the target sub-array block and the normal parity data stored in the first region of the second memory block 314 in the first bank array 310a is provided to the ECC engine 350.

The ECC engine 350 performs a first ECC decoding on the first codeword RCW1 to correct an error bit in the normal data and may output a corrected normal data in response to the second control signal CTL2.

In addition, the control logic circuit 210 provides the first control signal CTL1 to the I/O gating circuit 290 such that a second (read) codeword RCW2 including the meta data stored in the second region of the target sub-array block and the meta parity data stored in the second region of the second memory block 314 in the first bank array 310a is provided to the at least one sub ECC engine 340.

The at least one sub ECC engine 340 performs a second ECC decoding on the second codeword RCW2 to correct an error bit in the meta data and may output a corrected meta data in response to the third control signal CTL3.

FIG. 17 illustrates example commands which may be used in the memory system of FIG. 1.

FIG. 17 illustrates combinations of a chip selection signal CS_n and first through fourteenth command-address signals CA0~CA13 representing an active command ACT, a write command WR and a read command RD.

In FIG. 17, H indicates a logic high level, L indicates a logic low level, V indicates a valid logic level corresponding to one of the logic high level H and the logic low level L, R0~R17 indicate bits of a row address, BA0 through BA2 indicate bits of a bank address, BG0 through BG2 indicate bits of a bank group address, and CID0 through CID3 indicate die identifier of a memory die (or a memory chip) when the semiconductor memory device 200 is implemented with a stacked memory device including a plurality of memory dies. In addition, C2~C10 indicate bits of a column address, and BL indicates burst length flag.

Referring to FIG. 17, the active command ACT, the write command WR and the read command RD may be transferred during two cycles, for example, during the logic high level H and the logic low level L of the chip selection signal CS_n. The active command ACT may include the bank address bits BA0 and BA1 and the row address bits R0~R17.

Figure 18:
FIG. 18 illustrates that a plurality of normal data and a plurality of meta data are allocated to column selection lines with a specific ratio.

FIG. 18 illustrates that a plurality of normal data and a plurality of meta data are allocated to column selection lines with a ratio of k:1 when a plurality of data units corresponding to one page are to be stored in the sub-array blocks.

In FIG. 18, assuming that the column access circuit 300 in FIG. 1 receives a plurality of data units, each of which includes a normal data and a meta data having a ratio of k:1 and stores the plurality of data units including data bits corresponding to 210 in a page of sub-array blocks. Here, k may be 8.

The column access circuit 500 may allocate p column selection lines to the plurality of normal data and the plurality of meta data with the ratio of k:1, and the p column selection lines may be associated with transferring the plurality of data units to the plurality of bit-lines. Here, p may be a natural number greater than k and p may be 63.

The column access circuit 500 may allocate q column selection lines CSL0~CSL55 to the plurality of normal data and may allocate r column selection lines CSL56~CSL62 as meta column selection lines to the plurality of meta data, from among the column selection lines CSL0~CSL63. Here, q may be a natural number smaller than p and equal to or greater than k, r may be a natural number smaller than q and p may correspond to a sum of q and r.

The column access circuit 500 may store a first sub unit (e.g., 16 bits) of a first normal data from among the plurality of normal data in a first region in each of an upper sub region and a lower sub region of a first target sub-array block by activating a first column selection line CSL0 and may store a first sub unit (e.g., 2 bits) of a first meta data, corresponding to the first normal data, from among the plurality of meta data in a second region in each of the upper sub region and the lower sub region of the first target sub-array block by activating a first meta column selection line MCS56 after the first sub unit of the first normal data is stored. When the first meta column selection line MCS56 is activated, one bit-line may be used for storing the first sub unit of the first meta data.

For example, the first normal data may be 128 bits, the first sub unit of the first normal data may be 16 bits, the first meta data may be 8 bits, and the first sub unit of the first meta data may be 2 bits.

The column access circuit 500 may store a second sub unit of the first normal data in the first region in each of the upper sub region and the lower sub region of the first target sub-array block by activating a second column selection line CSL1 and may store a second sub unit (e.g., 2 bits) of the first meta data in a second region in each of an upper sub region and a lower sub region of a second target sub-array block by activating the first meta column selection line MCS56 after the first sub unit of the first normal data is stored.

When the at least one sub ECC engine 340 in FIG. 3 individually performs the second ECC decoding on the plurality of meta data to generate a meta parity data, the column access circuit 500 may allocate the column selection lines CSL56~CSL62 to the meta parity data as a reference numeral 471 indicates.

In addition, the column selection line CSL63, which is not allocated to the meta data, may be allocated to count cells for storing accumulated access times of a corresponding memory cell row and may be used for determining a hammer address as a reference numeral 472 indicates. In addition, the column selection line CSL63 may be allocated to memory cells for storing error information associated with determining a defect of the corresponding memory cell row. The error information may include a number of error bits and/or a number of error occurrences obtained from ECC decoding operation and/or an error check and scrub (ESC) operation.

FIGS. 19A through 20B illustrate a portion of the semiconductor memory device of FIG. 3, respectively, according to example embodiments.

In each of FIGS. 19A through 20B, the first bank array 310a and the column access circuit 500 of the semiconductor memory device 200 of FIG. 3 are illustrated.

Referring to FIGS. 19A through 20B, the first bank array 310a may include first through eighth sub-array blocks SCB1~SCB8 and a redundancy sub-array block RSCB, each of the first through eighth sub-array blocks SCB1~SCB8 may include an upper sub region URG1 and a lower sub region LRG1, the upper sub region URG1 may include a first region URG11 and a second region URG12 and the lower sub region LRG1 may include a first region LRG11 and a second region LRG12. The redundancy sub-array block RSCB may include a first region and a second region.

Figure 19A:
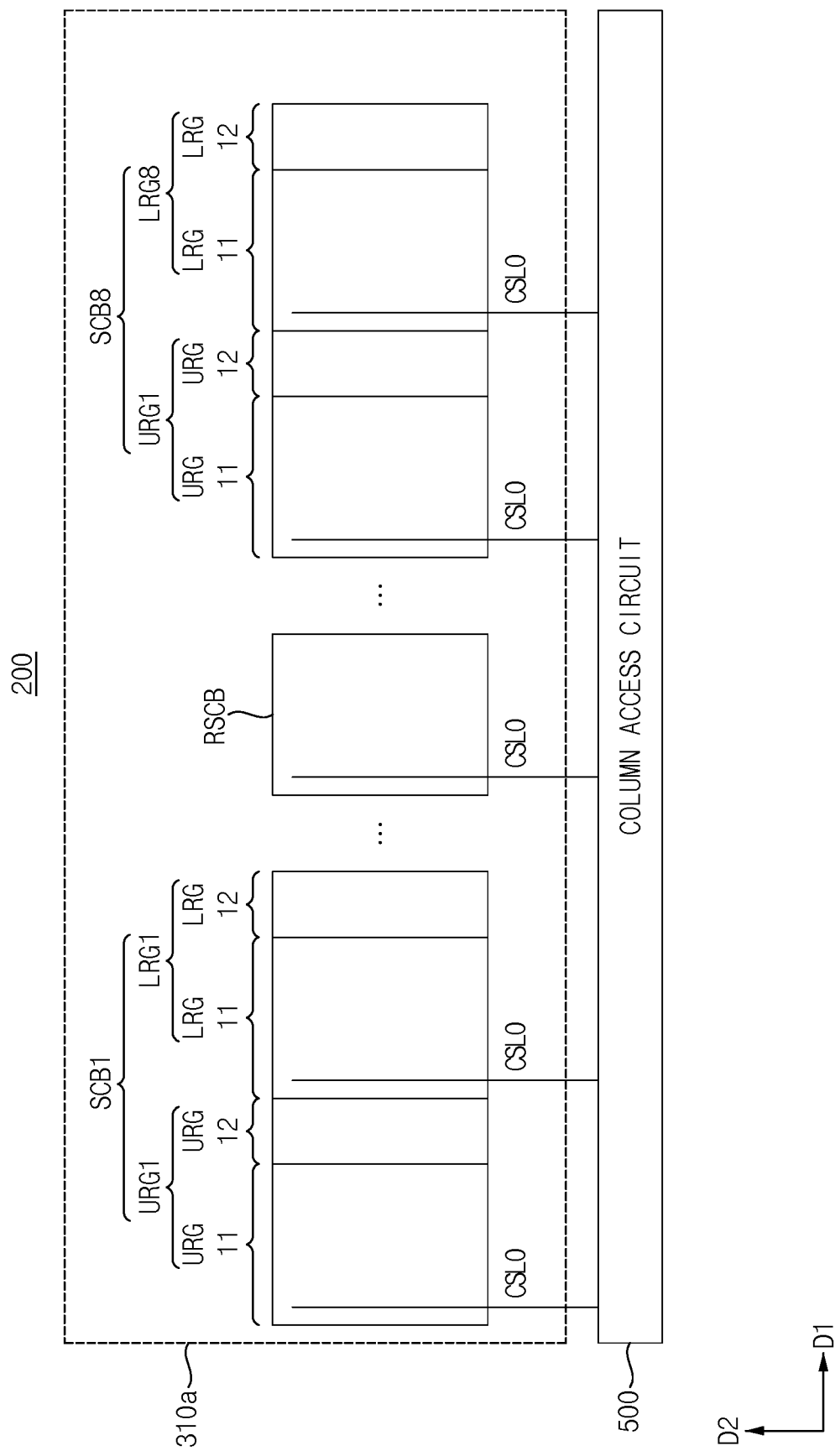

Referring to FIG. 19A, the column access circuit 500 may perform a first write operation to store a first sub unit of the first normal data in each of the first regions URG11 and LRG11 of each of the first through eighth sub-array blocks SCB1~SCB8 or may perform a first read operation to read the first sub unit of the first normal data from each of the first regions URG11 and LRG11 of each of the first through eighth sub-array blocks SCB1~SCB8 by activating a first column selection line CSL0 in each of the first regions URG11 and LRG11 of each of the first through eighth sub-array blocks SCB1~SCB8. When the column access circuit 500 activates the first column selection line CSL0 in each of the first regions URG11 and LRG11 of each of the first through eighth sub-array blocks SCB1~SCB8, the column access circuit 500 activates the first column selection line CSL0 in the redundancy sub-array block RSCB. More specifically, in response to the semiconductor memory device 200 receiving a command for the first write operation or the first read operation and address information designating a specific number for column selection lines from the memory controller 30, column selection lines of the first bank array 310a having the specific number may be activated. According to an example of FIG. 19A, since 16 normal column selection lines of the first bank array 310a have the same column selection line number and one column selection line is connected to 8 bit-lines, normal data including 128 bits (i.e., 16*8 bits) may be stored or read by the first write operation or the first read operation.

Referring to FIG. 19B, the column access circuit 500 may perform a second write operation to store a first sub unit MSCL56<0:1> of the first meta data, corresponding to the first sub unit of the first normal data, in each of the second regions URG12 and LRG12 of the first sub-array block SCB1 or may perform a second read operation to read the first sub unit MSCL56<0:1> of the first meta data from each of the second regions URG12 and LRG12 of the first sub-array block SCB1 by activating a first meta column selection line MCSL56 in each of the second regions URG12 and LRG12 of the first sub-array blocks SCB1. In response to a portion of (i.e., two) meta column selection lines having the same number being activated in the first bank array 310a, meta data including 16 bits (i.e., 2*8 bits) may be stored or read by the second write operation or the second read operation.

Figure 20A:
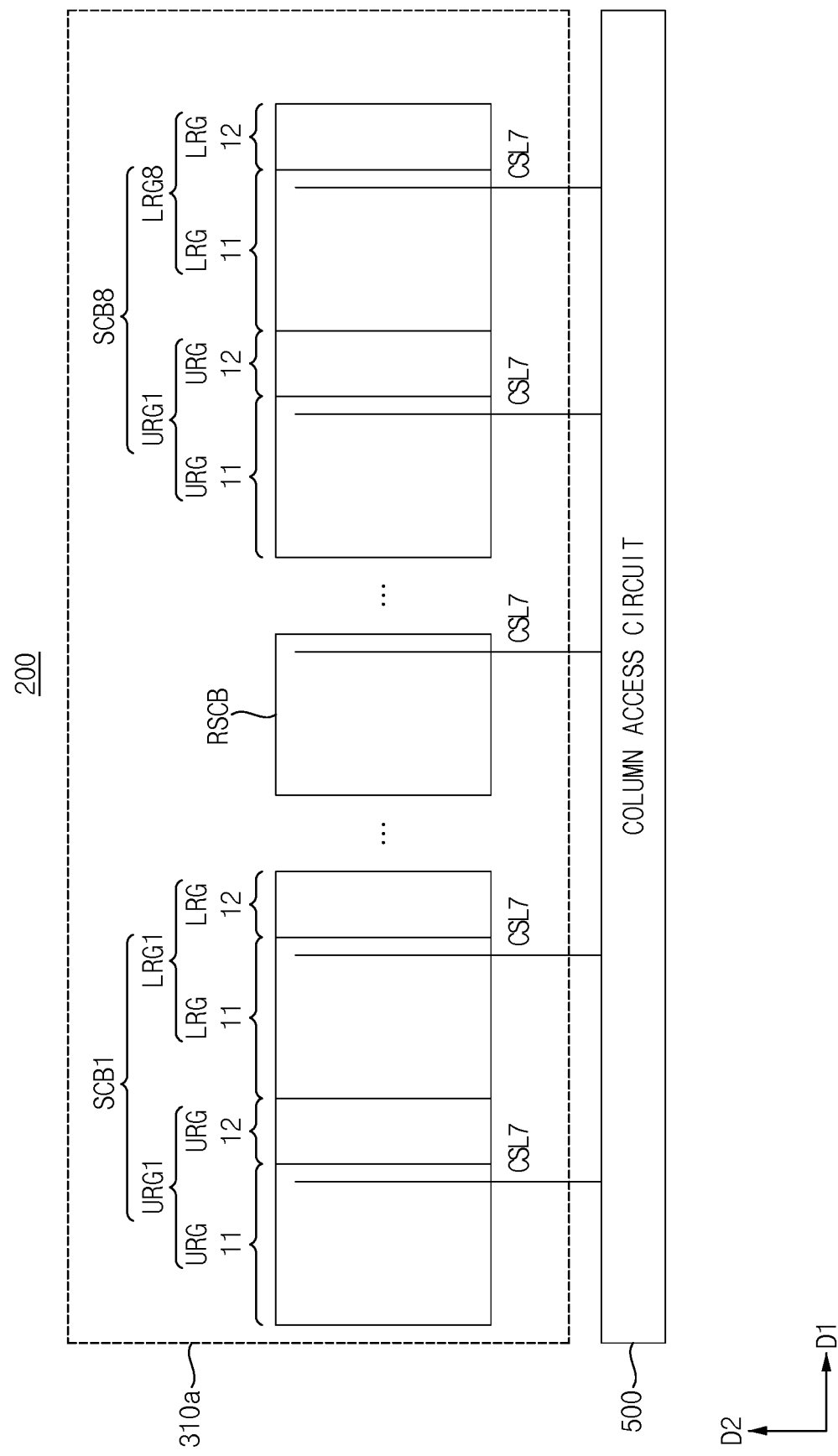

Referring to FIG. 20A, the column access circuit 500 may perform a first write operation to store an eighth sub unit of the first normal data in each of the first regions URG11 and LRG11 of each of the first through eighth sub-array blocks SCB1~SCB8 or may perform a first read operation to read the first sub unit of the first normal data from each of the first regions URG11 and LRG11 of each of the first through eighth sub-array blocks SCB1~SCB8 by activating an eighth column selection line CSL7 in each of the first regions URG11 and LRG11 of each of the first through eighth sub-array blocks SCB1~SCB8. When the column access circuit 500 activates the eighth column selection line CSL7 in each of the first regions URG11 and LRG11 of each of the first through eighth sub-array blocks SCB1~SCB8, the column access circuit 500 activates the eighth column selection line CSL0 in the redundancy sub-array block RSCB.

Referring to FIG. 20B, the column access circuit 500 may perform a second write operation to store an eighth sub unit MSCL56<14:15> of the first meta data, corresponding to the eighth sub unit of the first normal data, in each of the second regions URG12 and LRG12 of the eighth sub-array block SCB8 or may perform a second read operation to read the eighth sub unit MSCL56<14:15> of the first meta data from each of the second regions URG12 and LRG12 of the eighth sub-array block SCB8 by activating a first meta column selection line MCSL56 in each of the second regions URG12 and LRG12 of the eighth sub-array blocks SCB8. In this manner, when reading or writing data to a plurality of sub-array blocks in a plurality of access operations, each access operation may write normal data to or read normal data from all of the plurality of sub-array blocks while writing meta data to or reading meta data from only one of the plurality of sub-array blocks.

Figure 21A:
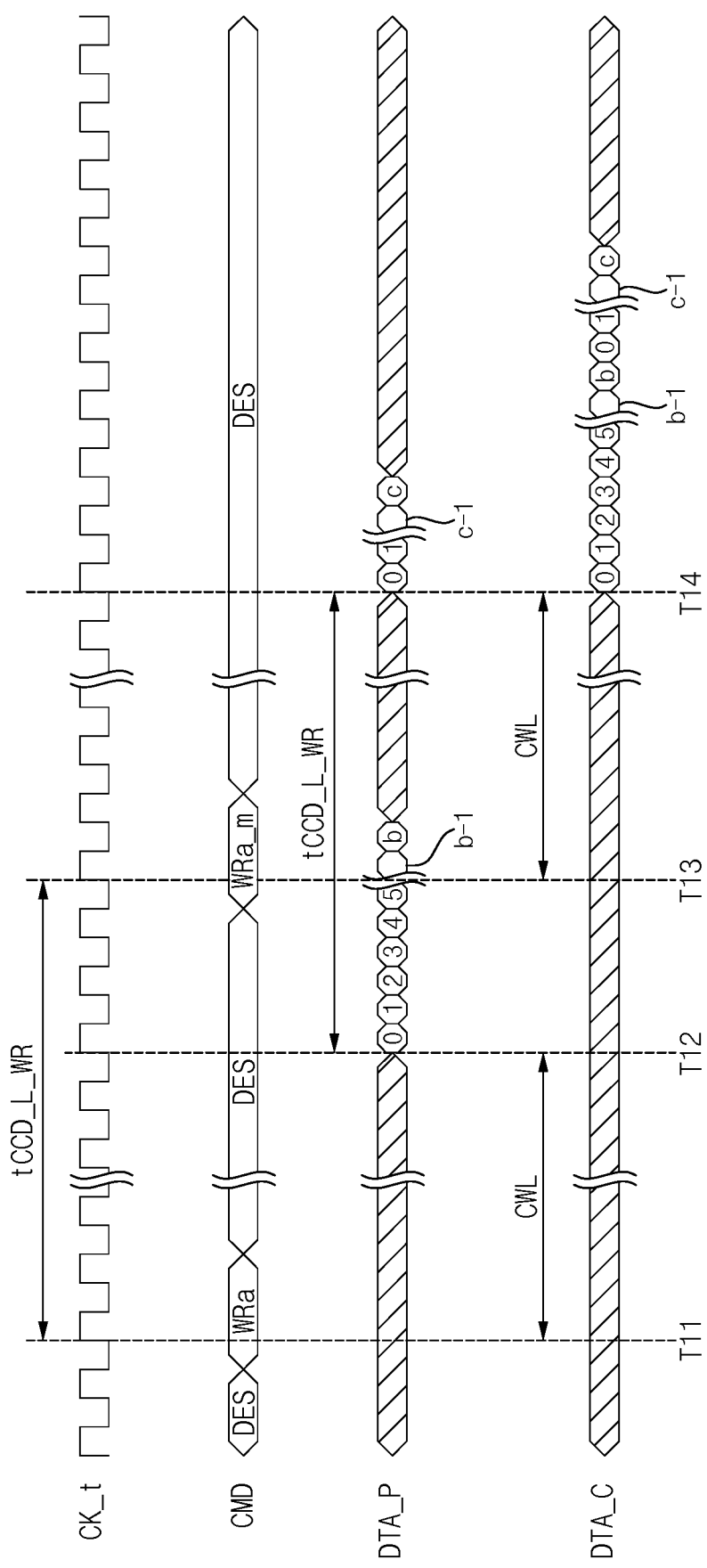

FIGS. 21A and 21B illustrate timing diagrams of write operation to store a normal data and a meta data, respectively, according to example embodiments.

In FIGS. 21A and 21B, a clock signal CK_t is illustrated, and DES denotes "deselect".

Referring to FIGS. 1, 2, 3 and 21A, the scheduler 55 in the memory controller 30 applies a first write command WRa designating a first write operation on a target memory cell row in a first sub array block to the semiconductor memory device 200 in synchronization with an edge of the clock signal CK_t. The semiconductor memory device 200 receives the first write command WRa at a first time point T11 and receives a first sub unit of data bits DTA_P (0~b-1, b) of a first normal data from the memory controller 30 at a second time point T12 after a first latency CWL elapses from the first time point T11.

In example embodiments, b may be 15 or 127.

After a time interval corresponding to a first delay time of consecutive write commands to the same bank group tCCD_L_WR from receiving the first write command WRa, the semiconductor memory device 200 receives a second write command WRa_m designating a second write operation on the target memory cell row in the first sub array block from the scheduler 55 in the memory controller 30 at a third time point T13 and receives a first sub unit of data bits DTA_P (0~c-1, c) of a first meta data from the memory controller 30 at a fourth time point T14 after a second delay time corresponding to tCCD_L_WR elapses from the second time point T12. In example embodiments, c may be 1 or 15.

Here, the first delay time may be the same as the second delay time corresponding to tCCD_L_WR.

The column access circuit 500 in the semiconductor memory device 200 may sequentially perform a first write operation to store the first sub unit of data bits DTA_C (0~b-1, b) of the first normal data in a first region of the target sub array block and a second write operation to store the first sub unit of data bits DTA_C (0~c-1, c) of the first meta data in a second region of the target sub array block at the fourth time point T14 after a second latency CWL elapses from the third time point T13.

Here, the first latency may be the same as the second latency corresponding to CWL.

In example embodiments, the semiconductor memory device 200 may operate in a first write mode or a second write mode.

The memory controller 30 of FIG. 2 may control the semiconductor memory device 200 to operate in the first write mode or the second write mode. For example, the memory controller may adjust a specific bit in a storage such as the mode register 212 for controlling the semiconductor memory device 200 to operate in the first write mode or the second write mode. When the memory controller 30 sets the specific bit to a first logic level (e.g., '0'), the semiconductor memory device 200 operates in the first write mode. When the memory controller sets the specific bit to a second logic level (e.g., '1'), the semiconductor memory device 200 operates in the second write mode.

In the first write mode, the memory controller 30 may provide the normal data to the semiconductor memory device 200 and the column access circuit 500 may allocate column selection lines to the normal data without allocating a portion of the column selection lines to the meta data.

In the second write mode, the memory controller 30 may provide the normal data and the meta data to the semiconductor memory device 200 and the column access circuit 500 may allocate column selection lines to the normal data and the meta data with a specific ratio.

In example embodiments, the memory controller 30 may apply one write command to the semiconductor memory device 200 and the column access circuit 500 may store the normal data and the meta data in a target sub array block in response to the one write command. That is, in the second write mode, the column access circuit 500 may perform the second write operation to store the meta data along with the first write operation to store the meta data without receiving the second write command WRa_m.

The memory controller 30 may consecutively provide the normal data and the meta data to the semiconductor memory device 200 without a delay time differently from FIG. 21A.

Referring to FIGS. 1, 2, 3 and 21B, the memory controller 30 may consecutively provide the first sub unit of data bits DTA_C (0~b-1, b) of the first normal data and the first sub unit of data bits DTA_C (0~c-1, c) of the first meta data to the semiconductor memory device 200 without a delay time.

Figure 22:
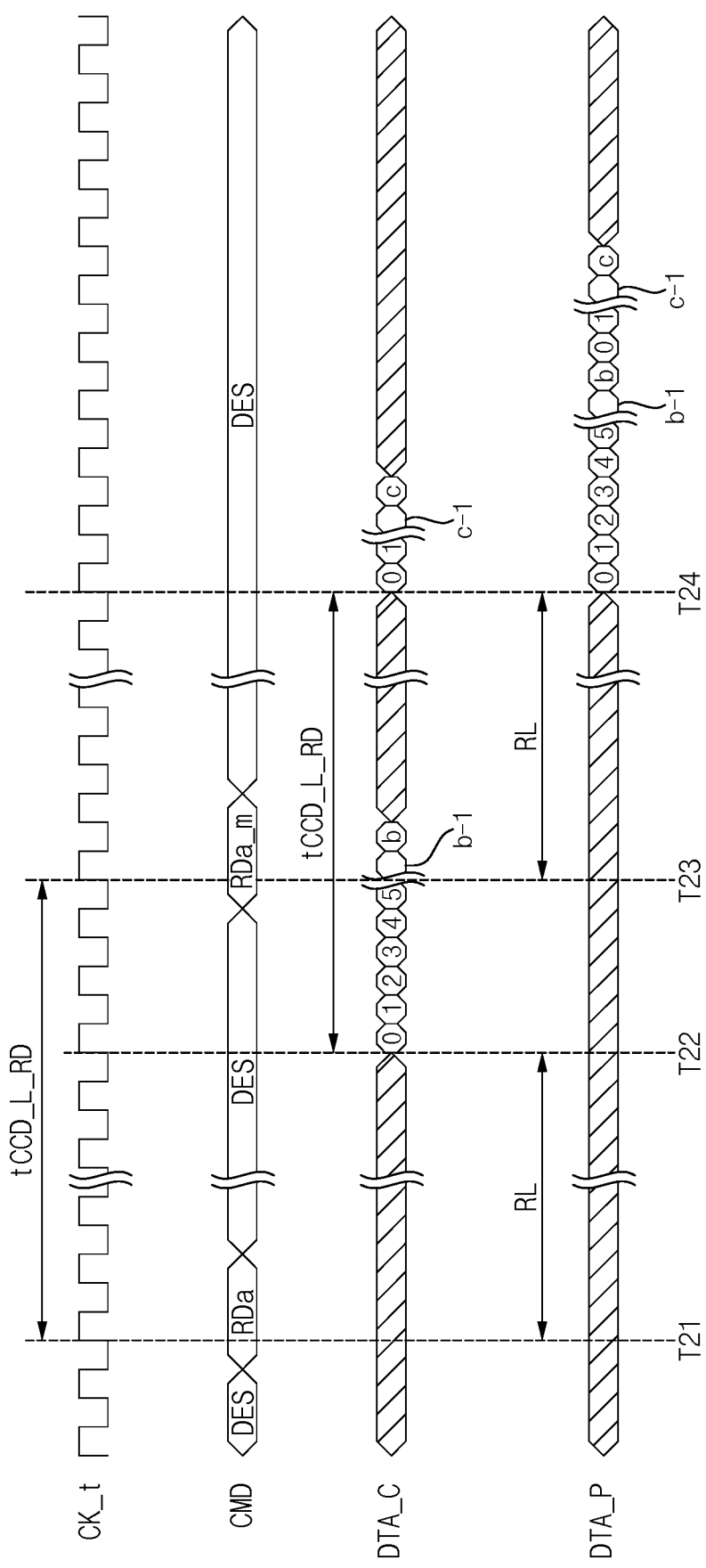
FIG. 22 illustrates a timing diagram of read operation to read a normal data and a meta data according to example embodiments.

FIG. 22 illustrates a timing diagram of read operation to read a normal data and a meta data according to example embodiments.

In FIG. 22, a clock signal CK_t is illustrated, and DES denotes "deselect".

Referring to FIGS. 1, 2, 3 and 22, the scheduler 55 in the memory controller 30 applies a first read command RDa designating a first read operation on a target memory cell row in a first sub array block to the semiconductor memory device 200 in synchronization with an edge of the clock signal CK_t. The semiconductor memory device 200 receives the first read command RDa at a first time point T21 and reads the first sub unit of data bits DTA_C (0~b-1, b) of the first normal data from the first region of the target sub-array block at a second time point T22 after a first latency RL elapses from the first time point T21.

After a time interval corresponding to a first delay time of consecutive read commands to the same bank group tCCD_L_RD from receiving the first read command RDa, the semiconductor memory device 200 receives a second read command RDa_m designating a second read operation on the target memory cell row in the first sub array block from the scheduler 55 in the memory controller 30 at a third time point T23 and reads the first sub unit of data bits DTA_C (0~c-1, c) of the first meta data from the second region of the target sub-array block at a fourth time point T24 after a second delay time corresponding to tCCD_L_RD elapses from the second time point T22.

Here, the first delay time may be the same as the second delay time corresponding to tCCD_L_RD.

The column access circuit 500 in the semiconductor memory device 200 may sequentially perform the first read operation to provide the first sub unit of data bits DTA_P (0~b-1, b) of the first normal data to the data I/O buffer 320 and the second read operation to provide the first sub unit of data bits DTA_P (0~c-1, c) of the first meta data the data I/O buffer 320 at the fourth time point T24 after a second latency CWL elapses from the third time point T23.

In example embodiments, the semiconductor memory device 200 may operate in a first read mode or a second read mode.

The memory controller 30 of FIG. 2 may control the semiconductor memory device 200 to operate in the first read mode or the second read mode. For example, the memory controller 30 may adjust a specific bit in a storage such as the mode register 212 for controlling the semiconductor memory device 200 to operate in the first read mode or the second read mode. When the memory controller 30 sets the specific bit to a first logic level (e.g., '0'), the semiconductor memory device 200 operates in the first read mode. When the memory controller sets the specific bit to a second logic level (e.g., '1'), the semiconductor memory device 200 operates in the second read mode.

In the first read mode, the memory controller 30 may provide the normal data to the semiconductor memory device 200 and the column access circuit 500 may allocate column selection lines to the normal data without allocating a portion of the column selection lines to the meta data.

In the second read mode, the memory controller 30 may provide the normal data and the meta data to the semiconductor memory device 200 and the column access circuit 500 may allocate column selection lines to the normal data and the meta data with a specific ratio.

In example embodiments, the memory controller 30 may apply one read command to the semiconductor memory device 200 and the column access circuit 500 may read the normal data and the meta data from a target sub array block in response to the one read command. That is, in the second read mode, the column access circuit 500 may perform the second read operation to store the meta data along with the first read operation to store the meta data without receiving the second read command RDa_m.

FIGS. 23 and 24 illustrate an example of a semiconductor memory device, respectively, according to example embodiments.

In each of FIGS. 23 and 24, a first bank array 310aa, the column access circuit 500 and a first sub ECC engine 340a in a semiconductor memory device 200a 3 are illustrated. The semiconductor memory device 200a may correspond to the semiconductor memory device 200a of FIG. 3.

The first bank array 310aa may include a plurality of sub-array blocks including a first sub-array block SCB1 and a second sub-array block SCB2.

The first sub-array block SCB1 may include an upper sub region URG1 and a lower sub region LRG1, the upper sub region URG1 may include a first region URG11 and a second region URG12, and the lower sub region LRG1 may include a first region LRG11 and a second region LRG12.

The second sub-array block SCB2 may include an upper sub region URG2 and a lower region LRG2, the upper sub region URG2 may include a first region URG21 and a second region URG22, the lower sub region LRG2 may include a first region LRG21 and a second region LRG22.

Referring to FIG. 23, the first sub ECC engine 340a may perform a second ECC encoding to a first meta data MDT1 to generate a first meta parity data MPRT1.

The column access circuit 500 including the first column decoder 270a in FIG. 3 may store the first meta data MDT1 having 16 bits in the second regions URG12 and LRG12 of the upper sub region URG1 and the lower region LRG1 of the first sub array block SCB1 by activating a first meta column selection line MCSL56 in the second regions URG12 and LRG12, and may store the first meta parity data MPRT1 associated with the first meta data MDT1 and a portion of a second meta data MDT2 in the second regions URG22 and LRG22 of the upper sub region URG2 and the lower region LRG2 of the second sub array block SCB1, respectively, by activating the first meta column selection line MCSL56 in the second regions URG22 and LRG22.

Referring to FIG. 24, the column access circuit 500 including the first column decoder 270a in FIG. 3 may store a first normal NDT1 in the first regions URG11 and LRG11 of the upper sub region URG1 and the lower region LRG1 of the first sub array block SCB1 by sequentially activating first through eighth column selection lines CSL0~CSL7 in the first regions URG11 and LRG11 and may store a second normal NDT2 in the first regions URG21 and LRG21 of the upper sub region URG2 and the lower region LRG2 of the second sub array block SCB2 by sequentially activating first through eighth column selection lines CSL0~CSL7 in the first regions URG21 and LRG21.

Figure 25A:
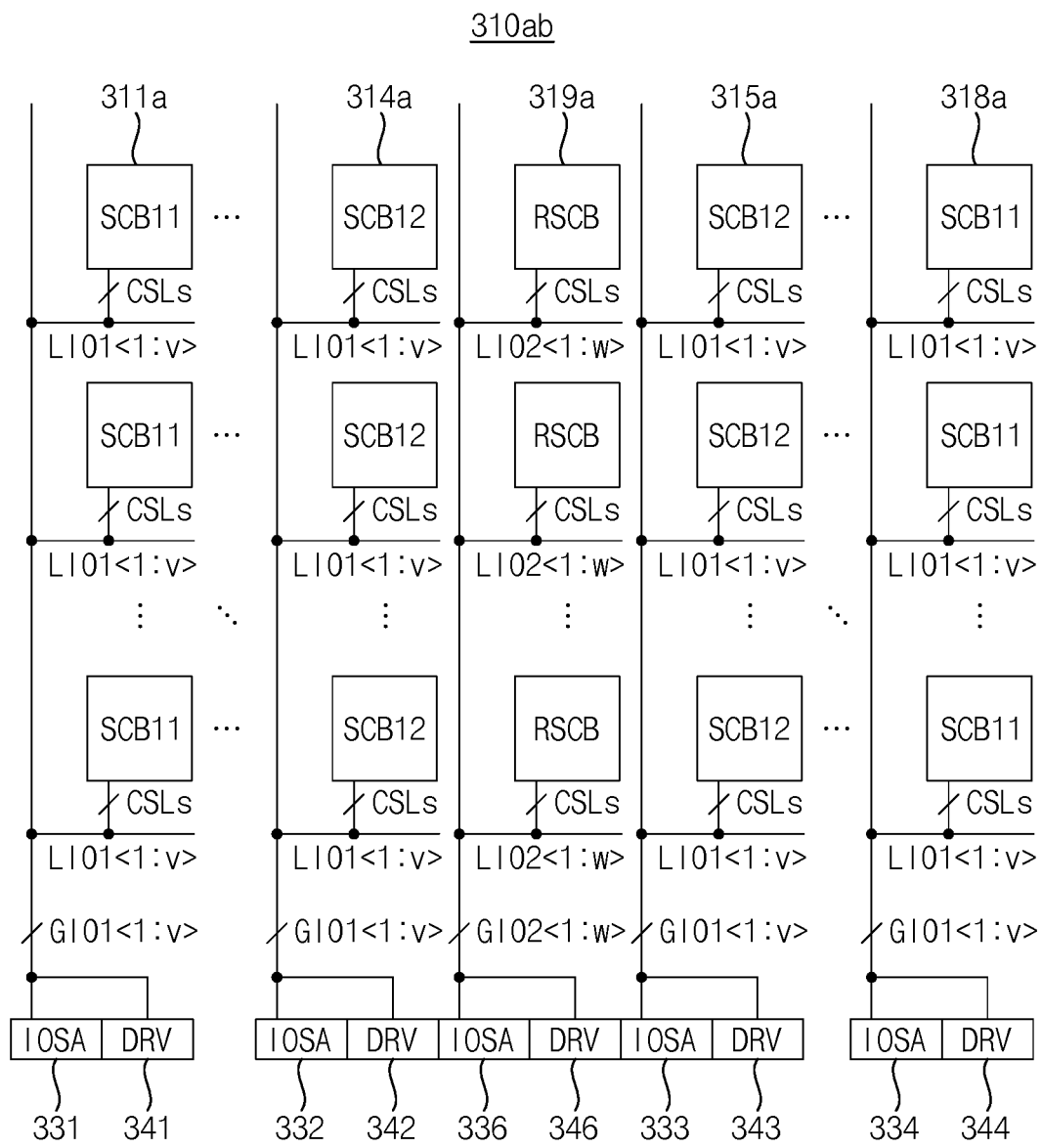
FIG. 25A is a block diagram illustrating an example of the first bank array in FIG. 4 according to example embodiments.

FIG. 25A is a block diagram illustrating an example of the first bank array in FIG. 4 according to example embodiments.

Referring to FIG. 25A, a first bank array 310ab may include first and second sub-array blocks SCB11 311a and 318a, third and fourth sub-array blocks SCB12 314a and 315a, a fifth sub-array block RSCB 319a, I/O sense amplifiers IOSA 331, 332, 333, 334 and 336 and drivers DRV 341, 342, 343, 344 and 346.

Data I/O for each of the first and second sub-array blocks 311a and 318a may be performed through first global I/O lines GIO1<1:v> and first local I/O lines LIO1<1:v>. Here, v may be a natural number equal to or greater than 8. Depending on a read command or a write command, "v" bit-lines of each of the first and second sub-array blocks 311a and 318a disposed in the first direction D1 may be selected by a column selection signal transmitted through one of column selection lines CSLs.

The number of the first and second sub-array blocks 311a and 318a and the third and fourth sub-array blocks 314a and 315a may be different in other embodiments and, for example, may be determined depending on the number of bits of data the semiconductor memory device 200 is able to process.

Data I/O for the fifth sub-array block 319a may be performed through second global I/O lines G102<1:w> and second local I/O lines LIO2<1:w>. Here, w may be a natural number smaller than v. Depending on a read command or a write command, "w" bit-lines of the fifth sub-array block 319a may be selected by a column selection signal that is transmitted through one of the column selection lines CSLs. The number of the fifth sub-array block 319a may be different in other embodiments.

In example embodiments, the first bank array 310ab may further include first and second sub-array blocks, third and fourth sub-array blocks and a fifth sub-array blocks disposed in the second direction D2.

In example embodiments, each of the first and second sub-array blocks 311a and 318a and the third and fourth sub-array blocks 314a and 315a may store a normal data and a meta data or a normal data and a first meta parity data and the fifth sub-array block 319a may store the normal parity data and a second meta parity data.

The I/O sense amplifier 331 may sense and amplify voltages of the first global I/O lines GIO1<1:v>, which are determined depending on bits output through the first global I/O lines GIO1<1:v>. Each of the I/O sense amplifiers 332, 333, 334 and 336 may operate in a manner similar to the I/O sense amplifier 331. The I/O sense amplifier 336 may sense and amplify voltages of the second global I/O lines GIO2<1:w>, which are determined depending on bits output through the second global I/O lines GIO2<1:w>.

The driver 341 may provide data to memory cells of the first sub array blocks 313a through the first global I/O lines GIO1<1:v>, the first local I/O lines LIO1<1:v>, and "v" bit-lines selected by a column selection signal transmitted through one of column selection lines CSLs based on a write command. The data may include bits received through one data I/O pin, or may include bits received through a plurality of data I/O pins aligned at a rising edge or a falling edge of a data strobe signal.

The drivers 342, 343, 344 and 346 may operate in a manner substantially similar to the driver 341. The driver 346 may transmit the parity data or the count parity data to memory cells of the fifth sub array blocks 315a through the second global I/O lines GIO2<1:w>, the second local I/O lines LIO2<1:w>, and "w" bit-lines selected by a column selection signal transmitted through one of column selection lines CSLs.

Figure 25B:
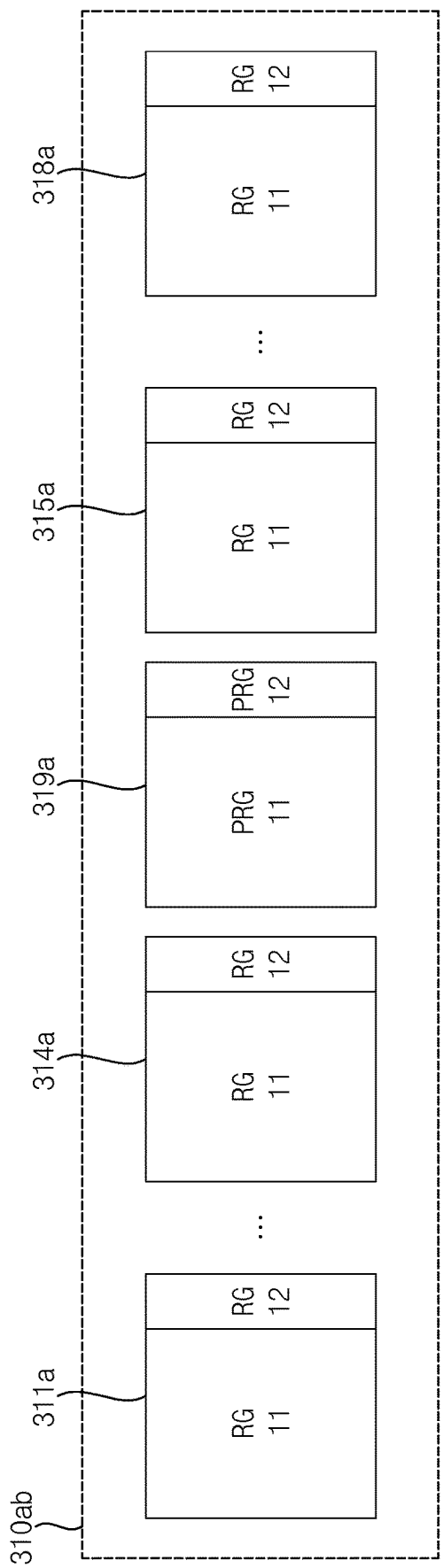
FIG. 25B is a block diagram illustrating an example of the first bank array of FIG. 25A according to example embodiments.

FIG. 25B is a block diagram illustrating an example of the first bank array of FIG. 25A according to example embodiments.

Referring to FIG. 25B, each of the first and second sub-array blocks 311a and 318a and the third and fourth sub-array blocks 314a and 315a may include a first region RG11 to store the normal data and a second region RG12 to store the meta data and the fifth sub-array block 319a may include a first region PRG11 to store the normal parity data and a second region PRG12 to store a meta parity data.

Figure 26:
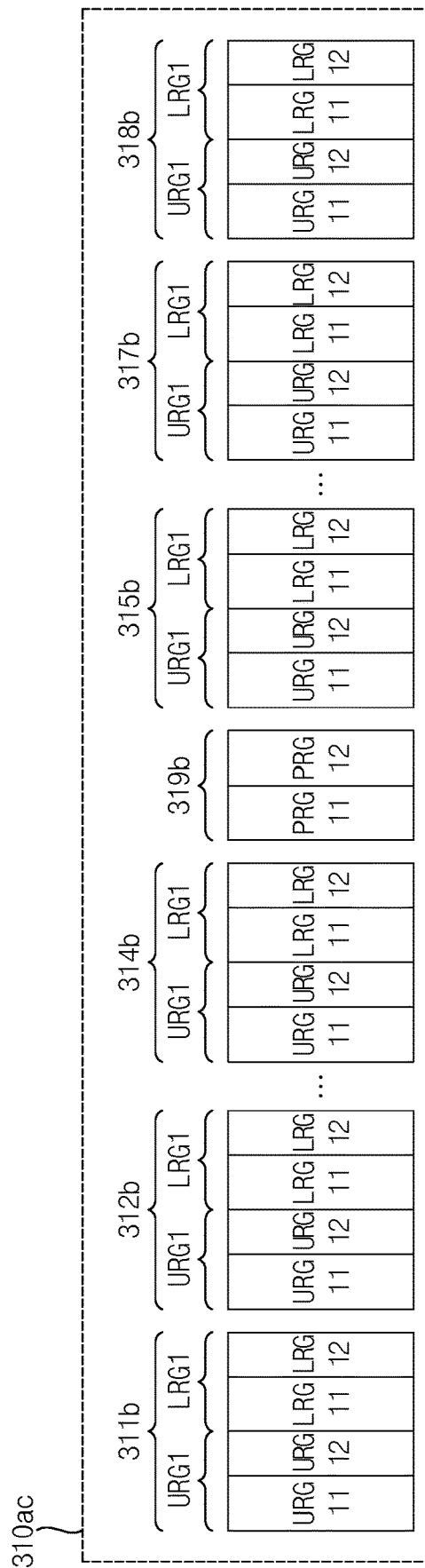
FIG. 26 is a block diagram illustrating an example of the first bank array in FIG. 4 according to example embodiments.

FIG. 26 is a block diagram illustrating an example of the first bank array in FIG. 4 according to example embodiments.

Referring to FIG. 26, a first bank array 310ac may include a plurality of sub-array blocks 311b, 312b, . . . , 314b, 315b, . . . , 316b, 317b, 318b and a redundancy sub-array block 319b.

Each of the plurality of sub-array blocks 311b, 312b, . . . , 314b, 315b, . . . , 316b, 317b, 318b may include an upper sub region URG1 and a lower region LRG1, the upper sub region URG1 may include a first region URG11 and a second region URG12, the lower sub region LRG1 may include a first region LRG11 and a second region LRG12.

The redundancy sub-array block 319b may include a first region PRG11 and a second region PRG12.

Figure 27:
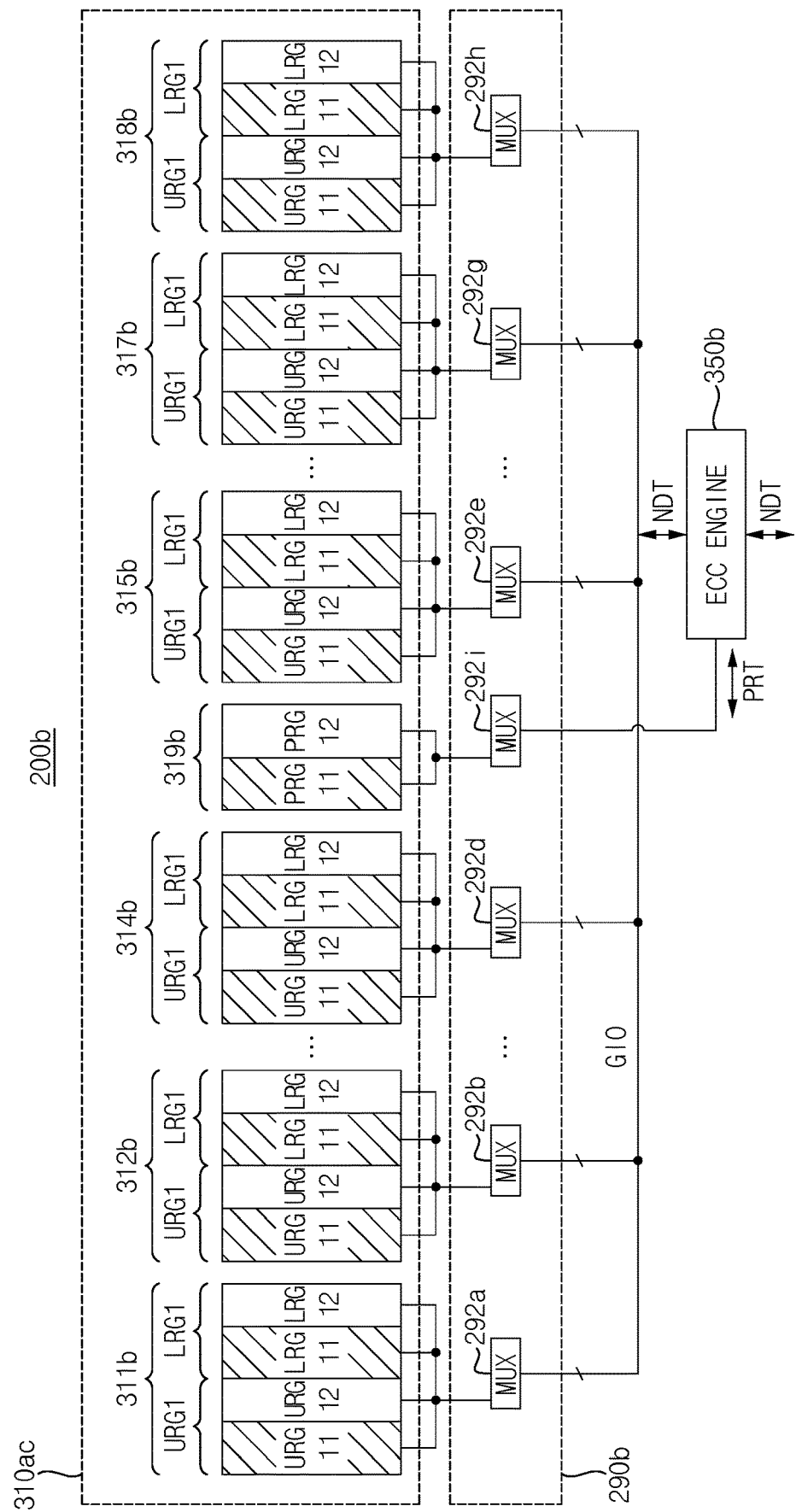
FIGS. 27 and 28 illustrate examples of a semiconductor memory device including the first bank array of FIG. 26, respectively, according to example embodiments.
Figure 28:
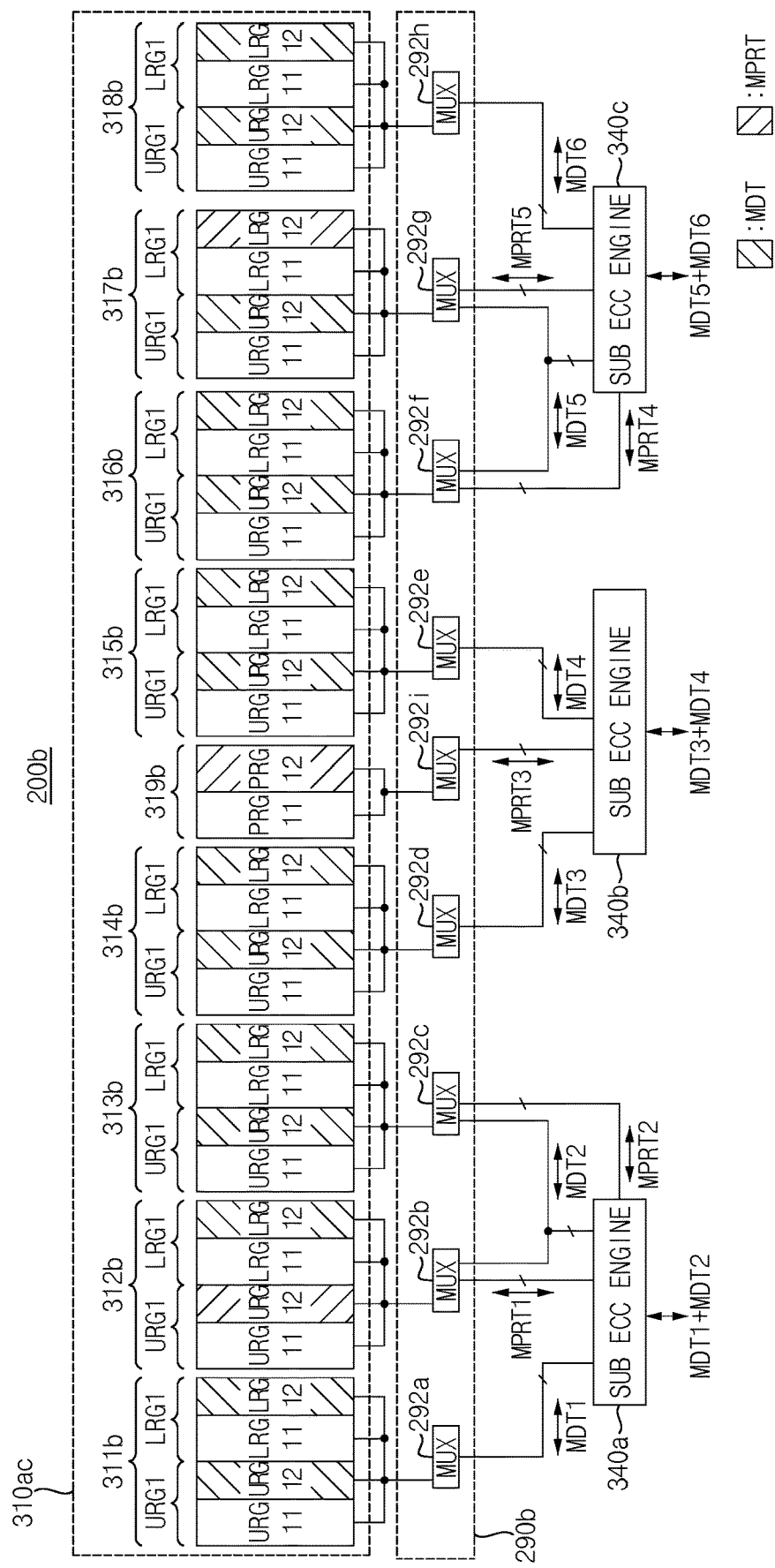

FIGS. 27 and 28 illustrate examples of a semiconductor memory device including the first bank array of FIG. 26, respectively, according to example embodiments.

In FIG. 27, a first bank array 310ac, an I/O gating circuit 290b and an ECC engine 350b of a semiconductor memory device 200b are illustrated, and in FIG. 28, the first bank array 310ac, the I/O gating circuit 290b and, a first sub ECC engine 340a, a second sub ECC engine 340a and a third sub ECC engine 340c of the semiconductor memory device 200b are illustrated.

The I/O gating circuit 290b may include a plurality of switching circuits MUX 92a, 292b, 292c, 292d, . . . , 292g, 292h, 292i coupled to the plurality of sub-array blocks 311b, 312b, . . . , 314b, 315b, . . . , 316b, 317b, 318b and the redundancy sub-array block 319b, respectively. In FIG. 27, the sub-array blocks 313b and 316b, and the switching circuits 292c and 292f are omitted.

The ECC engine 350b, the first sub ECC engine 340a, the second sub ECC engine 340a and the third sub ECC engine 340c may be connected to the plurality of sub-array blocks 311b, 312b, . . . , 314b, 315b, . . . , 316b, 317b, 318b through corresponding data lines, respectively.

Referring to FIG. 27, the ECC engine 350b performs a first ECC encoding on the normal data NDT to generate a normal parity data PRT based on the second control signal CTL2. The I/O gating circuit 290b stores the normal data NDT in the first regions URG11 and LRG11 in each of the upper sub region URG1 and the lower region LRG1 of each of the plurality of sub-array blocks 311b, 312b, . . . , 314b, 315b, . . . , 316b, 317b, 318b, and stores the normal parity data PRT in the first region PRG11 of the redundancy sub-array block 319b, reads the normal data NDT in the first regions URG11 and LRG11 to provide the normal data NDT to the ECC engine 350b and reads normal parity data PRT in the first region PRG11 to provide the normal parity data PRT to the ECC engine 350b based on the second control signal CTL1. The ECC engine 350b performs a first ECC decoding on the normal data NDT based on the normal parity data PRT.

Referring to FIG. 28, the first regions URG11 and LRG11 in each of the upper sub region URG1 and the lower region LRG1 of each of the plurality of sub-array blocks 311b, 312b, . . . , 314b, 315b, 316b, 317b, 318b may be allocated to the normal data and the second regions URG12 and LRG12 in each of the upper sub region URG1 and the lower region LRG1 of each of the plurality of sub-array blocks 311b, 312b, . . . , 314b, 315b, . . . , 316b, 317b, 318b may be allocated to the meta data. A size of each of the first regions URG11 and LRG11 and a size of each of the second regions URG12 and LRG12 may have a ratio of M:n (for example 52:11). For example, the first regions URG11 and LRG11 may correspond to M normal column selection lines (for example CSL0~CSLM-1) and the second regions URG12 and LRG12 may correspond to N meta column selection lines (for example CSLM~CSLM+N-1).

The first sub ECC engine 340a performs a second ECC encoding on the first meta data MDT1 to generate a first meta parity data MPRT1 based on the third control signal CTL3. The I/O gating circuit 290b stores the first meta data MDT1 in the second regions URG12 and LRG12 in each of the upper sub region URG1 and the lower region LRG1 of the sub array-block 311b and stores the first meta parity data MPRT1 in the second region URG12 of the upper sub region URG1 of the sub-array block SCB 312b adjacent to the sub array-block 311b based on the first control signal CTL1.

In addition, the first sub ECC engine 340a performs a second ECC encoding on the second meta data MDT2 to generate a second meta parity data MPRT2 based on the third control signal CTL3. The I/O gating circuit 290b stores the second meta data MDT2 in the second regions LRG12 and URG12 in each of the lower sub region LRG1 of the sub-array block 311b and the upper sub region URG1 of the sub array-block 311b and stores the second meta parity data MPRT2 in the second region LRG12 of the lower sub region LRG1 of the sub-array block SCB 313b based on the first control signal CTL1.

The second sub ECC engine 340b performs a third ECC encoding on a third meta data MDT3 and a fourth meta data MDT3 to generate a third meta parity data MPRT3 based on the third control signal CTL3. The I/O gating circuit 290b stores the third meta data MDT3 in the second regions URG12 and LRG12 in each of the upper sub region URG1 and the lower region LRG1 of the sub array-block 314b, stores the fourth meta data MDT4 in the second regions URG12 and LRG12 in each of the upper sub region URG1 and the lower region LRG1 of the sub array-block 315b and stores the third meta parity data MPRT3 in the second region PRG12 of the redundancy sub-array block 319b based on the first control signal CTL1. A number of bit-lines in the redundancy sub-array block 319b may be half of a number of bit-lines in each of the plurality of sub-array blocks 311b, 312b, . . . , 314b, 315b, . . . , 316b, 317b, 318b.

The third sub ECC engine 340c performs a fourth ECC encoding on the fifth meta data MDT5 to generate a fourth meta parity data MPRT4 based on the third control signal CTL3. The I/O gating circuit 290b stores the fifth meta data MDT5 in the second regions URG12 and LRG12 in each of the lower sub region LRG1 of the sub-array block 316b and the upper sub region URG1 of the sub array-block 317b and stores the fourth meta parity data MPRT4 in the second region URG12 of the upper sub region URG1 of the sub-array block SCB 316b based on the first control signal CTL1.

In addition, the third sub ECC engine 340c performs a fourth ECC encoding on a sixth meta data MDT6 to generate a fifth meta parity data MPRT5 based on the third control signal CTL3. The I/O gating circuit 290b stores the sixth meta data MDT6 in the second regions LRG12 and URG12 in each of the upper sub region LRG1 and the lower sub region LRG1 of the sub array-block 318b and stores the fifth meta parity data MPRT5 in the second region LRG12 of the lower sub region LRG1 of the sub-array block SCB 317b based on the first control signal CTL1.

In an example of FIG. 28, each of the first through sixth meta data MDT1~MDT6 may be stored in memory cells coupled to a meta column selection line having a same number in each of the sub-array blocks and may correspond to normal column selection lines having different numbers. For example, each of the first through sixth meta data MDT1~MDT6 may be stored in memory cells coupled to a meta column selection line CSL52 in each of the plurality of sub-array blocks 311b, 312b, . . . , 314b, 315b, 316b, 317b, 318b, the first meta data MDT1 may correspond to a normal data (e.g., the first normal data NDT1) stored in memory cells coupled to the column selection line CSL0 in each of the plurality of sub-array blocks 311b, 312b, . . . , 314b, 315b, 316b, 317b, 318b and the sixth meta data MDT6 may correspond to a normal data (e.g., the sixth normal data NDT6) stored in memory cells coupled to the column selection line CSL5 in each of the plurality of sub-array blocks 311b, 312b, . . . , 314b, 315b, 316b, 317b, 318b. The read operation may be performed with a reverse order of the write operation.

As mentioned above, a ratio (for example u:1) between the normal data NDT and the normal parity data PRT and a ratio (for example v:1) between the meta data MDT and the meta parity data MPRT may be different and u may be greater than v. According to an example of FIG. 28, a ratio between the normal data NDT and the normal parity data PRT may be 8:1 and a ratio between the meta data MDT and the meta parity data MPRT may be 2:1 (for example, with respect to the first meta data MDT1 and the first meta parity data MPRT1) or may be 4:1 (for example, with respect to the second meta data MDT3 and the fourth meta data MDT4 and the third meta parity data MPRT3).

With respect to the normal data NDT, the normal data NDT corresponding to u (e.g., u is 8) column selection lines may be encoded together and the normal parity data PRT corresponding to one column selection line may be generated. With respect to the meta data MDT, the meta data MDT corresponding to v (e.g., v is 2 or 4) column selection lines may be encoded together and the meta parity data MPRT corresponding to one column selection line may be generated. A size of a unit data for ECC encoding may be different in the normal data NDT and the meta data MIDT. The first sub ECC engine 340a may be configured to correct a multi-bit error in addition to a single bit error. In addition, when a specific meta data (e.g., the first meta data) is to be written or to be read from among the first through sixth meta data MDT1~MDT6 the column access circuit 500 may selectively activate a column selection line corresponding to the specific meta data and the meta parity data without activating the column selection line having a same number in each of the sub-array block in each of the plurality of sub-array blocks 311b, 312b, ..., 314b, 315b, 316b, 317b, 318b. Therefore, power consumption may be reduced and operating timing may be enhanced.

Figure 29:
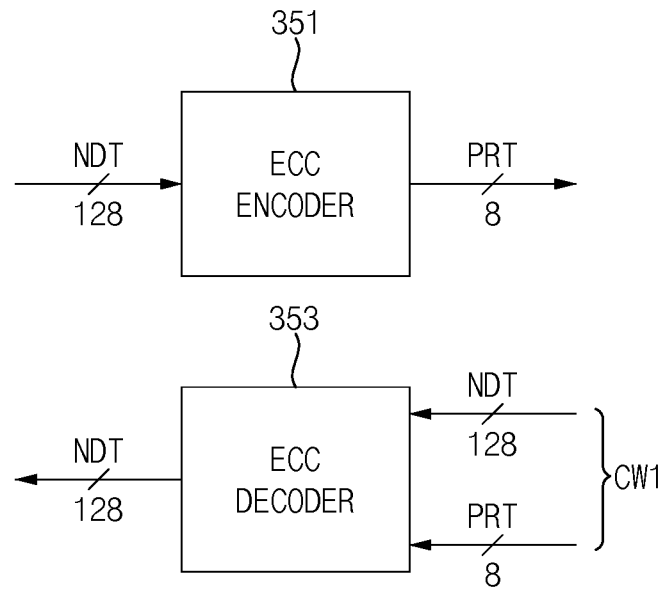
FIG. 29 is a block diagram illustrating an example of the ECC engine according to example embodiments.

FIG. 29 is a block diagram illustrating an example of the ECC engine according to example embodiments.

Referring to FIG. 29, the ECC engine 350a may include an ECC encoder 351 and an ECC decoder 353.

The ECC encoder 351 may perform a first ECC encoding on the normal data NDT (including 128-bit) to generate the normal parity data PRT (including 8-bit). The ECC decoder 353 may perform a first ECC decoding on the normal data NDT based on the normal parity data PRT to correct an error bit in the normal data NDT and may output the normal data NDT (i.e., a corrected normal data).

Figure 30:
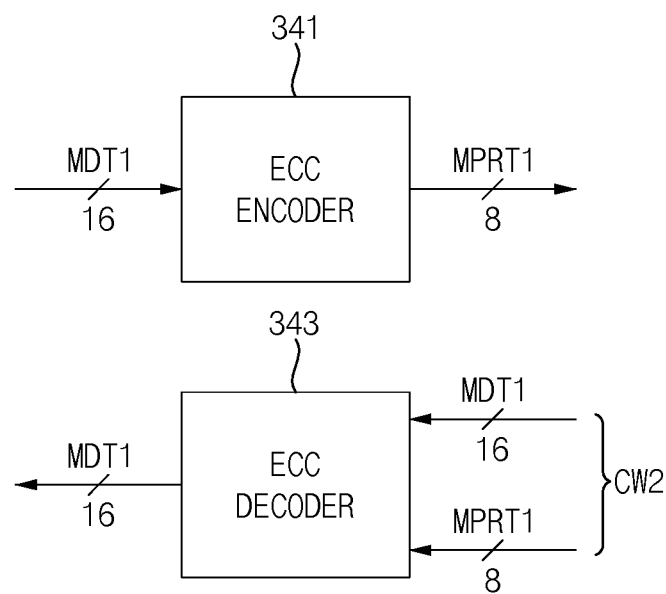
FIG. 30 is a block diagram illustrating an example of the first sub ECC engine according to example embodiments.

FIG. 30 is a block diagram illustrating an example of the first sub ECC engine according to example embodiments.

Referring to FIG. 30, the first sub ECC engine 340a may include an ECC encoder 341 and an ECC decoder 343.

The ECC encoder 341 may perform a second ECC encoding on the first meta data MDT1 (including 16-bit) to generate the first meta parity data MPRT1 (including 8-bit). The ECC decoder 343 may perform a second ECC decoding on the first meta data MDT1 based on the first meta parity data MPRT1 to correct an error bit in the first meta data MDT1 and may output the first meta data MDT1 (i.e., a corrected first meta data).

Figure 31:
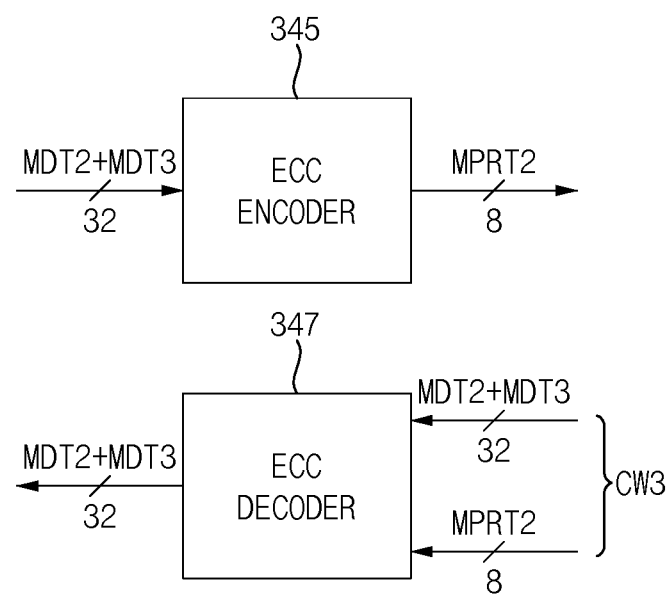
FIG. 31 is a block diagram illustrating an example of the second sub ECC engine according to example embodiments.

FIG. 31 is a block diagram illustrating an example of the second sub ECC engine according to example embodiments.

Referring to FIG. 31, the second sub ECC engine 340b may include an ECC encoder 345 and an ECC decoder 347.

The ECC encoder 345 may perform a third ECC encoding on the second meta data MIDT2 and the third meta data MDT3 (including 32-bit) to generate the second meta parity data MPRT2 (including 8-bit). The ECC decoder 347 may perform a third ECC decoding on the second meta data MDT2 and the third meta data MDT3 based on the second meta parity data MPRT2 to correct an error bit in the second meta data MDT2 and the third meta data MDT3 and may output the second meta data MDT2 and the third meta data MDT3 (i.e., a corrected second meta data and a corrected third meta data).

Because the first sub ECC engine 340a and the second sub ECC engine 340b performs the second ECC encoding and the third ECC encoding on one meta data and two meta data to generate the first meta parity data MPRT1 and the second meta parity data MPRT2, respectively, which are separate from the first ECC encoding on the normal data NDT, the semiconductor memory device 200 may reduce latency associated with generating the meta parity data without performing a read-modify-write operation.

Figure 32:
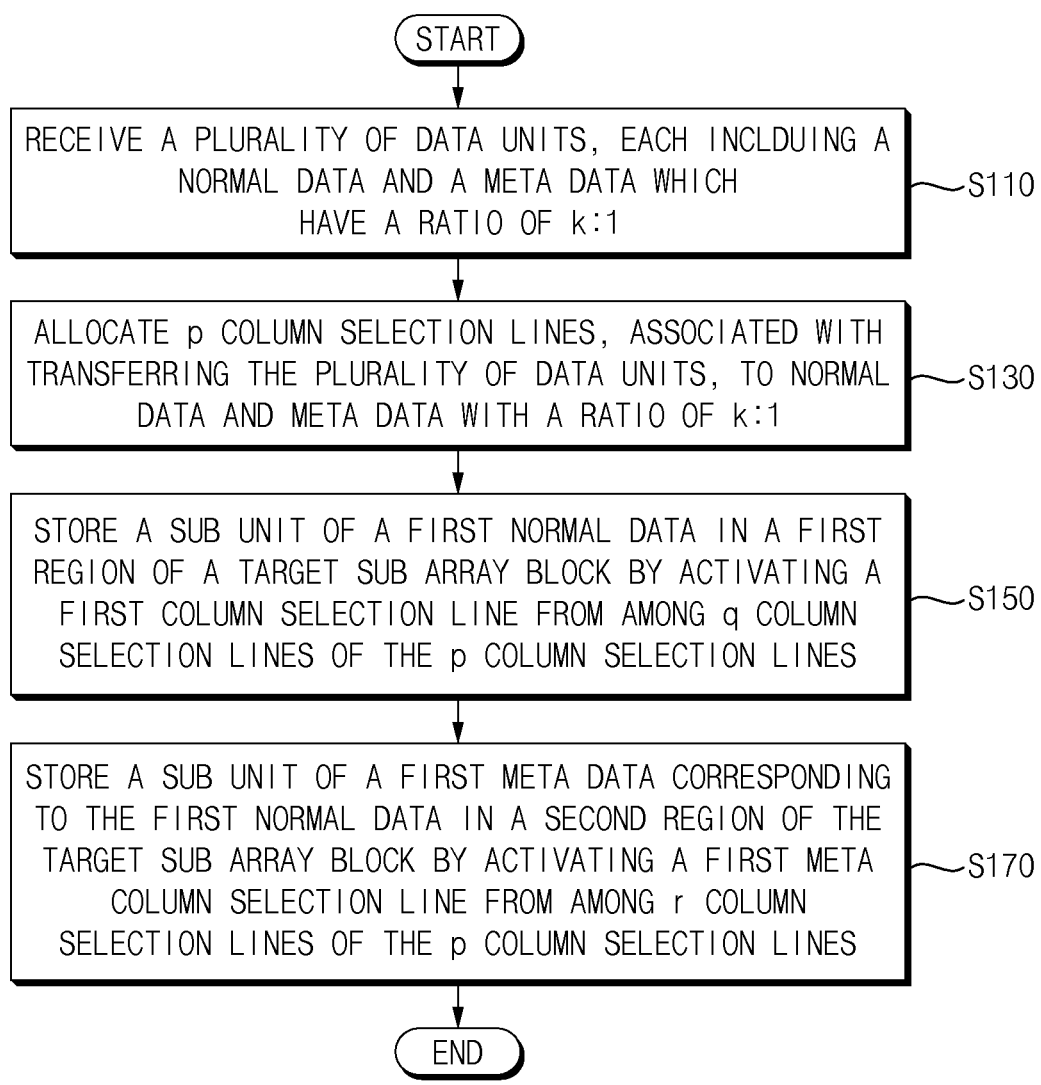
FIG. 32 is a flow chart illustrating a method of operating a semiconductor memory device according to example embodiments.

FIG. 32 is a flow chart illustrating a method of operating a semiconductor memory device according to example embodiments.

Referring to FIGS. 3 through 32, there is provided a method of operating a semiconductor memory device 200 that includes a memory cell array 310 including a plurality of sub-array blocks. According to the method, the semiconductor memory device 200 receives a plurality of data units DQ, each of which includes the normal data NDT and the meta data MDT having a ratio of k:1 from a memory controller 30 (operation S1101).

A column access circuit 500, coupled to the memory cell array 310 through a plurality of bit-lines BTLs, allocates p column selection lines associated with transferring the plurality of data units to the plurality of bit-lines, to the plurality of normal data NDT and the plurality of meta data MDT with the ratio of k:1 (operation S1301).

The column access circuit 500 stores a sub unit of a first normal data in a first region of a first sub-array block by activating a first column selection line of r column selection lines from among the p column selection lines (operation S150).

The column access circuit 500 stores a sub unit of a first meta data, corresponding to the first normal data, in a second region the first sub-array block by activating a first meta column selection line of q column selection lines from among the p column selection lines (operation S170).

Figure 33:
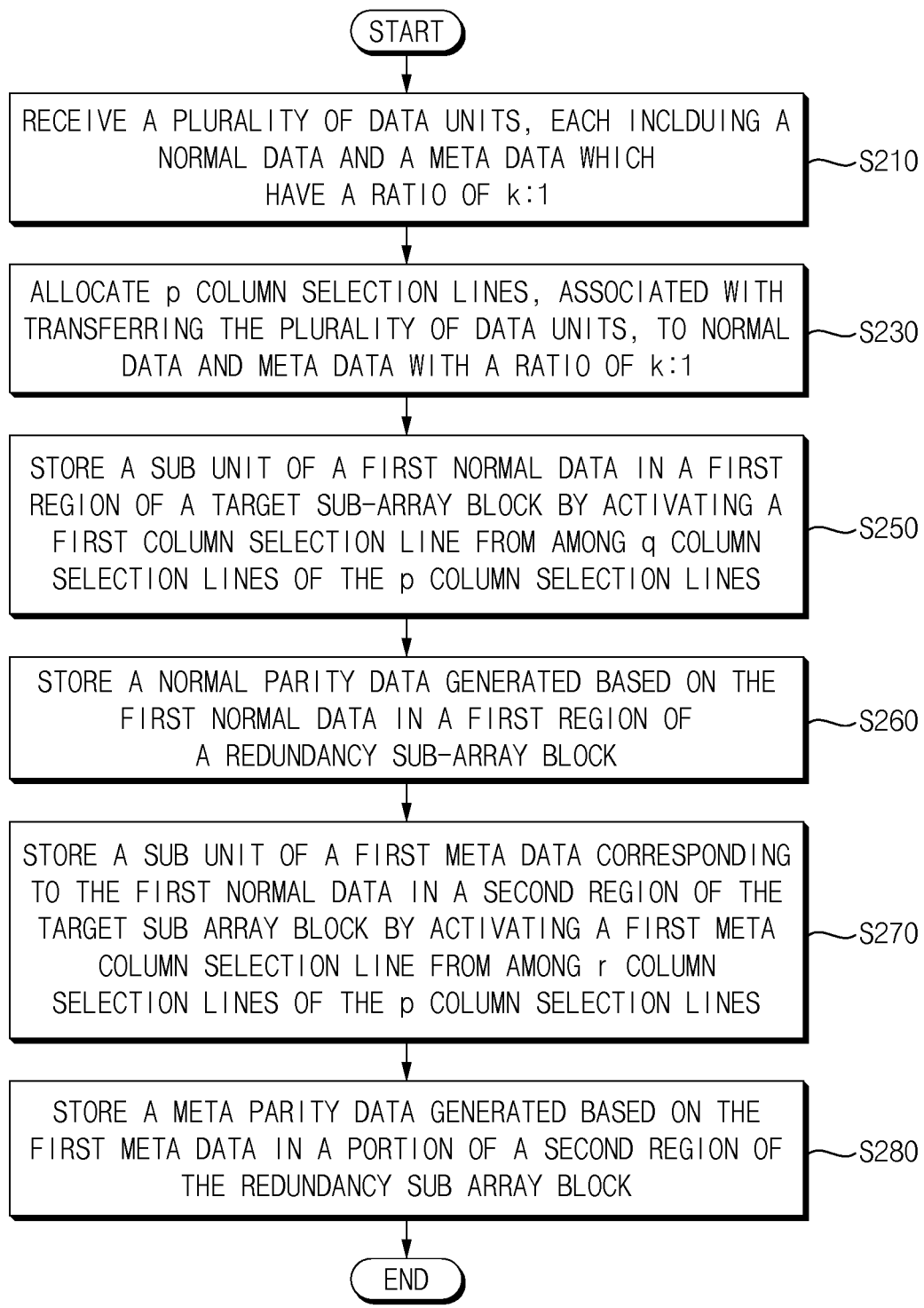
FIG. 33 is a flow chart illustrating a method of operating a semiconductor memory device according to example embodiments.

FIG. 33 is a flow chart illustrating a method of operating a semiconductor memory device according to example embodiments.

Referring to FIGS. 3 through 31 and 33, there is provided a method of operating a semiconductor memory device 200 that includes a memory cell array 310 including a plurality of sub-array blocks. According to the method, the semiconductor memory device 200 receives a plurality of data units DQ, each of which includes the normal data NDT and the meta data MDT having a ratio of k:1 from a memory controller 30 (operation S210).

A column access circuit 500, coupled to the memory cell array 310 through a plurality of bit-lines BTLs, allocates p column selection lines associated with transferring the plurality of data units to the plurality of bit-lines, to the plurality of normal data NDT and the plurality of meta data MDT with the ratio of k:1 (operation S230).

The column access circuit 500 stores a sub unit of a first normal data in a first region a first sub-array block by activating a first column selection line of r column selection lines from among the p column selection lines (operation S250).

The column access circuit 500 stores a normal parity data generated based on the normal data in a first region of a redundancy sub-array block (operation S260).

The column access circuit 500 stores a sub unit of a first meta data, corresponding to the first normal data, in a second region the first sub-array block by activating a first meta column selection line of q column selection lines from among the p column selection lines (operation S270).

The column access circuit 500 stores a meta parity data generated based on the meta data in a portion of a second region of a second sub-array block (operation S280).

Therefore, according to the semiconductor memory device and a method of operating the semiconductor memory device, the meta data associated with managing the normal data is stored in a portion of a sub-array block storing the normal data and a normal parity data and a meta parity data are generated by individual ECC engines based on the normal data and the meta data, respectively. Accordingly, latency associated with generating the meta parity data may be reduced.

Figure 34:
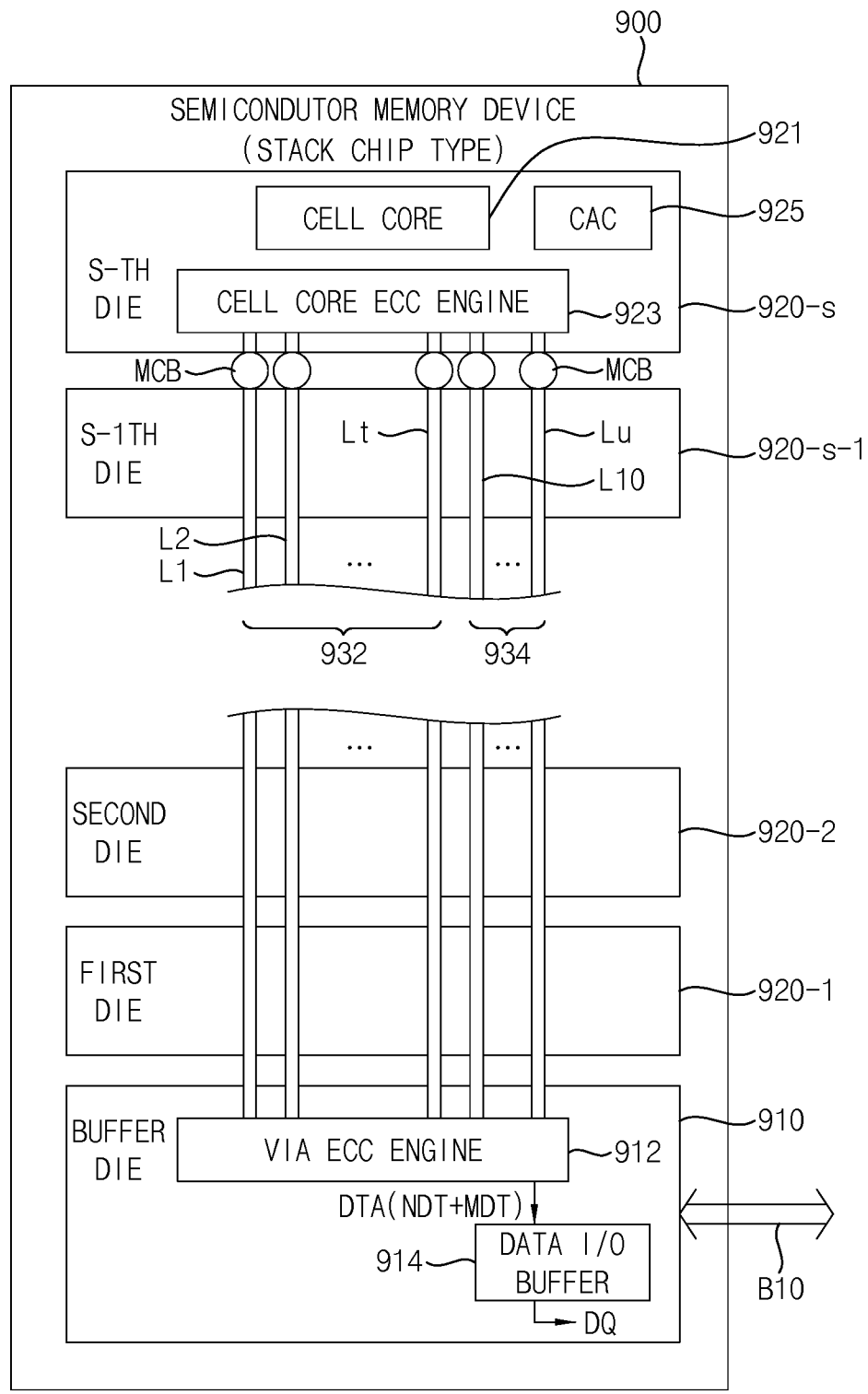
FIG. 34 is a block diagram illustrating a semiconductor memory device according to example embodiments.

FIG. 34 is a block diagram illustrating a semiconductor memory device according to example embodiments.

Referring to FIG. 34, a semiconductor memory device 900 may include at least one buffer die 910 and a plurality of memory dies 920-1 to 920-s (s is a natural number equal to or greater than three) providing a soft error analyzing and correcting function in a stacked chip structure.

The plurality of memory dies 920-1 to 920-s are stacked on the buffer die 910 and convey data through a plurality of through silicon via (TSV) lines.

At least one of the memory dies 920-1 to 920-p may include a cell core 921 to store data, a cell core ECC engine 923 which generates transmission parity bits (i.e., transmission parity data) based on transmission data to be sent to the at least one buffer die 910 and a column access circuit CAC 925. The cell core 921 may include a plurality of memory cells having DRAM cell structure. The cell core 921 may be divided into a plurality of row blocks by a row block identity bit corresponding to a portion of bits of a row address, and each of the of row blocks includes a plurality of sub-array blocks arranged in a first direction.

The column access circuit 925 may employ the column access circuit 500 in FIG. 1. Therefore, the column access circuit 925 may allocate p column selection lines associated with transferring the plurality of data units to the plurality of bit-lines, to the plurality of normal data and the plurality of meta data with the ratio of k:1, may store a sub unit of a first normal data in a first region of a target sub-array block by activating a first column selection line of r column selection lines from among the p column selection lines and may store a sub unit of a first meta data, corresponding the first normal data, in a second region of the target sub-array block by activating a first meta column selection line of q column selection lines from among the p column selection lines.

The buffer die 910 may include a via ECC engine 912 which corrects a transmission error using the transmission parity bits when a transmission error is detected from the transmission data received through the TSV liens and generates error-corrected data.

The buffer die 910 may further include a data I/O buffer 914. The data I/O buffer 914 may generate the data signal DQ by sampling the data DTA including the normal data NDT and the meta data MDT from the via ECC engine 912 and may output the data signal DQ to an outside.

The semiconductor memory device 900 may be a stack chip type memory device or a stacked memory device which conveys data and control signals through the TSV lines. The TSV lines may be also called 'through electrodes'.

The cell core ECC engine 923 may perform error correction on data which is outputted from the memory die 920-s before the transmission data is sent.

A data TSV line group 932 which is formed at one memory die 920-s may include 129 TSV lines L1 and L2 to Lh, and a parity TSV line group 934 may include 9 TSV lines L10 to Lj. The TSV lines L1 and L2 to Lh of the data TSV line group 932 and the parity TSV lines L10 to Lj of the parity TSV line group 934 may be connected to micro bumps MCB which are correspondingly formed among the memory dies 920-1 to 920-s.

The semiconductor memory device 900 may have a three-dimensional (3D) chip structure or a 2.5D chip structure to communicate with an external memory controller through a data bus B10. The buffer die 910 may be connected with the external memory controller through the data bus B10.

According to example embodiments, as illustrated in FIG. 34, the cell core ECC engine 923 may be included in the memory die, the via ECC engine 912 may be included in the buffer die. Accordingly, it may be possible to detect and correct soft data fail. The soft data fail may include a transmission error which is generated due to noise when data is transmitted through TSV lines.

Figure 35:
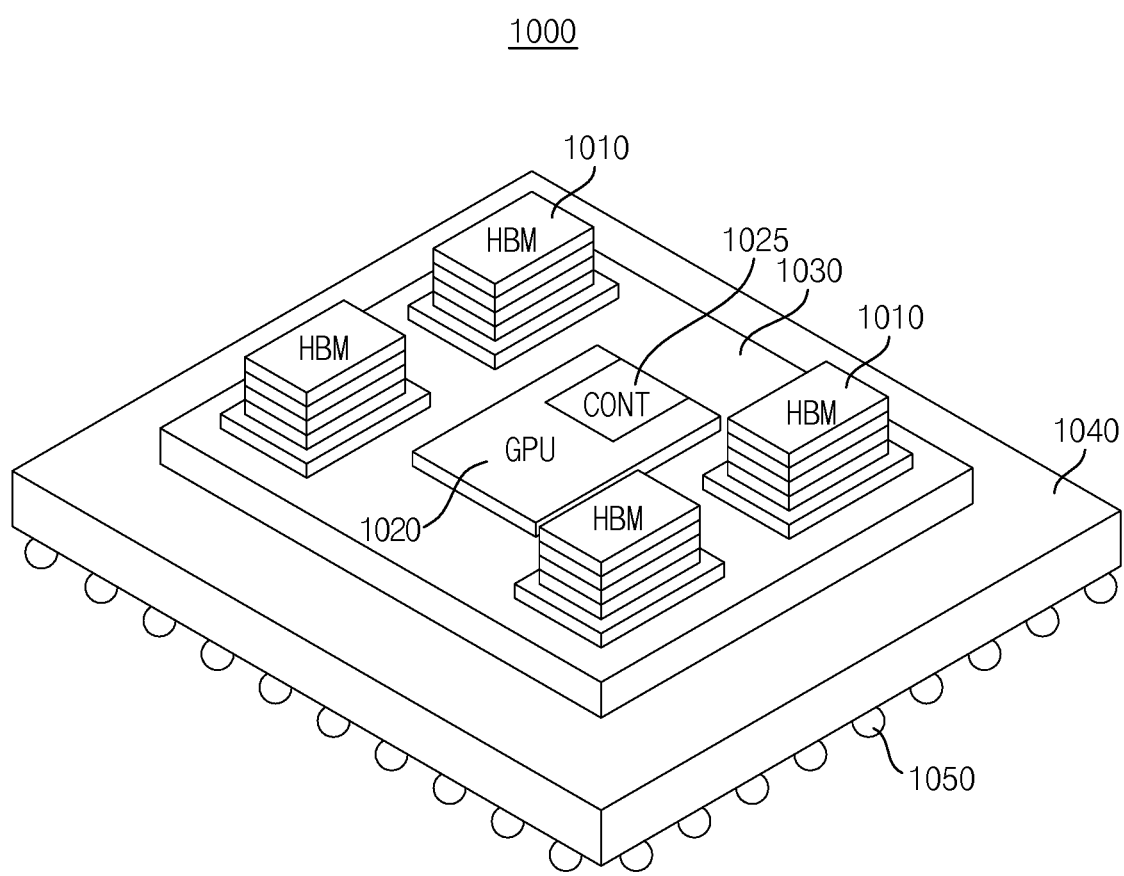
FIG. 35 is a diagram illustrating a semiconductor package including the stacked memory device, according to example embodiments.

FIG. 35 is a diagram illustrating a semiconductor package including the stacked memory device, according to example embodiments.

Referring to FIG. 35, a semiconductor package 1000 may include one or more stacked memory devices 1010 and a graphic processing unit (GPU) 1020. The GPU 1020 may include a memory controller CONT 1025.

The stacked memory devices 1010 and the GPU 1020 may be mounted on an interposer 1030, and the interposer 1030 on which the stacked memory devices 1010 and the GPU 1020 are mounted may be mounted on a package substrate 1040. The package substrate 1040 may be mounted on solder balls 1050. The memory controller 1025 may employ the memory controller 100 in FIG. 1.

Each of the stacked memory devices 1010 may be implemented in various forms, and may be a memory device in a high bandwidth memory (HBM) form in which a plurality of layers are stacked. Accordingly, each of the stacked memory devices 1010 may include a buffer die and a plurality of memory dies. Each of the memory dies may include a memory cell array and a column access circuit as described previously.

The plurality of stacked memory devices 1010 may be mounted on the interposer 1030, and the GPU 1020 may communicate with the plurality of stacked memory devices 1010. For example, each of the stacked memory devices 1010 and the GPU 1020 may include a physical region, and communication may be performed between the stacked memory devices 1010 and the GPU 1020 through the physical regions.

Aspects of the present disclosure may be applied to systems using semiconductor memory devices that employ a plurality of volatile memory cells. For example, aspects of the present disclosure may be applied to systems such as be a smart phone, a navigation system, a notebook computer, a desk top computer and a game console that use the semiconductor memory device as a working memory.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure.

Terms such as "same," "equal," "planar," "coplanar," "parallel," and "perpendicular," as used herein encompass identicality or near identicality including variations that may occur, for example, due to manufacturing or operational processes. The term "substantially" may be used herein to emphasize this meaning, unless the context or other statements indicate otherwise.

What is claimed is:

1. A semiconductor memory device comprising:
a memory cell array including a plurality of sub-array blocks arranged in a first direction and a second direction perpendicular to the first direction, each of the plurality of sub-array blocks including a plurality of volatile memory cells, wherein the plurality of sub-array blocks includes a first sub-array block comprising a first region and a second region, and; and
a column access circuit coupled to the memory cell array through a plurality of bit-lines, and
wherein the column access circuit is configured to:
receive a plurality of data units, each of which includes normal data and meta data associated with managing the normal data, the normal data and meta data having a ratio of k:1, k being a natural number greater than one;
allocate p column selection lines to a plurality of normal data and a plurality of meta data in the plurality of data units with the ratio of k:1, the p column selection lines being associated with transferring the plurality of data units to the plurality of bit-lines, p being a natural number greater than k; and
store a sub unit of a first normal data among the plurality of normal data and a sub unit of a first meta data among the plurality of meta data in the first region and the second region of the first sub-array block of the plurality of sub-array blocks, respectively, by activating two column selection lines of the p column selection lines, the first meta data corresponding to the first normal data.

2. The semiconductor memory device of claim 1, wherein the column access circuit is further configured to:
store a first sub unit of the first normal data in the first region by activating a first column selection line of q column selection lines allocated to the plurality of normal data from among the p column selection lines, q being a natural number smaller than p and equal to or greater than k; and
store a first sub unit of the first meta data in the second region by activating a first meta column selection line of r column selection lines allocated to the plurality of meta data from among the p column selection lines, r being a natural number smaller than q, p corresponding to a sum of q and r,
wherein a number of first bit-lines coupled to the first column selection line is equal to a number of bits in the first sub unit of the first normal data, and
wherein a number of second bit-lines coupled to the first meta column selection line is greater than a number of bits in the first sub unit of the first meta data.

3. The semiconductor memory device of claim 2, wherein the column access circuit is further configured to:
store a second sub unit of the first normal data in a first region in a second sub-array block of the plurality of sub-array blocks by activating a second column selection line of the q column selection lines; and
store a second sub unit of the first meta data in a second region in the second sub-array block by activating the first meta column selection line of the r column selection lines.

4. The semiconductor memory device of claim 1, wherein the column access circuit is further configured to:
perform a first write operation to store the first normal data in the first region based on a first write command received from an external memory controller; and
perform a second write operation to store the first meta data in the second region based on a second write command received from the external memory controller after a first time interval from a time point at receiving the first write command.

5. The semiconductor memory device of claim 4, wherein the column access circuit is further configured to:
receive the first normal data after a first latency from a time point at receiving the first write command; and
receive the first meta data after a second latency from a time point at receiving the second write command, and
wherein the first latency is substantially the same as the second latency.

6. The semiconductor memory device of claim 5, wherein the column access circuit is further configured to consecutively transfer the first normal data and the first meta data to bit-lines of the sub-array blocks after the first latency from the time point at receiving the second write command.

7. The semiconductor memory device of claim 1, wherein the column access circuit is further configured to:
perform a first read operation to read the first normal data from the first region based on a first read command received from an external memory controller; and
perform a second read operation to read the first meta data from the second region based on a second read command received from the external memory controller after a first time interval from a time point at receiving the first read command.

8. The semiconductor memory device of claim 7, wherein the column access circuit is further configured to:
read the first normal data after a first latency from a time point at receiving the first read command; and
read the first meta data after a second latency from a time point at receiving the second read command, and
wherein the first latency is substantially the same as the second latency.

9. The semiconductor memory device of claim 8, wherein the column access circuit is further configured to transfer the first normal data and the first meta data to a data input/output buffer which communicates with the external memory controller after the first latency from the time point at receiving the second read command.

10. The semiconductor memory device of claim 1,
wherein each of the plurality of sub-array blocks includes an upper sub region and a lower sub region and each of the upper sub region and the lower sub region includes the first region and the second region, and
wherein for each sub-array block, the column access circuit is further configured to activate the two column selection lines including a first column selection line in the upper sub region, and a second column selection line in the lower sub region.

11. A semiconductor memory device comprising:
a memory cell array including a plurality of sub-array blocks arranged in a first direction, each of the plurality of sub-array blocks including a plurality of volatile memory cells;
a column access circuit coupled to the memory cell array through a plurality of bit-lines, the column access circuit configured to:
receive a plurality of data units, each of which includes normal data and meta data associated with managing the normal data, the normal data and meta data having a ratio of k:1, k being a natural number greater than one; and
allocate p column selection lines to a plurality of normal data and a plurality of meta data in the plurality of data units with the ratio of k:1, the p column selection lines being associated with transferring the plurality of data units to the plurality of bit-lines, p being a natural number greater than k;
an error correction code (ECC) engine configured to generate a normal parity data by performing a first ECC encoding on first normal data from among the plurality of normal data; and
a first sub ECC engine configured to generate first meta parity data by performing a second ECC encoding on first meta data among the plurality of meta data, the first meta data corresponding to the first normal data,
wherein the column access circuit is further configured to:
store the first normal data and the first meta data in a first region and a second region of a first sub-array block of the plurality of sub-array blocks, respectively; and
store the first meta parity data in a portion of a second region of a second sub-array block of the plurality of sub-array blocks, the second sub-array block adjacent to the first sub-array block in the first direction.

12. The semiconductor memory device of claim 11, wherein each of the plurality of sub-array blocks includes an upper sub region and a lower sub region and each of the upper sub region and the lower sub region includes the first region and the second region, and
wherein the column access circuit is further configured to:
store the first meta data in the second region in each of the upper sub region and the lower sub region of the first sub-array block; and
store the first meta parity data in the first region of the upper sub region of the second sub-array block.

13. The semiconductor memory device of claim 11, wherein one of the plurality of sub-array blocks is a redundancy sub-array block including a first region and a second region, and
wherein a number of bit-lines of the redundancy sub-array block is a half of a number of bit-lines of the first sub-array block.

14. The semiconductor memory device of claim 13, further comprising:
a second sub ECC engine configured to generate second meta parity data by performing a third ECC encoding on second meta data and third meta data among the plurality of meta data, the second meta data and the third meta data corresponding to a second normal data and a third normal data of the plurality of normal data, respectively, and
wherein the column access circuit is further configured to:
store the normal parity data in the first region of the redundancy sub-array block; and
store the second meta parity data in the second region of the redundancy sub-array block.

15. The semiconductor memory device of claim 14, wherein a number of bits in the first meta parity data is equal to a number of bits in the second meta parity data.

16. The semiconductor memory device of claim 11, wherein each of the plurality of sub-array blocks includes an upper sub region and a lower sub region and each of the upper sub region and the lower sub region includes the first region and the second region, and
wherein the column access circuit is further configured to store a sub unit of the first normal data and a sub unit of the first meta data in the first region and the second region of the first sub-array block, respectively, by activating two column selection lines of the p column selection lines, the two column selection lines including a first column selection line in the upper sub region and a second column selection line in the lower sub region of the first sub-array block.

17. The semiconductor memory device of claim 16, wherein the column access circuit is further configured to:
store a first sub unit of the first normal data in the first region in each of the upper sub region and the lower sub region by activating a first column selection line of q column selection lines allocated to the plurality of normal data from among the p column selection lines, q being a natural number smaller than p and equal to or greater than k; and
store a first sub unit of the first meta data in the second region in each of the upper sub region and the lower sub region by activating a first meta column selection line of r column selection lines allocated to the plurality of meta data from among the p column selection lines, r being a natural number smaller than q, p corresponding to a sum of q and r.

18. The semiconductor memory device of claim 16, wherein the column access circuit is further configured to store the first meta parity data in the second region in the upper sub region of the second sub-array block.

19. A semiconductor memory device comprising:
a memory cell array including a plurality of sub-array blocks arranged in a first direction, each of the plurality of sub-array blocks including a plurality of volatile memory cells, each of the plurality of sub-array blocks including an upper sub region and a lower sub region, each of the upper sub region and the lower sub region including a first region and a second region;
a column access circuit coupled to the memory cell array through a plurality of bit-lines, the column access circuit configured to:
receive a plurality of data units, each of which includes normal data and meta data associated with managing the normal data, the normal data and meta data having a ratio of k:1, k being a natural number greater than one; and
allocate p column selection lines to a plurality of normal data and a plurality of meta data in the plurality of data units with the ratio of k:1, the p column selection lines being associated with transferring the plurality of data units to the plurality of bit-lines, p being a natural number greater than k;
an error correction code (ECC) engine configured to generate normal parity data by performing a first ECC encoding on first normal data from among the plurality of normal data; and
a first sub ECC engine configured to generate first meta parity data by performing a second ECC encoding on first meta data among the plurality of meta data, the first meta data corresponding to the first normal data,
wherein the column access circuit is further configured to:
store the first normal data in the first region in each of the upper sub region and the lower sub region of a first sub-array block of the plurality of sub-array blocks;
store the first meta data in the second region in each of the each of the upper sub region and the lower sub region of the first sub-array block; and
store the first meta parity data in the second region in one of the upper sub region and the lower sub region of a second sub-array block of the plurality of sub-array blocks.

20. The semiconductor memory device of claim 19, further comprising:
- a redundancy sub-array block including a first region and a second region; and
- a second sub ECC engine configured to generate second meta parity data by performing a third ECC encoding on second meta data and third meta data among the plurality of meta data, the second meta data and the third meta data corresponding to a second normal data and a third normal data of the plurality of normal data, respectively, and wherein the column access circuit is further configured to:
- store the normal parity data in the first region of the redundancy sub-array block; and
- store the second meta parity data in the second region of the redundancy sub-array block.

* * * * *